US011954970B2

(12) United States Patent
Washington et al.

(10) Patent No.: US 11,954,970 B2
(45) Date of Patent: *Apr. 9, 2024

(54) DYNAMIC PLACEMENT OF IN-GAME ADS, IN-GAME PRODUCT PLACEMENT, AND IN-GAME PROMOTIONS IN WAGER-BASED GAME ENVIRONMENTS

(71) Applicant: Empire Technological Group Limited, Las Vegas, NV (US)

(72) Inventors: Georg Washington, Rancho Mirage, CA (US); Joe Serra, Palm Desert, CA (US)

(73) Assignee: Empire Technological Group Limited, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,694

(22) Filed: Mar. 15, 2022

(65) Prior Publication Data

US 2022/0254220 A1 Aug. 11, 2022

Related U.S. Application Data

(63) Continuation of application No. 16/372,382, filed on Apr. 1, 2019, now Pat. No. 11,341,810, which is a continuation of application No. 15/638,363, filed on Jun. 29, 2017, now Pat. No. 9,940,785.

(60) Provisional application No. 62/400,094, filed on Sep. 27, 2016, provisional application No. 62/356,233, filed on Jun. 29, 2016.

(51) Int. Cl.
*G07F 17/32* (2006.01)

(52) U.S. Cl.
CPC ........ *G07F 17/323* (2013.01); *G07F 17/3213* (2013.01); *G07F 17/3239* (2013.01); *G07F 17/3246* (2013.01); *G07F 17/3255* (2013.01); *G07F 17/3288* (2013.01)

(58) Field of Classification Search
CPC ............... G07F 17/323; G07F 17/3213; G07F 17/3239; G07F 17/3246; G07F 17/3255; G07F 17/3288
USPC ...................................................... 463/20, 42
See application file for complete search history.

(56) References Cited

U.S. PATENT DOCUMENTS 8,616,978 B2* 12/2013 Gagner ............... G07F 17/3225 463/16
2009/0104965 A1* 4/2009 House ................ G06Q 20/3674 463/20
2011/0053672 A1* 3/2011 Gagner ............... G07F 17/3225 463/43
2012/0172136 A1* 7/2012 House ..................... G07F 17/32 463/42

(Continued)

*Primary Examiner* — Pierre E Elisca
(74) *Attorney, Agent, or Firm* — RowanTree Law Group, PLLC; Magdalena M. Fincham

(57) ABSTRACT

Various aspects are described herein for implementing in-game advertising, in-game product placement, and in-game promotion techniques in wager-based games conducted at an electronic gaming device of a casino gaming network. These techniques provide the ability for traditional video-type wager-based gaming machines (such as those deployed at casino gaming establishments) to be quickly and easily converted to wager-based games which support in-game advertising while still satisfying the strict regulatory compliance rules and regulations governing wager-based gaming.

26 Claims, 31 Drawing Sheets

(56) References Cited

U.S. PATENT DOCUMENTS

| | | | | |
|---|---|---|---|---|
| 2013/0084960 | A1 * | 4/2013 | Frady .................. | G07F 17/3239 463/25 |
| 2014/0087810 | A1 * | 3/2014 | Gagner ............... | G07F 17/3232 463/16 |

* cited by examiner

1700

1800

1900

Fig. 20
2010
2020
2022
BET. EARN. REDEEM.
Player B

2000

2200

Fig. 23
2600
2310
2320
Lucky Shot
Player C
Cashout
Bet: 20
219

2300

Fig. 24
2600
2410
2420
Player
D
Cashout
Bet: 20
219
Lucky Shot

2400

Fig. 25
Score
25,251
2530
2536
2534
2532
WIN
4,720
+ 500
CREDITS
106,320
1¢
CLASS A
MERC.
30
PER KILL
Health 75/100

2600

DYNAMIC PLACEMENT OF IN-GAME ADS, IN-GAME PRODUCT PLACEMENT, AND IN-GAME PROMOTIONS IN WAGER-BASED GAME ENVIRONMENTS

BACKGROUND

In the field of casino gaming, most casino operators derive a significant portion of their overall revenue from the revenue generated from the casino's wager-based gaming machines. Typically, for reasons relating to regulatory compliance and security, many of the casino's electronic, wager-based gaming machines are only permitted to be communicatively coupled to a secure and proprietary gaming network deployed at the casino establishment. Additionally, for reasons relating to regulatory compliance and security, many casino gaming networks are specifically configured or designed to prohibit or restrict the casino's electronic wager-based gaming machines from communicating with, or being accessible to, external networks such as, for example, the Internet or World Wide Web. Due in part to these security requirements and design constraints, there exists little or no incentive for motivating gaming machine manufacturers to incorporate banner advertising functionality or other types of online advertising functionality into their wager-based gaming machine designs.

BRIEF DESCRIPTION OF THE DRAWINGS

FIG. 32 shows a flow diagram of an In-Game Advertising Procedure 3200 in accordance with a specific embodiment.

DETAILED DESCRIPTION OF EXAMPLE EMBODIMENTS

Overview

Figure 1:
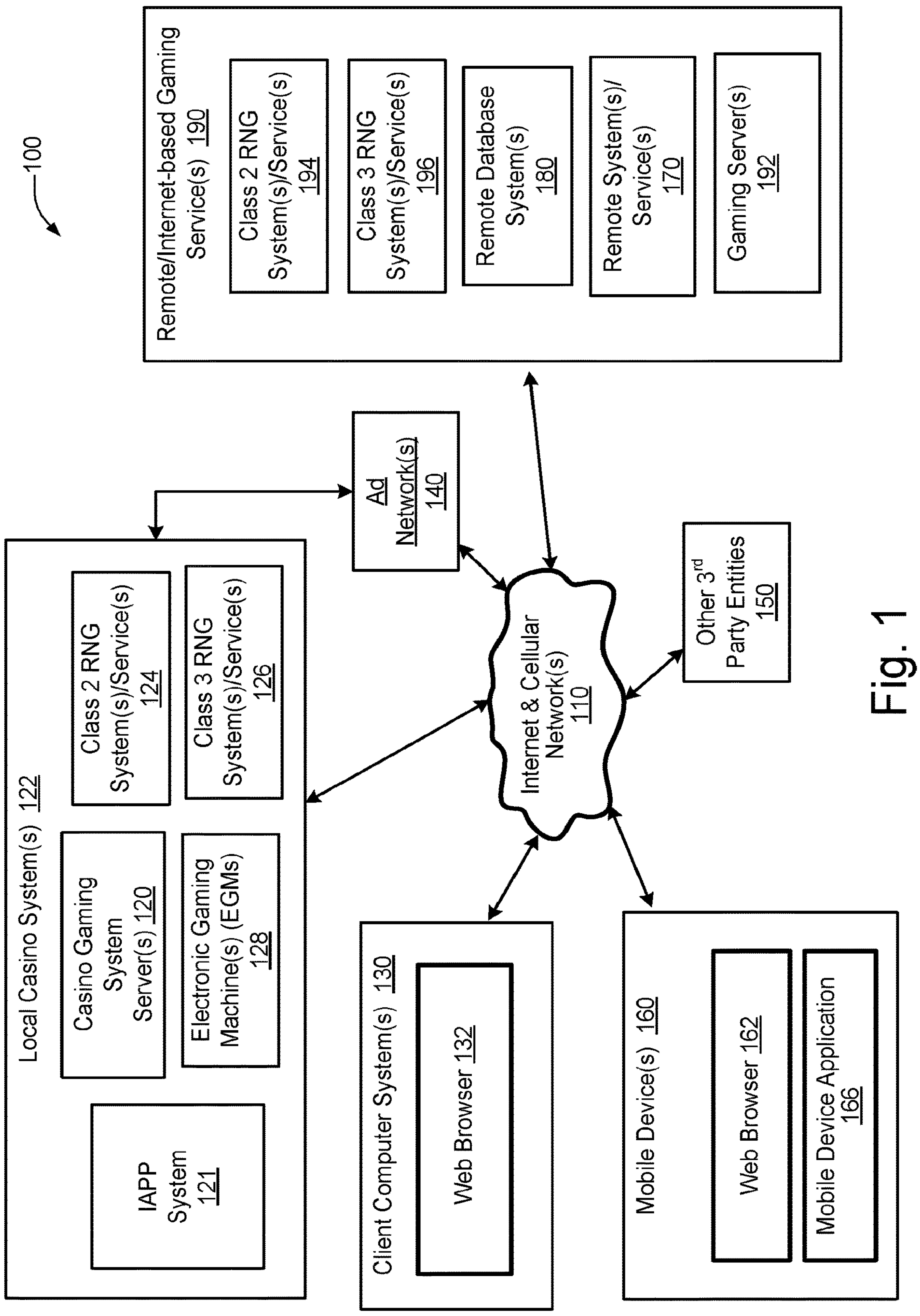
FIG. 1 illustrates a simplified block diagram of a specific example embodiment of a Gaming Network 100 which may be configured or designed to implement various hybrid arcade/wager-based gaming techniques described and/or referenced herein.

Various aspects described herein are directed to different techniques for implementing various in-game advertising, in-game product placement, and in-game promotion techniques (herein "IAPP techniques") in wager-based games conducted at an electronic gaming device of a casino gaming network.

In at least one embodiment, various method(s), system(s) and/or computer program product(s) may be operable to cause at least one processor to execute a plurality of instructions to: enable a player to engage in interactive game play of a hybrid arcade/wager-based game at a first EGD, wherein the hybrid arcade/wager-based game includes a non-wager based gaming portion and a wager-based gaming portion; link a first predetermined wager-based game event outcome to a first in-game event which may occur during play of the non-wager based game portion; detect an occurrence of the first in-game event in the non-wager based game portion; determine if the occurrence of the first in-game event qualifies as a wager-based triggering event; if it is determined that the occurrence of the first in-game event qualifies as a wager-based triggering event, initiate a first wager-based game event; automatically fund an amount wagered on the first wager-based game event; and reveal, after initiation of the first wager-based game event, the first predetermined wager-based game event outcome as an outcome of the first wager-based game event.

Additional method(s), system(s) and/or computer program product(s) may be further operable to cause at least one processor to execute additional instructions to: enable the player to concurrently engage in continuous game play of the non-wager based gaming portion of the hybrid arcade/wager-based game during execution of the first wager-based game event.

Additional method(s), system(s) and/or computer program product(s) may be further operable to cause at least one processor to execute additional instructions to: analyze the first wager-based game event outcome to determine whether or not to automatically modify an availability of at least one resource or attribute of the non-wager based gaming portion; if the first wager-based game event outcome satisfies a first set of conditions, automatically modify an availability of at least one resource or attribute of the non-wager based gaming portion; if the first wager-based game event outcome does not satisfy the first set of criteria, not perform modification of the at least one resource or attribute of the non-wager based gaming portion in response to the first wager-based game event outcome.

Additional method(s), system(s) and/or computer program product(s) may be further operable to cause at least one processor to execute additional instructions to: analyze the first wager-based game event outcome to determine whether or not a non-wager based gaming award should be distributed at the non-wager based gaming portion; if the first wager-based game event outcome satisfies a first set of criteria, automatically cause the non-wager based gaming award to be distributed at the non-wager based gaming portion; and wherein the distribution of the non-wager based gaming award includes causing at least one component of the gaming network to modify at least one in-game resource or attribute which is available for use by an in-game character during play of the non-wager based gaming portion.

Additional method(s), system(s) and/or computer program product(s) may be further operable to cause at least one processor to execute additional instructions to: automatically retrieve a first batch of predetermined wager-based game event outcomes from a first RNG engine; and select the first wager-based game event outcome from the first batch of predetermined wager-based game event outcomes.

According to different embodiments, various method(s), system(s) and/or computer program product(s) are described for implementing various types xxx techniques during play of wager-based games conducted in a casino gaming network. In at least one embodiment, the gaming network includes a first electronic, wager-based gaming device ("first EGD") having a first display and a first input interface. In at least one embodiment, at least one processor may be configured or designed to execute a plurality of instructions stored in a memory for causing at least one component of the gaming network to: enable a player to engage in a first interactive gaming session of a wager-based game conducted at the first EGD; initiate, during the first interactive gaming session, a first wager-based game event at the first EGD; establish an account balance using at least a portion of cash or credit received via the first bill or ticket acceptor; automatically fund an amount wagered on the first wager-based game event using the account balance; determine an event outcome of the first wager-based game event, the event outcome having associated therewith game event outcome content; display, at the first display and during the first interactive gaming session, wager-based game content depicting an in-game environment of the wager-based game; identify a first portion of advertising content for display as an in-game advertisement within the in-game environment of the wager-based game; and display, at the first display and during the first interactive gaming session, the first portion of advertising content as an in-game advertisement within the in-game environment of the wager-based game.

Additional method(s), system(s) and/or computer program product(s) may be further operable to cause at least one processor to execute instructions stored in the memory to enable the player to initiate an in-game interaction with the displayed in-game advertisement.

Additional method(s), system(s) and/or computer program product(s) may be further operable to cause at least one processor to execute instructions stored in the memory to: select the first portion of advertising content using at least one type of advertising selection criteria selected from a group consisting of: criteria relating to the player's gambling preferences; criteria relating to the player's spend amount over a given time interval; criteria relating to wager-based game session points or score; criteria relating to the player's skill level; and criteria relating to the player's historical financial transactions.

Additional method(s), system(s) and/or computer program product(s) may be further operable to cause at least one processor to execute instructions stored in the memory to: enable the player to initiate an in-game interaction with the displayed in-game advertisement; and automatically initiate a food or beverage order on behalf of the player in response to the player's-game interaction with the displayed in-game advertisement.

In at least some embodiments, the in-game advertisement corresponds to an in-game product placement advertisement. In some embodiments, the in-game advertisement corresponds to an in-game promotional advertisement.

Additional method(s), system(s) and/or computer program product(s) may be further operable to cause at least one processor to execute instructions stored in the memory to cause the first portion of advertising content to be displayed as a symbol of a virtual slot reel.

In some embodiments, the first EGD includes a first bill or ticket acceptor, and at least one processor may be configured or designed to execute instructions stored in the memory to: establish an account balance using at least a portion of cash or credit received via the first bill or ticket acceptor; and automatically fund an amount wagered on the first wager-based game event using the account balance.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this Patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Currently existing slot machine technology is dated and lacking younger demographics due to the same format of gambling gameplay element displays. Problems with existing slot machine and video-based casino gaming technology include: the gambling gameplay display method, and the player interaction method with the gambling game elements using a slot machine.

Veteran gamblers (e.g., older gambler demographic age 50+) have been accustomed to a standard set of video gaming symbols (e.g., A, J, K, Q) which, for example, may be accompanied with a multitude of additional themed symbols (e.g., animals, fantasy creatures, media personas, etc.) presented on a series of wheels or drums. Newer technology has made possible the use of digital display screens that present the reels and symbols in a digital format. Younger generations of gamblers (e.g., herein referred to as "garners"), on the other hand, have been accustomed to increasingly intense and graphically glorified 2D & 3D world environments where an untold amount of possibilities may arise. These gamers, who are used to fast paced, energetic, and visually stunning games, feel that the display method of the traditional slot machines are "boring." As for the veteran gamblers, they feel that the fast paced, new aged action, is "too much."

Veteran gamblers have experienced player interaction in a few different ways: (1) a pull lever (2) a spin button (3) interact with a touch screen. Gamers have experienced player interaction in dozens of different ways, such as, for example:

- gaming controllers (e.g., Nintendo, PlayStation, XBOX, Wii)
- PC HIDs (e.g., mouse, trackball, keyboard)
- joysticks
- shooting apparatuses
- head & body gear (e.g., Victormaxx, Power Glove)
- etc.

Much like the comparison between gamers and gamblers in regards to gambling gameplay display methods, the results are similar. The younger players are "bored" whereas the older players feel "intimidated."

In many existing casino venues, standard classic slot machines are deployed which include an electromagnetic mechanism with a "lever" interface device. Slot machines have also evolved using video screens and electronic push button interfaces, which are typically referred to as "Hybrid Machines" that use a combination of both the mechanical portion and video elements of both designs.

In light of the above, it may be desirable to create and/or implement "hybrid arcade/wager-based games" or "Gambling Arcade Games" which provide hybrid arcade-style, wager-based gaming techniques which may more suitably appeal to the Casino Gamer demographic. However, one significant obstacle regarding such hybrid arcade-style, wager-based gaming techniques is that they are often comprised of new/different and complex back end solutions that may require lengthy and costly processes of regulatory review and approvals in many different gaming jurisdictions.

One possible workaround to this significant obstacle is to configure/design a hybrid arcade-style, wager-based game such that it is compliant with currently approved wager-based gaming regulatory standards such as, for example, the well-known GLI standards, which have already been approved in various gaming jurisdictions. One example of a GLI standard is the GLI-11 standard version 3.0, Published Sep. 21, 2016 by Gaming Laboratories International, LLC, the entirety of which is herein incorporated by reference for all purposes.

For example, in one embodiment, a hybrid arcade-style, wager-based game may be configured or designed to provide an arcade-style gaming interface which enables a player to participate in an arcade-style game at the wager-based gaming machine. One or more events and/or activities performed by the player (e.g., during play of the arcade-style game) may automatically trigger an RNG wager-based event such as, for example, one or more of the following (or combinations thereof):

- the spinning of a virtual wager-based slot machine reel (e.g., which may be configured or designed to be compliant with the GLI standard(s));
- the spinning of a virtual wheel such as a roulette wheel or "Wheel-of-Fortune"™ wheel;

- the throwing/rolling of one or more dice;
- the dealing of one or more card(s);
- and/or other types of RNG-based video games of chance (preferably which have been configured or designed to be compliant gaming standards, rules and regulations).

Because the wager-based activities of the hybrid arcade-style, wager-based game comply with currently existing GLI standard(s) (and/or other national, regional, local gaming rules and regulations), such hybrid arcade-style, wager-based games may not require additional regulatory approval for deployment in Casino venues.

Some benefits and advantages of the hybrid arcade/wager-based gaming techniques described herein may include, but are not limited to, one or more of the following (e.g., or combinations thereof):

- Enabling the utilization of the same (e.g., proven/GLI approved) slot machine back end and RNG for gambling functionality.
- Enables new and unique ways to display a slot machine gambling game to specific demographics based on gameplay type and/or theme.
- May increase overall house gambling demographics, revealing untapped markets, more profits, more coinins & more "butts in seats."
- Hybrid arcade-style, wager-based games may be purposefully configured or designed to avoid (or to not require) any additional regulatory approval for deployment in Casino venues.
- Provides mechanisms to Casinos/gaming establishments for facilitating achievement of desired minimum wagering goals (e.g., over time), such as those established by Casinos (e.g., Casino desires at least one wager-based reel spin by a given player every 10 seconds).
- Etc.

In one embodiment, a hybrid arcade-style, wager-based game may be created by combining a new and different visual game representation with a new and different method of player interaction on a slot machine. The hybrid arcade-style, wager-based game may be configured or designed to provide the assemblage of graphical elements and gameplay features for portraying a visually different experience while also providing the enhanced method of player interaction via a particular Human Interface Device (e.g., HID), which is based on the theme/style of the visually enhanced gambling game. For example, the game "Duck Hunt" uses a gun controller where as "Super Mario Bros." utilizes a D-pad multi-button controller as the HID. According to different embodiments, either (or both) of these arcade-style video games may be adapted (e.g., using the hybrid arcade/wager-based gaming techniques described and/or referenced herein) to function as hybrid arcade/wager-based games. According to different embodiments, one or more hybrid arcade/wager-based game(s) may also be configured or designed to include one or more of the following (or combinations thereof): graphical elements (e.g., 2D and/or 3D) animations, sound effects, programming, etc.

In some embodiments, the format of the hybrid arcade-style, wager-based game may focus on "first person shooter" type, arcade-style games such as, for example, "House of the Dead," "Area 51", "Lethal Enforcers", etc. At least a portion of such games may feature a player character that automatically moves on a "rail" system (e.g., automatically moving the player's character through different scenes of the game, without requiring the player to provide input for moving his/her game character), which allows the player to concentrate his/her focus on shooting the targets which appear throughout gameplay.

The format of the hybrid arcade-style, wager-based game may also focus on other types of video and/or arcade-style games such as, for example, one or more of the following (e.g., or combinations thereof):

- "non-linear" (e.g., open world) type video and/or arcade-style games such as, for example, Grand Theft Auto
- "linear" type video and/or arcade-style games such as, for example, Half-Life
- Massively multiplayer online "MMO" type video and/or arcade-style games such as, for example, World of Warcraft
- Role-playing game "RPG" type video and/or arcade-style games such as, for example, Final Fantasy.

Such games may feature a player character that may be moved through the game world via player input, (e.g., HID), which allows for an increased sense of excitement through gameplay by providing a multitude of player-choice possibilities through a wide-array of path directions.

In some embodiments, the format of the hybrid arcade-style, wager-based game may facilitate a gameplay environment in which multiplayer functionality takes place. The multiplayer gameplay may have multiple "enrollment" aspects in which one, for example, particular player could be on location at a casino playing a hybrid arcade/wager-based game, while another (e.g., different) player could be at a different location (e.g., at a different location in the casino, at a different casino, at a different establishment such as a home or office, etc.), concurrently participating in the same hybrid arcade/wager-based game, but without participating in any wagering aspect/portions of hybrid arcade/wager-based game. A non-wagering game such as this is commonly known as a "free to play" game, in which the player is allowed to download and install said game on their own devices, which then allows the player progress through the game (e.g., which is no different than the wager based counter-part) without taking place in wager based events. Examples of some popular "free to play" games are, "TERA", "Marvel Puzzle Quest", "Planetside 2", etc. Gaming situations such as these may promote a "clicks to bricks" outcome where a casino property could promote at home users to "login over the weekend to play Super Zombie Bash! Free! Come down to the casino and play Super Zombie Bash for a chance to win big!" Such property advertisement may entice more patrons to visit the casino in order to "win big" on their favorite hybrid arcade/wager-based game.

In some embodiments, different players concurrently participating in the same hybrid arcade/wager-based game may each separately configure his/her respective wagering parameters/amounts, which may be different from the wagering parameters/amounts configured by other game player-participants.

The various hybrid arcade/wager-based gaming techniques described herein may be used to improve the visual relationship between player and machine to increase player immersion and facilitate longer more exciting gambling durations without providing a completely new back-end delivery structure. It also improves the player method of interaction with the gambling game by allowing for a plethora of new age interface devices to be coupled with specific themed games (e.g., guns, joysticks, controllers, etc.). Existing technology and gameplay, although proven, is becoming dated and "not as fun" to younger players. The hybrid arcade/wager-based gaming techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate. The hybrid arcade/wager-based gaming techniques described herein may also be utilized for enabling enhanced slot machine gambling with new and exciting twists, while still being compliant with local/state/Federal gaming regulations.

Walkthrough of Examples Hybrid Arcade/Wager-Based Game Embodiment(s)

The following example is intended to help illustrate some of the various types of functions, operations, actions, and/or other features which may be provided by the Hybrid Arcade/Wager-Based Gaming System. At least a portion of these various processes, procedures and activities may also be illustrated and described with respect to the flow diagrams of FIGS. 10-13.

Initially, it is assumed that a player (e.g., or players) engages with a hybrid arcade/wager-based gaming device via standard method (e.g., inserting monetary amount), selects gameplay and wagering options via button panel (e.g., different "characters" equal different bet/wager amounts e.g. 1 line vs 30 lines), "shoots" moving elements on the display (e.g., destroying a target qualifies as a triggering event for causing initiation of a wager-based event (e.g., initiating a wager-based spin of a virtual slot reel, which collects a specified amount of wagered credits), claims winnings/payouts (e.g., based on the outcome of the virtual slot reel spin), and continues to "shoot" until additional monetary amount is needed to continue play (e.g., out of credits) and/or until player is satisfied with gambling duration and decides to discontinue gameplay.

In some embodiments, the player character is on a "rail" (e.g., "House of the Dead", "Area 51", "Lethal Enforcers" one or more of which are classic arcade rail styled shooter games) which does not allow for free range of movement or choice of direction within the gaming environment (e.g., commonly referred to as "game world" or "game level").

The automated movement of the player's character is determined by the game's functionality and whether or not the player is actually playing (e.g., destroying zombies). By way of illustration, let's envision a short animated sequence—the player's mercenary character kicks down a door and enters a small maintenance room, Upon entering the room he stops to make sure the environment is safe to move on, however, 5 NPC's (e.g., Non Player Characters) heard the noise (e.g., from the door being kicked down) and have now surrounded the mercenary and are beginning to attack. Once the player character is in the room and surrounded, the rail movement (e.g., kicking down the door and walking into the room) stops. Once stopped, the player may use the game's HID (e.g., an electro-mechanical gun, which, for example, may be electronically tethered to the gaming device) to shoot and destroy the 5 NPC's.

According to different embodiments, one or more different types of gameplay-related triggering event(s)/condition(s) may be defined for initiating a wager-based event to occur during game play (e.g., execution of wager-based slot reel spin may take place concurrently with or simultaneously with the player's continued and active participation in the arcade-style portion of the game). Examples of different types of triggering event(s)/condition(s) may include, but are not limited to, one or more of the following (e.g., or combinations thereof):

- Pulling a trigger;
- Firing a shot with a gun or other weapon;
- Hitting a specified target;
- Destroying a specified virtual object;
- One or more character movements such as, for example, jumping, ducking, punching, hitting, running, sitting, etc.;
- An environmental object event, such as, for example, volcano eruption, avalanche, earthquake, or sci-fi/fantasy element (e.g., a strange alien world may harbor anti-matter pockets and/or worm-holes in space-time) and/or weather (e.g., "Lightning Strike" trigger);
- NPC or Boss event such as, for example, a mage or magic wielding character casting a specific spell (e.g., Fire Flare bonus round), a boss summoning a group of minions during a battle (e.g., Golden Goblin minions with multipliers);
- Predetermined outcome via host application such as, for example, a property may "credit/reward" a specific patron by triggering an event (e.g., "Hot Seat bonus" etc.), and/or may initiate an event based on a situation deemed necessary for triggering such an event. (e.g., See, e.g., 1208, FIG. 12);
- A multiplayer and/or team and/or co-op event (e.g., similar to other embodiments described and/or referenced herein) in occurrence with multiple players and situations thereof;
- And/or other types of event(s)/condition(s) may be defined for initiating a wager-based event to occur during game play.

Examples of different types of wager-based gaming events which may be initiated may include, but are not limited to, one or more of the following (e.g., or combinations thereof):

- spin of virtual slot reel (e.g., based on RNG)
- spin of roulette wheel
- throw of dice
- dealing of one or more cards
- pick & choose/find hidden item
- scramble elements/find hidden item
- "scratch off"/reveal hidden item
- a pachinko round
- "virtual" carnival/parlor events/spin of a wheel, etc.
- and/or other types of wager-based gaming events (e.g., or wager-based games) known in the art and/or described and/or referenced herein.

In at least one embodiment, it is preferable that the gameplay-related triggering event(s)/condition(s) (e.g., for triggering initiation of a wager-based event to occur) relates to an event which repeatedly occurs during the player's active participation in the arcade-style portion of the game, such as, for example: pulling of a trigger, firing of a weapon, hitting an object/target, destroying and object, etc.

For example, in one embodiment, each time the player fires a shot (e.g., by pulling a trigger of the gun-HID device) during play of the arcade portion of the hybrid game, the system may automatically initiate a wager-based spin of a virtual slot reel. In other embodiments, each time the player destroys a specified target (e.g., destroys a zombie) during play of the arcade portion of the hybrid game, the system may automatically initiate a wager-based spin of the virtual slot reel.

In some embodiments, the hybrid arcade/wager-based game may be configured or designed as a "rail movement"

type game, where the player's character is automatically moved through various scenes of the game (e.g., as if the player's character were riding on an automated rail or transport). Rail movement advances the player's character into next game world location. The rail movement durations may be short, as to not interfere with quickly repetitive and continuous shoot/spin gameplay situations. In some embodiments, there may be stopping points of play as well as regulated movement intervals which comply with then current gambling regulations and/or local casino gaming requirements/preferences (e.g., casino may deem it desirable that play of the hybrid arcade/wager-based game achieves at least 8 spins of virtual slot reel per minute). In at least some embodiments, the hybrid arcade/wager-based game may also be configured or designed to take into account standard slot game feature transition times, bonus round intro's, wild animations, etc., when determining rail movements and sequence zones.

In some embodiments, if the player decides not to shoot or destroy the Non Player Characters ("NPCs"), the NPC's may eventually destroy the player character. In at least one embodiment, when this occurs, the player character may automatically rejuvenate (e.g., come to life again), and the player may be provided with additional opportunities to destroy the NPC's at the current visual gaming location (e.g., level), before being allowed to proceed to the next level. Thus it will be appreciated that, in at least some embodiments, the hybrid arcade/wager-based game may be configured or designed to provide a minimal/no cost of failure (e.g., as compared with traditional arcade-style video games where loss of lives/credits=game over). Such techniques provide an advantage of allowing a player to temporarily depart from the game (e.g., to order a drink, have a smoke, etc.) as a traditional slot player might do. During such moments, play of the hybrid arcade/wager-based gaming device may be considered to be in an idle state. However, in some embodiments, even though the hybrid arcade/wager-based game may provide idle benefits, the game may continue to display or impart a visual sense of urgency to promote/stimulate gameplay (e.g., zombies continue to attack player character during idle game state).

According to different embodiments, different hybrid arcade/wager-based games may be configured or designed to include at least one arcade-style game play portion and at least one wager-based game play portion. Examples of various arcade-style games or arcade-style themes which may be used in implementing the arcade-style game play portion of the hybrid arcade/wager-based game may include, but are not limited to, one or more of the following (or combinations thereof):

- "First person shooter" type, arcade-style games such as, for example, "House of the Dead," "Area 51", "Lethal Enforcers".
- "Non-linear" (e.g., open world) type video and/or arcade-style games such as, for example, Grand Theft Auto.
- "Linear" type video and/or arcade-style games such as, for example, Half-Life.
- Massively multiplayer online "MMO" type video and/or arcade-style games such as, for example, World of Warcraft.
- Role-playing game "RPG" type video and/or arcade-style games such as, for example, "Final Fantasy".
- Racing/Driving arcade style game(s) (e.g., Cars, boats, planes etc.).
- Sports-themed arcade style game(s) (e.g., Football, Baseball, downhill skiing, etc.).
- Challenge arcade style game(s) (e.g., Archery, Darts, Hunting, Shooting, etc.).
- Recreation arcade style game(s) (e.g., Horseshoes, Croquet, Fishing etc.).
- TV-themed arcade style game(s).
- And/or other types of arcade-style games.

Examples of various wager-based games or wager-based themes which may be used in implementing the wager-based game play portion of the hybrid arcade/wager-based game may include, but are not limited to, one or more of the following (or combinations thereof):

- Spin of virtual slot reel (e.g., based on RNG). Examples of these types of wager-based games of chance include the RNG-based virtual slot games.
- Throw of virtual dice. An example of this type of wager-based game of chance includes the RNG-based virtual dice game.
- Spin of a virtual roulette wheel or other type of wheel (such as, for example, "Wheel of Fortune"). Examples of these types of wager-based games of chance include the RNG-based virtual roulette game, and the RNG-based "Wheel of Fortune" game.
- Dealing of one or more virtual cards.
- Pick & choose/find hidden item.
- Scramble elements/find hidden item.
- "Scratch off"/reveal hidden item.
- A pachinko-type game.
- A bingo-type game.
- "Virtual" carnival/parlor events/spin of a wheel, etc.
- And/or other types of RNG-based games of chance known in the art and/or described and/or referenced herein.

According to different embodiments, different types of electronic gaming machine cabinets may be configured with different human interface devices ("HIDs") for enabling players/participants to engage in one or more of the hybrid arcade/wager-based gaming activities described and/or referenced herein. Examples of different human interface devices ("HIDs") may include, but are not limited to, one or more of the following (or combinations thereof):

- Touchscreen interfaces
- Mechanical Buttons
- Gun, Pistol, Shooting Device
- Mechanical Joystick
- Gaming Controller such as, for example, remote gaming controllers similar to those used for X-Box™ Playstation™, Wii™, etc.
- Mechanical vehicle components such as, for example, vehicle steering wheel, gear shift, gas pedal, brake pedal, clutch pedal, etc.
- And/or other types of HIDs described and/or referenced herein and/or commonly known.

Example Hybrid Arcade/Wager-Based Game GUIs and Procedures

FIGS. 10-13 illustrate various example embodiments of different Hybrid Arcade/Wager-Based Gaming procedures and/or procedural flows which may be used for facilitating activities relating to one or more of the Hybrid Arcade/Wager-Based Gaming aspects disclosed herein.

Figure 15:
FIG. 15 illustrates an example screenshot of a hybrid arcade/wager-based game GUI which may be used for facilitating activities relating to one or more of the Hybrid Arcade/Wager-Based Gaming aspects disclosed herein. In at least one embodiment, at least a portion of the GUIs may be configured or designed for use at one or more mobile devices and/or at one or more casino gaming machines.

FIG. 15 illustrates an example screenshots of a hybrid arcade/wager-based game GUIs which may be used for facilitating activities relating to one or more of the Hybrid Arcade/Wager-Based Gaming aspects disclosed herein. In at least one embodiment, at least a portion of the GUIs may be configured or designed for use at one or more mobile devices and/or at one or more casino gaming machines.

According to different embodiments, at least a portion of the various types of functions, operations, actions, and/or other features provided by the Hybrid Arcade/Wager-Based Gaming Procedures of FIGS. 10-13 may be implemented at one or more client systems(s), at one or more System Servers (s), and/or combinations thereof.

In at least one embodiment, one or more of the Hybrid Arcade/Wager-Based Gaming procedures may be operable to utilize and/or generate various different types of data and/or other types of information when performing specific tasks and/or operations. This may include, for example, input data/information and/or output data/information. For example, in at least one embodiment, the Hybrid Arcade/Wager-Based Gaming procedures may be operable to access, process, and/or otherwise utilize information from one or more different types of sources, such as, for example, one or more local and/or remote memories, devices and/or systems. Additionally, in at least one embodiment, the Hybrid Arcade/Wager-Based Gaming procedures may be operable to generate one or more different types of output data/information, which, for example, may be stored in memory of one or more local and/or remote devices and/or systems. Examples of different types of input data/information and/or output data/information which may be accessed and/or utilized by the Hybrid Arcade/Wager-Based Gaming procedures may include, but are not limited to, one or more of those described and/or referenced herein.

In at least one embodiment, a given instance of the Hybrid Arcade/Wager-Based Gaming procedures may access and/or utilize information from one or more associated databases. In at least one embodiment, at least a portion of the database information may be accessed via communication with one or more local and/or remote memory devices. Examples of different types of data which may be accessed by the Hybrid Arcade/Wager-Based Gaming procedures may include, but are not limited to, one or more of those described and/or referenced herein.

According to specific embodiments, multiple instances or threads of the Hybrid Arcade/Wager-Based Gaming procedures may be concurrently implemented and/or initiated via the use of one or more processors and/or other combinations of hardware and/or hardware and software. For example, in at least some embodiments, various aspects, features, and/or functionalities of the Hybrid Arcade/Wager-Based Gaming procedures may be performed, implemented and/or initiated by one or more of the various systems, components, systems, devices, procedures, processes, etc., described and/or referenced herein.

According to different embodiments, one or more different threads or instances of the Hybrid Arcade/Wager-Based Gaming procedures may be initiated in response to detection of one or more conditions or events satisfying one or more different types of minimum threshold criteria for triggering initiation of at least one instance of the Hybrid Arcade/Wager-Based Gaming procedures. Various examples of conditions or events which may trigger initiation and/or implementation of one or more different threads or instances of the Hybrid Arcade/Wager-Based Gaming procedures may include, but are not limited to, one or more of those described and/or referenced herein.

According to different embodiments, one or more different threads or instances of the Hybrid Arcade/Wager-Based Gaming procedures may be initiated and/or implemented manually, automatically, statically, dynamically, concurrently, and/or combinations thereof. Additionally, different instances and/or embodiments of the Hybrid Arcade/Wager-Based Gaming procedures may be initiated at one or more different time intervals (e.g., during a specific time interval, at regular periodic intervals, at irregular periodic intervals, upon demand, etc.).

In at least one embodiment, initial configuration of a given instance of the Hybrid Arcade/Wager-Based Gaming procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Hybrid Arcade/Wager-Based Gaming procedures may correspond to and/or may be derived from the input data/information.

For purposes of illustration, an example walk-through of a specific embodiment of a hybrid arcade/wager-based game will now be described by way of example with reference to the FIGS. 10-13.

It is to be noted that, although various process steps, method steps, algorithms or the like may be described in a sequential order, such processes, methods and algorithms may be configured to work in alternate orders. Accordingly, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

Figure 10:
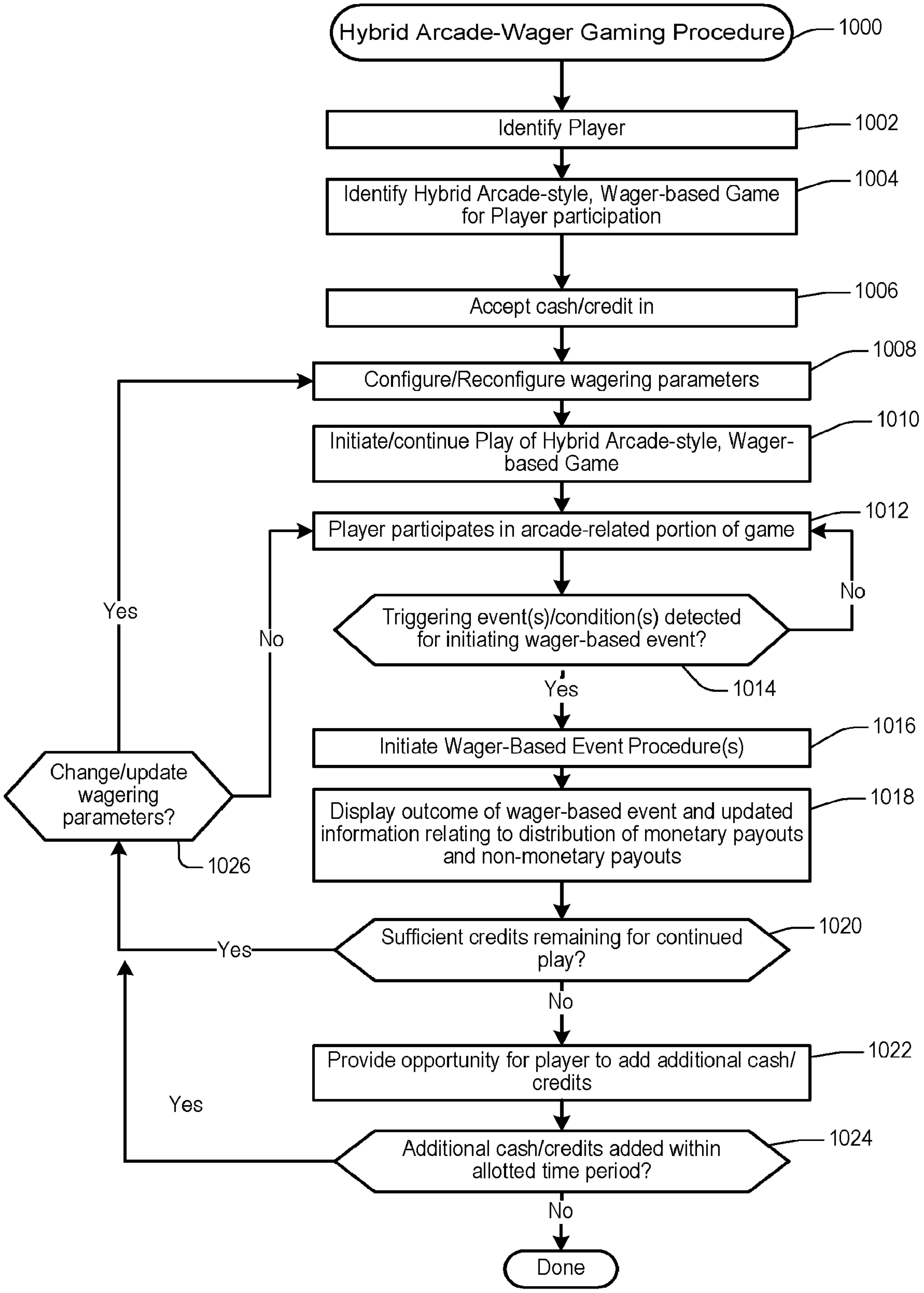
FIGS. 10-13 illustrate various example embodiments of different computer-implemented gaming procedures and/or procedural flows which may be used for facilitating activities relating to one or more of the hybrid arcade/wager-based gaming aspects disclosed herein.

FIG. 10 shows an illustrative example of an embodiment of a Hybrid Arcade-Wager Gaming Procedure 1000. As illustrated in the example embodiment of FIG. 10, the Hybrid Arcade-Wager Gaming Procedure may facilitate, enable, initiate, and/or perform one or more of the following operation(s), action(s), and/or feature(s) (or combinations thereof):

- Identify Player 1002.
- Identify Hybrid Arcade-style, Wager-based Game for Player participation 1004.
- Accept cash/credit in 1006.
- Configure/Reconfigure wagering parameters 1008. Reconfigure wagering parameters during continued game play, if desired
- Initiate/continue Play of Hybrid Arcade-style, Wager-based Game 1010. Continue play of game (if start of game already initiated).
- Player participates in arcade-related portion of game 1012, which corresponds to the non-wager based portion of the hybrid arcade/wager-based game.
- Triggering event(s)/condition(s) detected for initiating wager-based event? For example:
  - NPC hit/destroyed?
  - NPC damaged by player's character?
  - Wagering Object collected by player's character?
  - Achievement satisfied or accomplished in non-wager-based portion of game?
  - Other type of wager-based triggering event detected?
- If yes to 1014, Initiate Wager-Based Event Procedure(s) 1016, such as those described with respect to FIG. 11. By way of illustration:

Initiate wager-based virtual slot reel spin in response to successful NPC hit/destruction.

Initiate wager-based virtual slot reel spin in response to Player's character collecting "Wagering Ring" or "Gold Award Object".

Initiate wager-based virtual slot reel spin in response to player achieving an objective in the non-wager-based portion of the hybrid arcade/wager-based game.

Display outcome of wager-based event and updated information relating to distribution of monetary payouts and non-monetary payouts.

Display outcome of wager-based event and updated information relating to distribution of monetary payouts and non-monetary payouts 1018. e.g., Display outcome of virtual slot reel spin and update player's credits based on payout from virtual slot reel spin. In some embodiments, depending upon the wager-based game event outcome, one or more non-monetary payouts may also be distributed (e.g., within the non-wager-based portion of the hybrid arcade/wager-based game).

Sufficient credits remaining for continued play of hybrid arcade/wager-based game 1020?

If yes to 1020, change/update wagering parameters 1026?

If no to 1020, provide opportunity for player to add additional cash/credits 1022.

Additional cash/credits added within allotted time period 1024?

If yes to 1024, present opportunity to change wager parameters 1026, and continue game play 1012.

If no to 1024, end player's participation in hybrid arcade/wager-based game.

Figure 11:
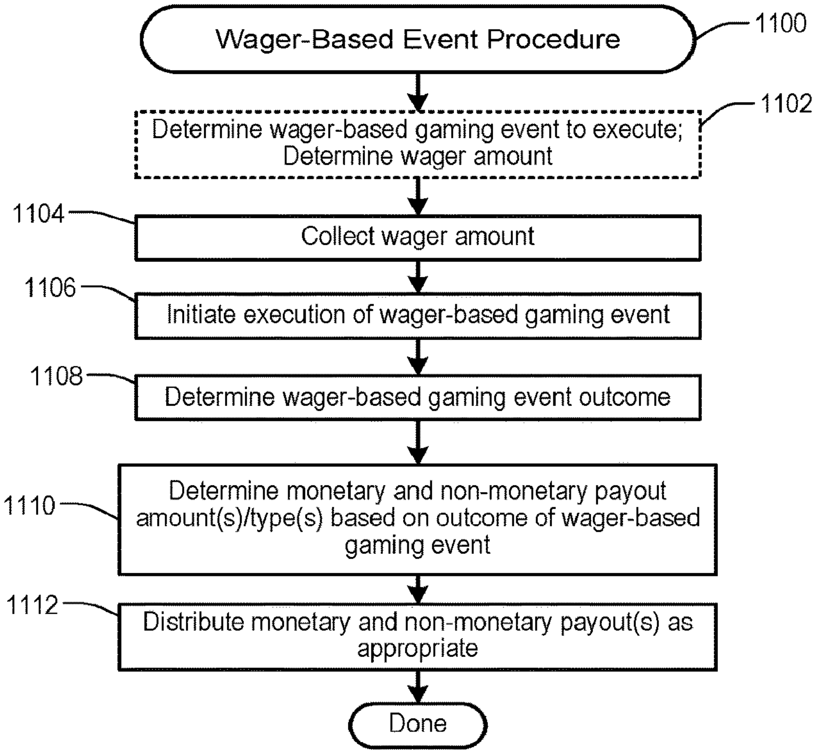

FIG. 11 shows an illustrative example of a Wager-Based Event Procedure 1100 in accordance with a specific example embodiment. In at least one embodiment, the Wager-Based Event Procedure 1100 may be initiated or implemented concurrently during hybrid arcade/wager-based game play, allowing player to seamlessly continue arcade-style game play while wagering event is executed and outcome determined. As illustrated in the example embodiment of FIG. 11, the Wager-Based Event Procedure may facilitate, enable, initiate, and/or perform one or more of the following operation(s), action(s), and/or feature(s) (or combinations thereof):

Determine wager-based gaming event to execute, and determine wager amount(s) 1102.

Collect wager amount 1104. For example, collect one credit.

Initiate execution of wager-based gaming event 1106. For example, initiate spin of RNG-based virtual slot reels.

Determine wager-based gaming event outcome 1108. For example, determine outcome of virtual slot reel spin.

Determine monetary and non-monetary payout amount(s)/type(s) (if any) based on outcome of wager-based gaming event 1110. According to different embodiments, depending on the wager-based game event outcome, monetary payouts and/or non-monetary-payouts may be identified for distribution.

Distribute monetary and non-monetary payout(s) as appropriate 1112. For example, distribute any monetary payout(s) (e.g., credits) and/or non-monetary payouts due to player based on outcome of virtual slot reel spin.

Figure 13:
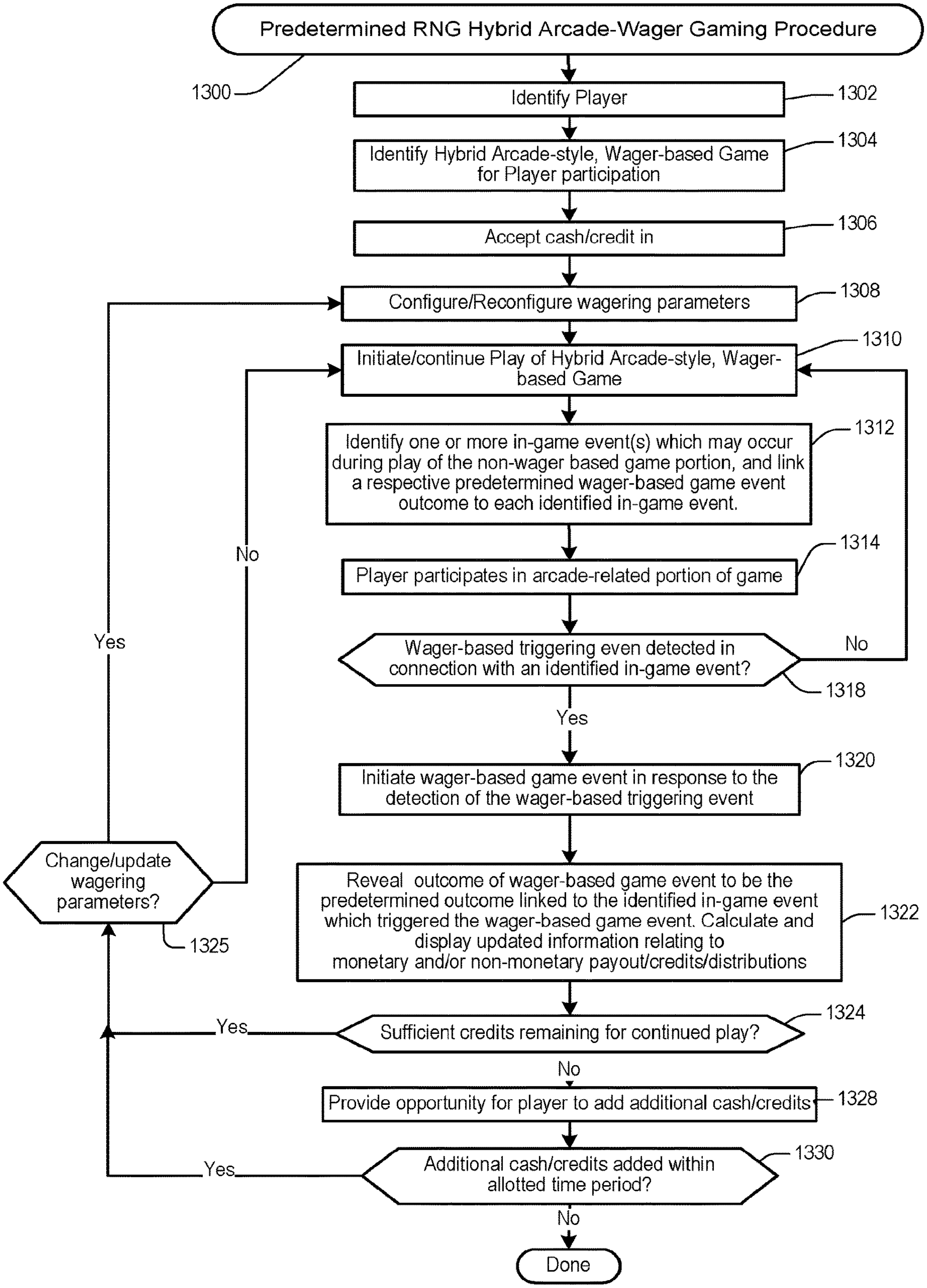

FIG. 13 shows an illustrative example of a Predetermined RNG Hybrid Arcade-Wager Gaming Procedure 1300 in accordance with a specific example embodiment. As illustrated in the example embodiment of FIG. 13, the Predetermined RNG Hybrid Arcade-Wager Gaming Procedure may facilitate, enable, initiate, and/or perform one or more of the following operation(s), action(s), and/or feature(s) (or combinations thereof):

Identify Player 1302.

Identify Hybrid Arcade-style, Wager-based Game for Player participation 1304.

Accept cash/credit in 1306.

Configure/Reconfigure wagering parameters 1308. Reconfigure wagering parameters during continued game play, if desired Initiate/continue Play of Hybrid Arcade-style, Wager-based Game 1310. Continue play of game (if start of game already initiated).

Identify one or more in-game event(s) which may occur during play of the non-wager based game portion, and link a respective predetermined wager-based game event outcome to each identified in-game event 1312. In at least one embodiment, this may involve generating or acquiring a respective, predetermined outcome (e.g., RNG-based outcome) for one or more identified in-game event(s). For example, in the zombie-themed hybrid arcade/wager-based game, each spawned NPC may have associated therewith a respective RNG-based game of chance outcome, which has been determined before the initiation of the associated RNG-based game of chance (e.g., before spin of virtual slot reels), and which has been determined before a wager-based triggering event has occurred in association with that particular NPC. However, in at least some embodiments, the hybrid arcade/wager-based game may be configured or designed to prevent the player from being aware that the outcome of the wager-based game of chance has been predetermined. In such embodiments, even though the outcome of the wager-based game of chance has been predetermined, the hybrid arcade/wager-based game may be configured or designed to lead the player to believe that the outcome of the wager-based game of chance was determined after the occurrence of the wager-based triggering event, and subsequent execution of the wager-based game of chance.

Player participates in arcade-related portion of game 1314, which corresponds to the non-wager based portion of the hybrid arcade/wager-based game.

Wager-based triggering event detected in connection with an identified in-game event 1318? For example, in at least one embodiment, the gaming device may be configured or designed to monitor activities in the entertainment portion (e.g., non-wager-based portion) of the hybrid arcade/wager-based game for occurrences of in-game event(s) which qualify as wager-based triggering event(s). In one embodiment, if an occurrence of an in-game event is detected, the gaming device may determine whether or not the occurrence of the detected in-game event qualifies as a wager-based triggering event. For example, the killing or destruction of an NPC in a zombie-themed hybrid arcade/wager-based game may correspond to an in-game event which qualifies as a wager-based triggering event.

If it is determined that the occurrence of the first in-game event qualifies as a wager-based triggering event, the gaming device may initiate 1320 a wager-based game event in response to the occurrence or detection of the wager-based triggering event. For example, in at least one embodiment, when a wager-based triggering event occurs in the arcade (e.g., non-wager-based) portion of the hybrid arcade/wager-based game, the hybrid arcade/wager-based game may respond by automatically initiating a wager-based game event such as, for example, initiating wager-based spin of a set of virtual slot reels. In at least one embodiment, the process of initiating a wager-based game event may include:

- automatically identifying an amount to be wagered on the outcome of the wager-based game event; and
- automatically using funds from the player's account to initiate and fund a wager (for the identified wager amount) on the outcome of the wager-based game event.

Reveal outcome of wager-based game event to be the predetermined outcome linked to the identified in-game event which triggered initiation of the wager-based game event. Calculate and display updated information relating to monetary and/or non-monetary payouts/credits/distributions (if any).

Sufficient credits remaining for continued play of hybrid arcade/wager-based game 1824?

If yes to 1324, change/update wagering parameters 1325?

If no to 1324, provide opportunity for player to add additional cash/credits 1328.

Additional cash/credits added within allotted time period 1330?

If yes to 1330, present opportunity to change wager parameters 1325, and continue game play 1310.

If no to 1330, end player's participation in hybrid arcade/wager-based game.

In at least some embodiments where hybrid arcade/wager-based games are deployed in casino/regulated environments in which voluntary and/or mandatory rules/regulations are imposed (e.g., based on GLI standards, specific jurisdiction rules/regulations, and/or casino rules/regulations), one or more mechanisms may be implemented (see, e.g., FIG. 12) to cause wager-based game events to be initiated or triggered in a manner which conforms with governing rules/regulations. For example, according to different embodiments, a hybrid arcade/wager-based game may be configured or designed to automatically create conditions for a wager-based triggering event to occur in situations where there is lack of player input while credits are present, and gameplay is expected. In other embodiments, one or more hybrid arcade/wager-based games may be configured or designed to automatically cause wager-based game events to be initiated or triggered in accordance with specifically defined rules and/or criteria such as, for example, one or more of the following (or combinations thereof):

- One wager-based event (e.g., virtual reel spin) about every 10 seconds (or sooner);
- 6 wager-based events (e.g., 6 separate reel spins) w/in 30 seconds);
- 10 wager-based events (e.g., 10 separate reel spins) during each level of game play);
- Etc.

Additionally, in at least some embodiments, a player character's game world movement may be automatically controlled or influenced (e.g., via rail style, programmatically controlled gameplay destination paths, predetermined (and/or player-selectable) gameplay destination paths, etc.) to cause, satisfy, or achieve one or more identified or predefined goals/objectives. At least a portion of such goals/objectives may be defined by or generated by the hybrid arcade/wager-based game software and/or by local rules/regulations governing play of the hybrid arcade/wager-based game (e.g., in contrast to goals/objectives defined by the player). Additionally, in at least some embodiments, a player character's game world movement may also be automatically controlled or influenced so as to avoid the need for player input, and/or so as to avoid the need for providing specific HID hardware. For example, in one embodiment, a player character's game world movement may be automatically controlled or influenced in a manner which enables the player to interact with the gameplay elements via existing gaming cabinet hardware such as, for example, button panels, touchscreens, etc. In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., to thereby cause the game to be in conformance with standards governing the occurrence of wager-based game events, which may be imposed by local rules/regulations).

Figure 12:
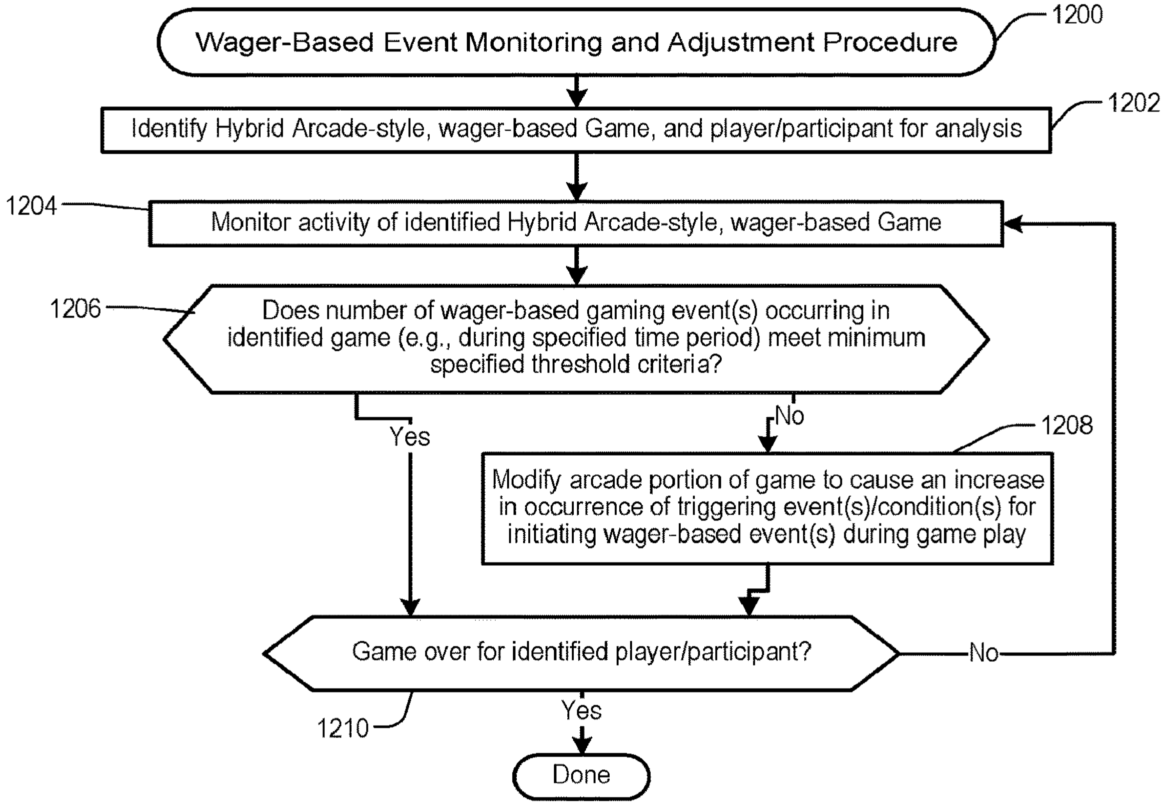

FIG. 12 shows an illustrative example of a Wager-Based Event Monitoring and Adjustment Procedure 1200 in accordance with a specific example embodiment. As illustrated in the example embodiment of FIG. 12, the Wager-Based Event Monitoring and Adjustment Procedure may facilitate, enable, initiate, and/or perform one or more of the following operation(s), action(s), and/or feature(s) (or combinations thereof):

Identify Hybrid Arcade-style, wager-based Game, and player/participant for analysis 1202.

Monitor activity of identified Hybrid Arcade-style, wager-based Game 1204.

Does number of wager-based gaming event(s) occurring in identified game (e.g., during specified time period) meet minimum specified threshold criteria 1206?

If no to 1206, modify arcade portion of game to cause an increase in occurrence of triggering event(s)/condition(s) for initiating wager-based event(s) during game play 1208. For example, in one embodiment, a minimum specified threshold criteria may be configured by the Casino such as, for example, one or more of the following (or combinations thereof):

- One wager-based event (e.g., virtual reel spin) about every 10 seconds (or sooner);
- 6 wager-based events (e.g., 6 separate reel spins) w/in 30 seconds);
- 10 wager-based events (e.g., 10 separate reel spins) during each level of game play);
- Etc.

If yes to 1206, game over for identified player/participant 1210?

If no to 1210, continue to monitor activity of identified hybrid arcade-style, wager-based Game 1204.

In a case where such games are featured in a casino/regulated environment, there may be a need to initiate or trigger a gambling event based on (e.g., GLI standards and/or specific jurisdiction guidelines) "lack of player input while credits are present and gameplay is expected" (e.g., 1208, FIG. 12). Also, a player characters game world movement may be automatically controlled (e.g., rail style and/or programmatically controlled predetermined (e.g., and/or selectable) gameplay destination paths) as to not facilitate the need for a specific HID, wherein the player could interact with the gameplay elements via current methods (e.g., button panel and/or touchscreen). In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., conforming to regulatory spins per minute).

FIG. 15 shows a screenshot of an example embodiment of a Hybrid Arcade/Wager-Based Game GUI 1500 which may be used for facilitating game play and wagering activities relating to one or more of the hybrid arcade/wager-based gaming aspects disclosed herein. More specifically, FIG. 15 shows an example screenshot of hybrid arcade/wager-based game GUI based on concept of a first person shooter zombie game.

In the specific example embodiment of FIG. 15 it is assumed that the hybrid arcade/wager-based game corresponds to a first person shooter zombie game. According to different embodiments, the Hybrid Arcade/Wager-Based Game GUI 1500 may be configured or designed to display graphics, animation, images, video, text, and/or other types of content such as, for example, one or more of the following (or combinations thereof):

- Player character/avatar content (e.g., 1512). As illustrated in the example embodiment of FIG. 15, this may include an image of the character, a description of the character (e.g., Class A Merc.), and other characteristics associated with the character such as, for example, character classification, skill level, strength, speed, power, knowledge, weapons, bet/wager multiplier value (e.g., 30× per kill), etc.
- Wagering content (e.g., 1514). In the specific example embodiment of FIG. 15, the wagering content 1514 includes a wager value (e.g., $0.01) representing an amount to be automatically wagered for each wager-based event which occurs during play of the hybrid arcade/wager-based game.
- Player credit information (e.g., 1516, 1524, 1522). In the specific example embodiment of FIG. 15, a first portion of player credit information 1524 may indicate recent credit(s) (e.g., "+4,720") awarded to the player (e.g., based on recent wager-based event), and a second portion of player credit information 1516 may indicate the player's current amount of total credits (e.g., 106, 320 credits).
- Wager-based event outcome information (e.g., 1522). In the specific example embodiment of FIG. 15, the wager-based event outcome information 1522 shows an amount of credits awarded to the player based on the most recent wager-based game event which was initiated and executed during play of the hybrid arcade/wager-based game.
- Player character health status information (e.g., 1542).
- Player character ammunition status information (e.g., 1544).
- Player score information (e.g. 1530, 1532). In at least one embodiment, a first portion of player score information 1530 may represent the player's current total score achieved during the hybrid arcade/wager-based game play session. In at least one embodiment, a second portion of player score information 1532 may represent the player's score or award which has been awarded to the player based on a game play event activity and/or outcome achieved during the hybrid arcade/wager-based game play session.
- Scene/Background Graphics (e.g., 1529)
- NPC graphics/content (e.g., 1528)

In the specific example embodiment of FIG. 15, a classic styled slot game (e.g., 1520) comprising 3 virtual slot reels is displayed, and configured or designed to offer a 1 line setup. In the specific example embodiment of FIG. 15, the hybrid arcade/wager-based game is configured or designed to use different player characters (e.g., "mercenaries", 1512) as bet multipliers. For example, as illustrated in the example embodiment of FIG. 15, the player may use the gaming device button panel to choose a wager amount "weapon" or "character" to use, say, an armored mercenary game character (e.g., 1512, FIG. 15) wielding a shotgun (e.g., equivalent to a 30 line max bet). A bet multiplier of "30" (e.g., 30×) is associated with Class A Mercenary character 1512. Additionally, as illustrated in the example embodiment of FIG. 15, the wagering denomination is $0.01 (e.g., 1514). Accordingly, since the selected game character/weapon (e.g., 1512) is configured to correspond to a 30× wager of the wagering denomination, this is equivalent to a $0.30 wager per kill (e.g., a $0.30 wager per kill of each NPC). Thus, for example, in the specific example embodiment of FIG. 15, when the player destroys NPC 1529, this event may qualify as a wager-based triggering event, which may cause the gaming machine to automatically place and initiate (using the player's funds) a $0.30 wager at the wager-based portion of the game (e.g., $0.30 wager automatically initiated at the slot game 1520). In some embodiments, the wager-based portion of the game is implemented as a RNG-based game of chance (e.g., such as a slot reel spin, roulette wheel spin, dice roll, etc.). In some embodiments, the outcome of the wager-based game event is determined after the wager-based triggering event has occurred. In other embodiments, as described in greater detail herein, the outcome of the wager-based game event is determined before the wager-based triggering event has occurred, but not revealed until after the wager-based triggering event has been initiated. In the specific example embodiment of FIG. 15, it is assumed that the outcome of the wager-based slot game 1520 results in the player winning 4,720 credits (1122), which may be automatically distributed to the player's account. In at least some embodiments, credits won by the player during play of the hybrid arcade/wager-based game may be converted into cash or other forms of monetary currency or credit.

In-Game Advertising, Product Placement, Promotional Techniques Implemented Wager-Based Gaming Environments Most casino operators derive a significant portion of their overall revenue from revenue generated from the wagers placed at the casino's wager-based gaming machines. Typically, for reasons relating to regulatory compliance and security, many of the casino's electronic wager-based gaming machines are only permitted to be communicatively coupled to a secure and proprietary gaming network deployed at the casino establishment. Additionally, for reasons relating to regulatory compliance and security, many casino gaming networks are specifically configured or designed to prohibit or restrict the casino's electronic wager-based gaming machines from communicating with, or being accessible to, external networks such as, for example, the Internet or World Wide Web. Due in part to these security requirements and design constraints, there exists little or no incentive for motivating gaming machine manufacturers to incorporate banner advertising functionality or other types of online advertising functionality into their wager-based gaming machine designs.

However, as described in greater detail below, by employing one or more of the in-game advertising/product placement techniques described herein, wager-based gaming machines may be configured or designed to provide additional functionality for enabling various types of IAPP features such as, for example:

- In-game advertising in wager-based games;
- In-game product placement in wager-based games;
- In-game promotions in wager-based games;
- Etc.

As described in greater detail below, one of the advantageous aspects of the IAPP techniques described herein relates to the ability to display dynamically generated in-game advertising content, product placement content, and/or promotional content which is seamlessly displayed within a wager-based game environment in a manner which enables it appear as though such displayed content is part of the gaming environment. In this way, in game advertising and product placement content may be displayed to players during the wager-based game session without distracting the attention of the player from the game itself.

By way of illustration, using a hybrid arcade/wager-based game (e.g., Zombie$ rail shooter game) as an example, as the player character travels through the game world, various advertising and/or product placement opportunities may present themselves, such as, for example, billboards seen while traveling through an abandoned city. Example hybrid arcade/wager-based game screenshot embodiments illustrating various aspects of this IAPP technique are shown in FIGS. 16, and 20-24.

FIGS. 16-32 illustrate various example screenshot embodiments of different graphical user interfaces (GUIs) which may be used to facilitate, initiate and/or perform various operation(s) and/or action(s) relating to one or more of the IAPP techniques described herein.

Figure 16:
FIGS. 16-32 illustrate various example screenshot embodiments of different graphical user interfaces (GUIs) which may be used to facilitate, initiate and/or perform various operation(s) and/or action(s) relating to one or more of the in-game advertising, product placement, promotion techniques described herein.

FIG. 16 shows an example screenshot 1600 of a first-person shooter type hybrid arcade/wager-based game environment 1610. In the specific example embodiment of FIG. 16, the identity (e.g., Player A) and uniform color of the player's in-game character (e.g., red) is indicated by the content displayed at 1602. As the player's character navigates through the game world 1610, various advertising and/or product placement opportunities may present themselves. For example, as illustrated in the example embodiment of FIG. 16, a portion of the virtual game world may include a billboard 1620, which displays a dynamically generated in-game advertisement 1622 (e.g., Coors Light).

In some embodiments, the displayed advertising content (e.g., 1622) may be acquired from a remote system such as, for example, an ad server residing within a casino establishment's secure gaming network. In other embodiments, the displayed advertising content may be acquired from a remote ad server which is external to the casino establishment's secure gaming network.

In some embodiments, at least a portion of the displayed advertising content may be acquired in advance (e.g., non-real-time) and cached locally in the memory of a wager-based game. In some embodiments, other portions of the displayed advertising content may be acquired in real-time or near real-time for dynamic display within the gaming environment of a wager-based game.

Figure 20:
Figure 21:

In some embodiments, the advertisements displayed within the game world of a wager-based game may be configured or designed to change periodically, in accordance with specifically defined display rules, which, for example may be used to define guidelines governing which particular portions of advertising content are to be displayed at which wager-based gaming devices, at what time, in what sequence, and at which locations within the game worlds of one or more wager-based games. An example embodiment of this feature is illustrated in the example screenshots of FIGS. 20 and 21. FIGS. 20 and 21 show example screenshots of a first-person shooter type hybrid arcade/wager-based game environment 2010. As the player's character navigates through the game world or game environment 2010 during time interval T1, a first in-game ad 2022 is displayed at virtual billboard 2020, as illustrated in FIG. 20. As the player's character navigates through the game world 2010 during a different time interval T2, a second in-game ad 2122 is displayed at virtual billboard 2020, as illustrated in FIG. 21.

In multi-player wager-based games, two or more players that are concurrently viewing the same game world scene of a live (e.g., in real-time), wager-based game may have different in-game ad content displayed in each player's respective in-game scene. An example scenario of this feature may be illustrated using the example screenshots of FIGS. 16 and 20. In this example scenario, it is assumed that two players (e.g., Player A, and Player B) are each concurrently participating in a multi-player wager-based game via different, respective wager-based gaming devices. Player A is participating in the multi-player wager-based game via wager-based gaming device A, which is configured or designed to display the game world 1610 as reflected in FIG. 16. Player B is participating in the multi-player wager-based game via wager-based gaming device B, which is configured or designed to display the game world 2010 as reflected in FIG. 20. It is further assumed in this example scenario that both players are concurrently viewing the same scene of the wager-based game world. As illustrated in the example screenshot of FIG. 16, a first ad (e.g., including a first portion of advertising content 1622) is displayed at the virtual billboard of Player A's game world 1610; whereas in the example screenshot of FIG. 20, a different ad (e.g., including a second portion of advertising content 2022) is displayed at the virtual billboard of Player B's game world 2010

In at least one multiplayer wager-based game embodiment, each player may engage in wager-based gameplay via his or her respective wager-based gaming device. Each player's wager-based gaming device may be configured or designed to display customized or targeted in-game advertising content based on player/patron data, demographic data, and/or other data associated with the person/player currently operating the wager-based gaming device. Of course, different IAPP techniques may be employed depending on how the multi-player game is configured (e.g., multiple screen, split screen, same screen, etc.).

For example, in a multiple screen scenario, the IAPP functionality may be configured or designed to operate in a manner similar to the multiplayer wager-based game scenario described above. In a split screen scenario, (e.g., where two or more players view their respective game world environments via a common display screen) the individual display sections would may be configured or designed to display targeted advertising content based on the particular player who is viewing that section of the shared screen. In a same screen scenario (e.g., where two or more players view the same game world environment via a common display screen, or via different screens) the displayed advertising content may be alternated to display a collection of different advertising content based on the patron profile data associated with each of the players. In a MMO scenario, the displayed in-game ads may be cycled through a collection of the content deemed displayable throughout gameplay. This IAPP technique may be "less personalized" as there may be a mix of multiple patrons data, and the displayed advertising content may be more along the lines of "generic advertising." In some embodiments, based on the wager-based game theme, title, demographics, as well as other variables, the displayed in-game advertising content may have a "default" set of ads that would "most likely suit" a majority of the players in said theme.

Figure 23:
Figure 24:

FIGS. 23 and 24 depict example screenshots illustrating how the IAPP functionality may be utilized to display in-game product placement content in wager-based games. For example, FIG. 23 shows an example screenshot 2300 of a first-person shooter type hybrid arcade/wager-based game environment 2310. As the player's character navigates through the game world 2310, various product placement opportunities may present themselves. For example, as illustrated in the example embodiment of FIG. 23, product placement content 2320 (e.g., Coors Light™ Graphic) is displayed on an article of clothing worn by an NPC.

In some embodiments, the displayed product placement content (e.g., 2320) may be acquired from a remote system such as, for example, an ad server residing within a casino establishment's secure gaming network. In other embodiments, the displayed product placement content may be acquired from a remote ad server which is external to the casino establishment's secure gaming network.

In some embodiments, at least a portion of the displayed product placement content may be acquired in advance (e.g., non-real-time) and cached locally in the memory of a wager-based game. In some embodiments, other portions of the displayed product placement content may be acquired in real-time or near real-time for dynamic display within the gaming environment of a wager-based game.

In some embodiments, the product placements displayed within the game world of a wager-based game may be configured or designed to change periodically, in accordance with specifically defined display rules, which, for example may be used to define guidelines governing which particular portions of product placement content are to be displayed at which wager-based gaming devices, at what time, in what sequence, and at which locations within the game worlds of one or more wager-based games.

In multi-player wager-based games, two or more players that are concurrently viewing the same game world scene of a live (e.g., in real-time), wager-based game may have different in-game product placements displayed in each player's respective in-game scene. For example, as illustrated in FIG. 23, product placement content 2320 (e.g., Coors Light™ Graphic) may be displayed in the game world 2310 associated with Player C; whereas, as illustrated in FIG. 24, product placement content 2420 (e.g., White Castle™ Graphic) may be displayed in the game world 2410 associated with Player D.

Utilizing one or more of the IAPP techniques described herein, gaming machine manufacturers and/or casino properties may configure wager-based gaming machines to supporting dynamic in-game advertising. In one embodiment, a backend casino gaming system server such as that illustrated in FIG. 8 may upload batchs of different advertising content to one or more wager-based gaming machines of the casino gaming network. Each wager-based gaming machine may be configured or designed to include functionality for dynamically selecting and displaying in-game advertising content throughout one or more of the wager-based game levels. In at least some embodiments, the advertising content may include promotional content sponsored by the casino, such as, for example, casino entity branding, specials and featured products, entertainment events, etc.

In some embodiments, the one or more wager-based games may be configured or designed to include a default set of advertisement content which, for example, may be themed to match the look and feel of the wager-based game world in which such advertising content is to be displayed. To further immerse patrons in the casino propertie's offerings, virtual ad space within the wager-based game environment may be utilized to display dynamic in-game advertising content.

In some embodiments, advertising content may be customized by a casino property's marketing team and uploaded to specifically selected wager-based gaming scenes which support dynamic in-game advertising. According to different embodiments, there may be several variations of ads such as, for example, square, tall, wide, etc. In one embodiment, square ads follow a "power of 2" pixel resolution, e.g., 512×512, 1024×1024, 2048×2048, etc. Whereas the tall ad resolution may have a width of 512 and a height of 1024, and the wide ad resolution may have a width of 1024 and a height of 512. The tall and wide ad resolutions may be scaled up or down respectively depending on the level of detail required, for example, a larger resolution layout would be 1024w×2048h for tall and 2048w×1024h for wide.

In-game IAPP techniques also lend to the mobile/social aspect as well, providing casino properties the ability to notify "mobile gamblers" of upcoming events, specials, etc. The possibilities of the ad space real estate are extremely expansive, allowing special configurable ad space locations which, when interacted with, may allow the possibilities for "return actions."

One of the advantageous features of the in-game IAPP techniques described herein is that the in-game IAPP techniques may be deployed in wager-based games without affecting Wager event outcomes, payout tables, RNG, etc. By way of illustration, an in-game ad may display "Howdy Partner! Shoot this sign, get a free glass of wine!" and based on the interaction of the player, (shooting said advertisement) waitstaff may show up to that players EGM. This process could be as simple as when interaction between the player and a specific ad occurs, the "candle" on the EGM lights up, prompting nearby waitstaff to engage with the player.

FIGS. 16-19 illustrate sequence of example screenshots of an interactive in-game IAPP technique which may be implemented at one or more wager-based gaming machines of a casino establishment. In this example scenario, it is assumed that a player interacts with a displayed in game advertisement or promotion to initiate the placement of an order for an advertised product or service, which may be provided by the casino property.

Referring to FIG. 16, it is assumed that a player has already funded credits and is engaged in game play of a hybrid arcade/wager-based game at one of the casino's wager-based gaming machines. As the player navigates through the wager-based game world, the player sees Coor's Light™ in-game advertisement displayed at virtual billboard 1620. In some embodiments, the displayed advertising content may include the display of additional content (e.g., stroke/outline) to indicate that the displayed advertising content 1622 is an interactable object. The player then shoots at the displayed advertising content 1622. In response to the system detecting the player's interaction with the displayed advertising content, system may temporarily pause game play activity, and may display a pop-up GUI or overlay layer GUI (e.g., 1720, FIG. 17). For example, as illustrated in the example embodiment of FIG. 17, the pop-up GUI 1720 may be configured to display "ORDER COORS LIGHT?", and may be configured to enable the player to provide desired input via interaction with (e.g., player shooting) either the "YES" button 1723, or the "NO" button 1725.

According to different embodiments, the beverage offer may be offered complementary, may be offered at a discounted price, or may be offered at its normal price. In embodiments where the player is required to pay money or credits for accepting a displayed promotional offer such as that illustrated at 1720, the wager-based gaming machine may be configured or designed to include functionality for handling the necessary payment transactions. For example, in some embodiments, the player may provide payment by inserting cash into the gaming machines bill validator. In other embodiments, the required payment amount may be charged to the player's room number or player tracking/patron account (for subsequent payment). In yet other embodiments, the gaming machine may be configured or designed to charge the payment transaction for the payment amount to the player's credit card which is linked to the player's player tracking/patron account.

Figure 17:
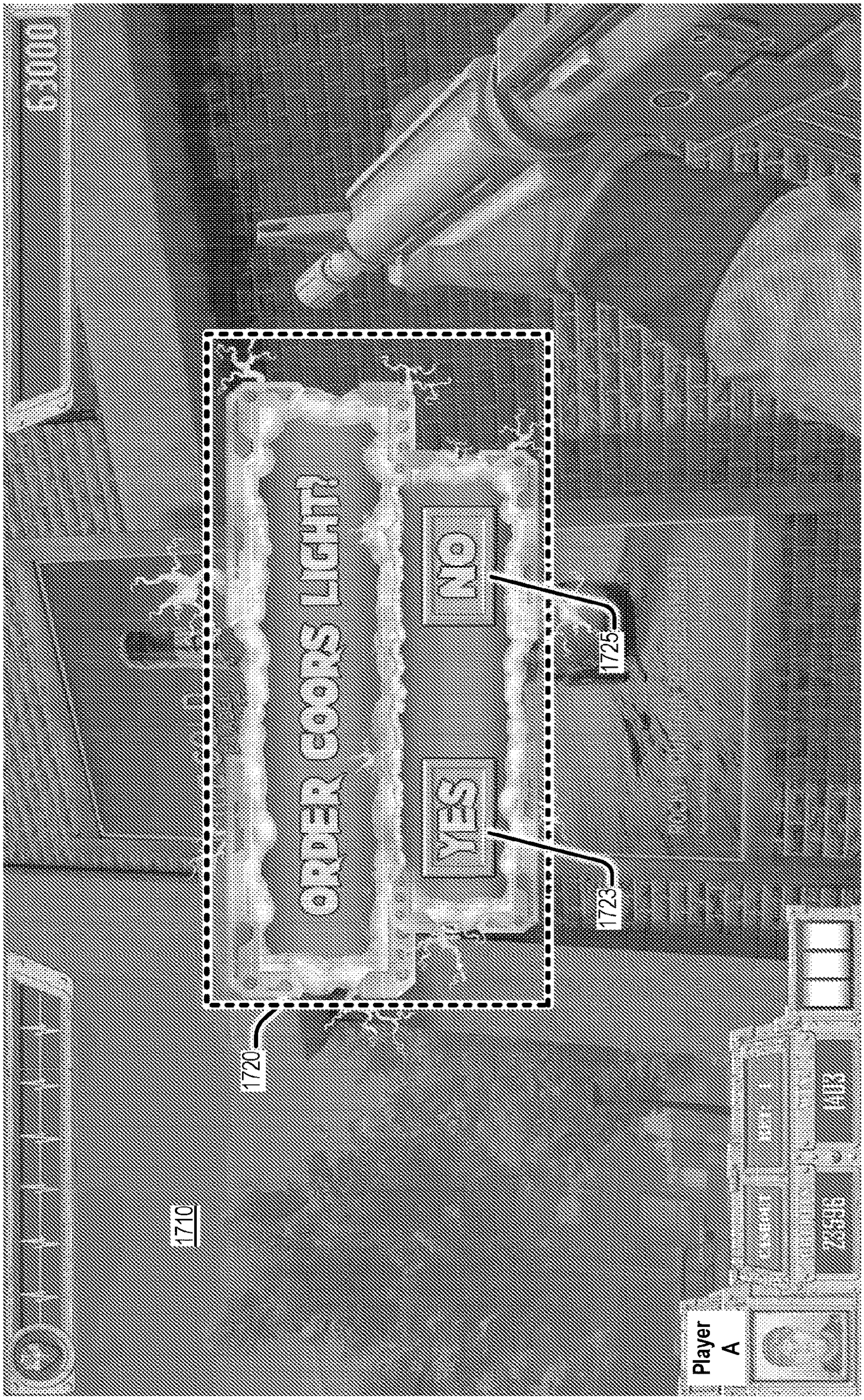
Figure 18:
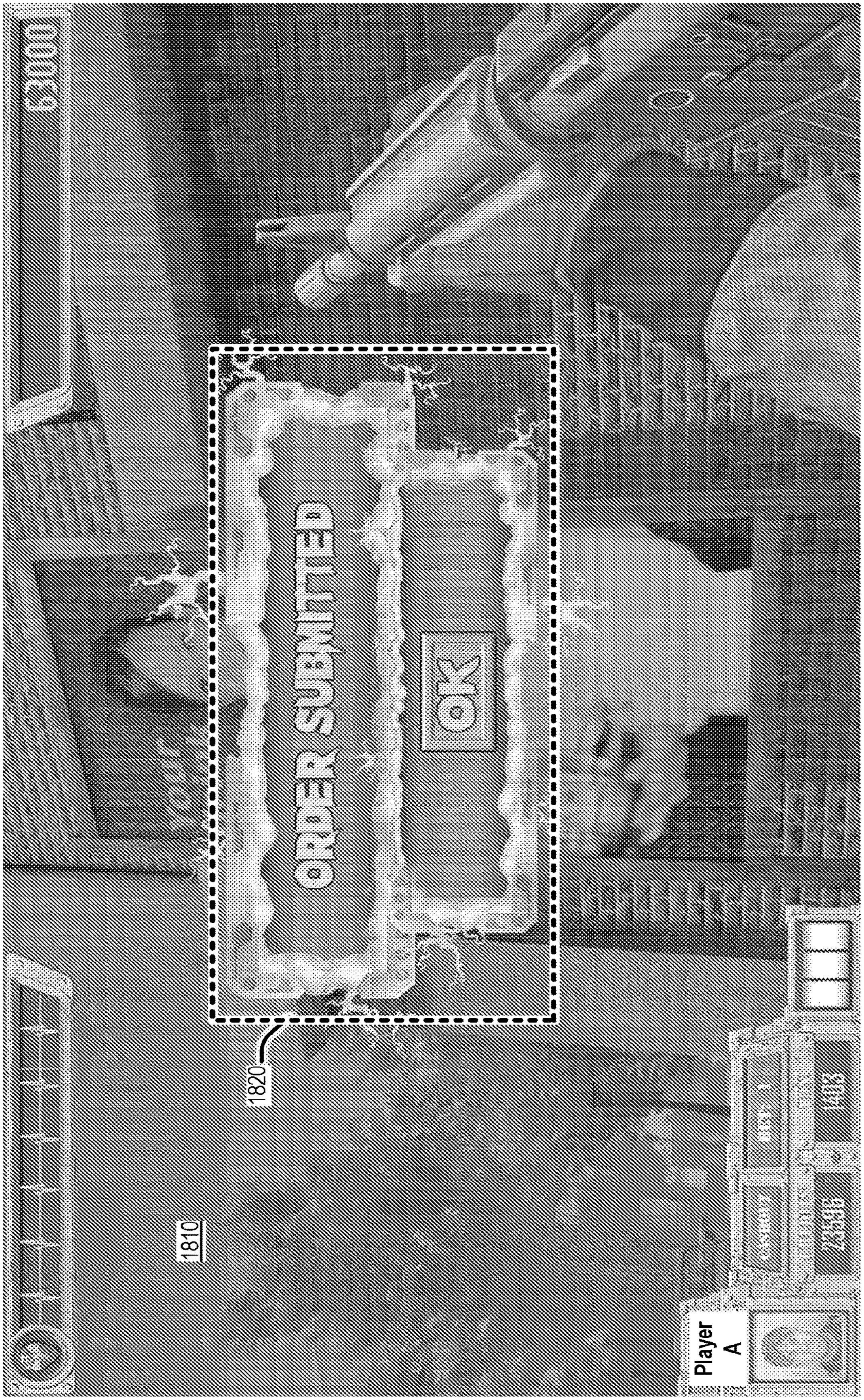
Figure 19:
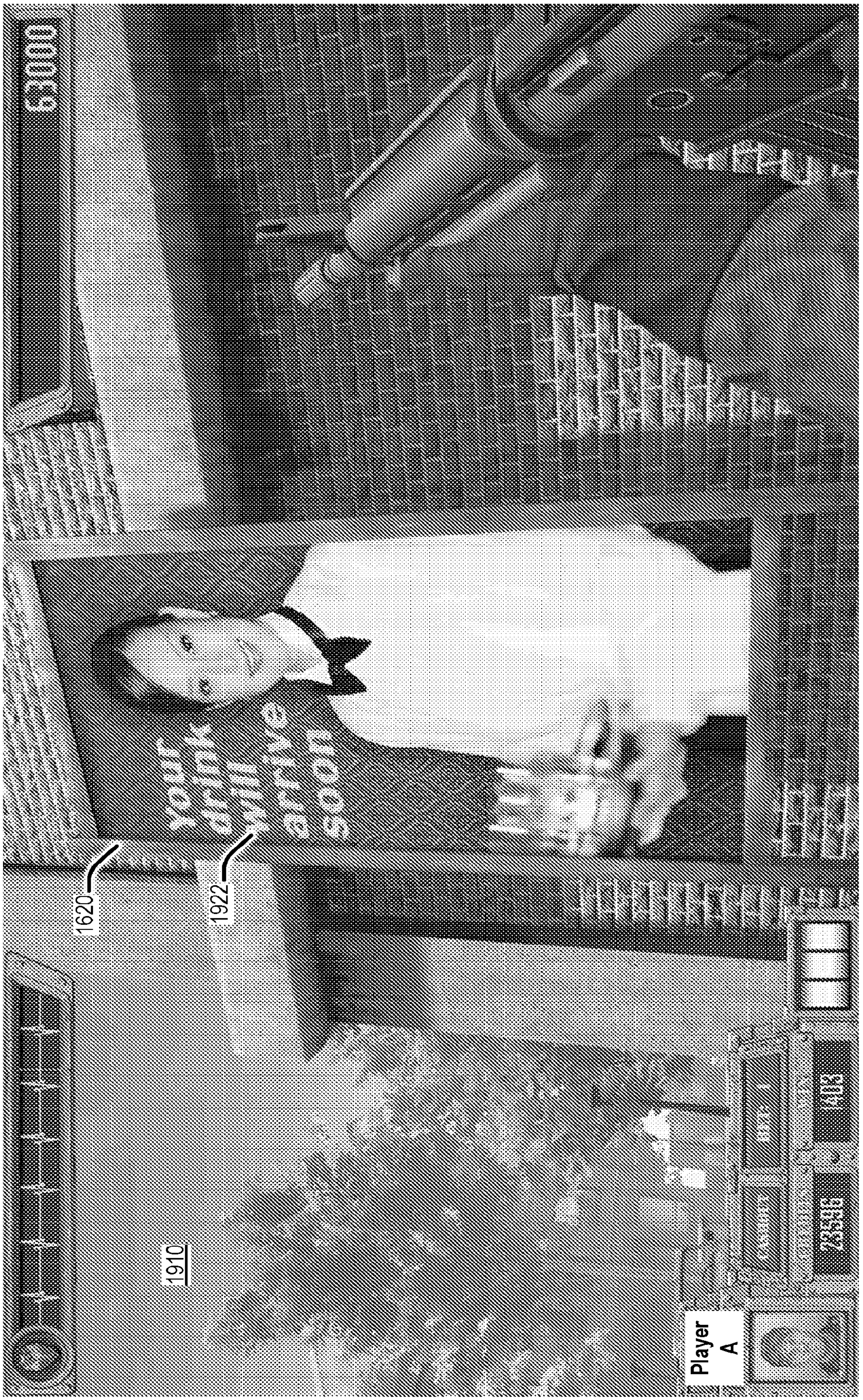

Returning to the example embodiment of FIG. 17, if the player shoots the "NO" button 1725, the system may respond by removing the display of the pop-up GUI 1720, and resuming game play. Alternatively, if the player shoots the "YES" button, the system may respond by automatically placing the Coors Light order at a designated casino bar for fulfillment and delivery to the patron. Additionally, as illustrated in FIG. 18, the system may display an additional confirmation pop-up GUI 1820, confirming that the order has been submitted. Thereafter, as illustrated in FIG. 19, wager-based gameplay may resume at the gaming machine. Additionally, in at least one embodiment, as illustrated in FIG. 19, the system may display updated content 1922 at virtual billboard 1620 relating to the recently placed order, such as, for example, "Your drink will arrive soon". In some embodiments, this updated content may remain displayed at virtual billboard 1620 until the drink has been delivered to the patron. This provides a visual record of the order activity, which may be used to resolve any subsequent issues relating to the order.

It is noted that the in-game announcement displayed at 1922 relates to an event occurring outside of the game environment, and that the in-game announcement has been specifically customized for viewing by the current player.

In at least some embodiments, the placement of interactive advertising content, as well as the general notification and purpose of each, may be clearly defined to the player. For example, in some embodiments, an outlined graphical "stroke" of specific color may be applied to the ad space boundaries, and may also be clearly defined in the wager-based game's paytable.

In at least some embodiments, the system may be configured or designed to impose a limit restriction on the number of interactive "ordering ads" that may be displayed in a wager-based game world during a specific time interval. For example, according to different embodiments, the system may be configured or designed to allow an interactive "ordering ad" to be displayed: only once per game level; only once for each player in a multiplayer game; a fixed number of times for a given game level; only once for the entire game per game; only once per every 30 minutes of game play; etc.)

According to different embodiments, the casino gaming network may include an analytics system which may be configured or designed to track and analyze displayed advertising content and player interaction activities, and to provide an interface for enabling authorized casino personnel (e.g., casino employees and/or administrators) to view details about player interactions with in-game advertising content. For example, using the Zombie$ shooter game as a reference, let's say there are 5 levels total throughout the entire game and in each level there is only one interactable ad, making a total of 5 interact ads throughout the entire game. For simplicity sake, let's say all of the ads are for a bottle of Coor's Light, should the player interact with the ad, they have the potential to get 5 beverages, (in this particular example) if they were to sit down and play the game from start to finish. Granted, a majority of players may not play from start to finish, so for the casino administrator, when using the ad analytics, he or she may be able to view aggregated and/or filtered information such as, for example, "Level 1 Coor's Light Ad had 524 collective interactions", "Level 2 Coor's Light Ad has 209 collective interactions", "Level 3 Coor's Light Ad has 75 collective interactions", "Level 4 Coor's Light Ad has 2 collective interactions", and "Level 5 Coor's Light Ad has 0 collective interactions." Based on this example data, it can readily be seen that, in the aggregate, more patrons interact with ads within lower levels than higher levels. This could mean that a majority of players only end up playing the first couple levels of said game. In contrast, if level 2 had indicated significantly more interactions than level 1, the casino administrator may infer that it may have to do with the ad placement and/or "look and feel" of the advertising content. According to different embodiments, the analytics system may be configured or designed to include various types of filtering functionality, for enabling users to display filtered data according to defined filtering criteria, which, for example, may be based on attributes such as player ID, gaming machine ID, date & time, interaction amounts, advertising asset ID, display durations, etc.

Figure 22:

FIG. 22 illustrates an example screenshots of another type of interactive in-game IAPP technique which may be implemented at one or more wager-based gaming machines of a casino establishment. In the specific example embodiment of FIG. 22, it is assumed that a player has already funded credits and is engaged in game play of a hybrid arcade/wager-based game at one of the casino's wager-based gaming machines. As the player navigates through the wager-based game world, the player sees a billboard 2220 in the game world 2210 which displays an in-game promotional offer 2222 (e.g., "Shoot 5 of these ads and get a free Gatling Gun for use only in the current level!"). In some embodiments, the displayed promotional content may include the display of additional content (e.g., stroke/outline) to indicate that the displayed promotional content is an interactable object. The player then shoots at the displayed promotional content. In response to the system detecting the player's interaction with the displayed advertising content, system may temporarily display a pop-up or overlay GUI stating "1/5 Gatling Gun ads found and shot". The player then continues to engage in wager-based gameplay, and eventually locates and interacts with (e.g., shoots) the four remaining Gatling Gun ads displayed in the wager-based game world.

In at least one embodiment, when the system detects that the player has achieved the stated objective of shooting five Gatling Gun ads in the current game level (and/or has satisfied other predefined achievement criteria), the system may respond by temporarily displaying a pop-up or overlay GUI to notify the player that the player has satisfied the achievement criteria, and has received a designated award or reward as a result. For example, after the system detects that the player has achieved the stated objective of shooting five Gatling Gun ads, the wager-based game may provide the player with access to the use of a Gatling Gun (and auto-equips) for the duration of the current level wager-based gameplay. In some hybrid arcade/wager-based game embodiments, when other gun types randomly drop from killed NPC's, the player may be able to pickup the dropped weapons, swapping out the Gatling Gun. However, in at least some embodiments, the Gatling Gun will remain usable as part of the player's weapon inventory for the duration of the current level wager-based gameplay.

According to different embodiments, one or more of the in-game advertising, in-game product placement, and in-game promotion (herein "IAPP") techniques described herein may be embodied in one or more components of an IAPP system which is deployed at one or more components/devices/systems of a casino gaming network. In at least one embodiment, the IAPP system may be configured or designed to provide wager-based game advertising functionality that enables game developers, casino operators, and publishers to define, sell, distribute, and manage advertisements, sponsorships, and placements that appear within the virtual game world as part of the wager-based gaming experience. In some embodiments, components of an IAPP system may be configured or designed to enable game developers to define locations within wager-based games in which advertisements may appear. In some embodiments, components of an IAPP system may be configured or designed to provide game publishers, advertisers, and/or casino administrators with access to an IAPP management console for managing various types of IAPP related activities such as for example: defining advertising campaigns, soliciting real-time advertisements from external ad networks, acquiring and managing advertising content (e.g., which may include images, audio, text, and/or video content), configuring advertising selection criteria, configuring advertising display criteria, etc.

In some embodiments, components of the IAPP system may be configured or designed to provide functionality for registering and managing advertisement locations and objects with a plurality of different wager-based game environments. In some embodiments, components of the IAPP system may be configured or designed to provide functionality for defining ad campaigns and advertising content display rules, and for registering and managing advertisement assets associated with one or more wager-based games. In at least one embodiment, the term "advertising content" may refer to ad content, product placement content, promotional content, and/or other types of brand-related, service-related or product-related content. In at least one embodiment, the advertising content display rules may be used to define guidelines governing which particular portions of advertising content are to be displayed at what time, and in what sequence, and at which locations within a game world.

Selection of Advertising Content

According to different embodiments, a variety of different techniques and criteria may be used to determine the acquisition and/or selection of advertising content to be displayed within a given wager-based game environment.

Example A: Selection of Targeted In-Game Advertising Based on Player Identity/Demographics a. Identify Player A player's identity information may be accessed via individual player tracking cards and through patron databases such as, for example, a casino establishment's player tracking database. Information of specific patrons can vary from birthdays to banned play. In some cases, player preferences are stored as well, such as, for example, recent entertainment activities. Access of this information may be similar to service window accessible information, wherein a patrons available session point balance and other gameplay stats are readily available for display, as well as recent activity gathered through player services.

b. Access Demographic Information about Player.

In some embodiments, accessing a person's demographic information may be accomplished using processes similar to those for accessing player identities. Patron specific data may be stored at one or more a patron databases. Each person's demographic information data record may include a variety of demographic information specific to that person, including, for example, age, religion, ethnicity, physical attributes, purchasing habits, anniversaries, driver's license information, etc.

c. Acquire Advertising Content Based on Player's Demographics.

In at least one embodiment, the acquisition of advertising content based on player demographic information may involve accessing a database of advertising assets. Each advertising asset may have associated therewith a respective set of advertising asset content (e.g., images, video clips, graphics, text, etc. corresponding to the content which will be displayed to the end-user), and a respective set of advertising asset metadata which defines additional attributes of the advertising asset such as, for example, topic classifications, statistics relating to specific products and consumer relations, etc. In at least some embodiments, the advertising asset metadata may be used by the IAPP system to dynamically pull/push content to the real-time game environment objects (e.g., for display in the game environment) of a wager-based game based on correlations between patron's demographics and the advertising asset metadata.

Other types of criteria which may be used to determine the acquisition and/or selection of advertising content to be displayed within a given wager-based game environment, such as, for example, one or more of the following (or combinations thereof):

- Advertising content selection based upon player location.
- Advertising content selection based upon gaming machine location.
- Advertising content selection based upon time criteria such as, for example, time of day, day of week, date, etc.
- Advertising content selection based upon player skill level.
- Advertising content selection based upon player ID.
- Advertising content selection based upon historical purchase or POS transactions associated with the identified player.
- Advertising content selection based upon points that a player has achieved through prior or current game play.
- Advertising content selection based upon the number of times the game player has viewed the advertisement.
- Advertising content selection based upon the specific theme or genre of the level of the game at which the ad is to display.
- Advertising content selection based upon the presence or existence of specific game objects.
- Advertising content selection based upon in-game Characters.
- Advertising content selection based upon in-game Weapons.
- Advertising content selection based upon in-game Equipment.
- Advertising content selection based upon an object's previous actions in relationship to the ad location or to other game players.
- Advertising content selection based upon virtual objects within the proximity of the ad location.

- Advertising content selection based upon player gambling preferences.
- Advertising content selection based upon player spend amount over a given time interval.
- Advertising content selection based upon player status (e.g., VIP player).
- Advertising content selection based upon game session points or score.
- Advertising content selection based upon in-game achievements.
- Advertising content selection based upon game theme.
- Advertising content selection based upon casino branding criteria.
- Advertising content selection based upon casino marketing criteria.
- Advertising content selection based upon casino promotional criteria.
- Advertising content selection based upon products or services sold or offered by the casino establishment.
- Advertising content selection based upon the identity of other players within the vicinity of the player playing the wager-based game. For example, in one embodiment, if the system detects that the player's wife is seated next to the player, the wager-based gaming machine may display a promotional ad for dinner for two at one of the casino's restaurants. In contrast, if the system detects that the player's male business associate is seated next to the player, the wager-based gaming machine may display a promotional ad for a local strip club.
- Etc.

d. Render and Display Acquired Advertising Content in Player's Live In-Game Environment In at least one embodiment, rendering and display of acquired advertising content at a wager-based gaming device may involve the use of an internal coding structure in which data correlation between patron management attributes and product services statistics exists, and wherein the data correlation structure accesses management/content distribution of related products and media which may be pushed/pulled to their proper destinations during real-time wager-based gameplay.

Example B: Selection of Targeted In-Game Product Placement Based on Player Identity/Demographics a. Identify Player.

A player's identity information may be accessed via individual player tracking cards and through patron databases such as, for example, a casino establishment's player tracking database. Information of specific patrons can vary from birthdays to banned play. In some cases, player preferences are stored as well, such as, for example, recent entertainment activities. Access of this information may be similar to service window accessible information, wherein a patrons available session point balance and other gameplay stats are readily available for display, as well as recent activity gathered through player services.

b. Access Demographic Information about Player

In some embodiments, accessing a person's demographic information may be accomplished using processes similar to those for accessing player identities. Patron specific data may be stored at one or more a patron databases. Each person's demographic information data record may include a variety of demographic information specific to that person, including, for example, age, religion, ethnicity, physical attributes, purchasing habits, anniversaries, driver's license information, etc.

c. Acquire Product Placement Content Based on Player's Demographics.

In at least one embodiment, the acquisition of product placement content based on player demographic information may involve accessing a database of advertising assets. Each advertising asset may have associated therewith a respective set of advertising asset content (e.g., images, video clips, graphics, text, etc. corresponding to the content which will be displayed to the end-user), and a respective set of advertising asset metadata which defines additional attributes of the advertising asset such as, for example, topic classifications, statistics relating to specific products and consumer relations, etc. In at least some embodiments, the advertising asset metadata may be used by the IAPP system to dynamically pull/push content to the real-time game environment objects (e.g., for display in the game environment) of a wager-based game based on correlations between patron's demographics and the advertising asset metadata.

d. Render and Display Acquired Product Placement Content in Player's Live In-Game Environment In at least one embodiment, rendering and display of acquired product placement content at a wager-based gaming device may involve the use of an internal coding structure in which data correlation between patron management attributes and product services statistics exists, and wherein the data correlation structure accesses management/content distribution of related products and media which may be pushed/pulled to their proper destinations during real-time wager-based gameplay. For example, a wager-based game may display game world scene of in-game character drinking a beverage from a can. In one embodiment, the wager-based game and/or wager-based gaming device may include IAPP functionality for causing the skin of can may be dynamically rendered to look like a Coke™ can for product placement purposes.

Example Criteria for Use in Selection of Targeted In-Game Advertising, In-Game Product Placement, and/or In-Game Promotions.

- Game theme—Much like product placement for patrons, game themes can promote different product line ups as well. For example, a zombie-horror hybrid arcade/wager-based game theme may have ads/promos for products such as, "Monster Energy" etc.; whereas a beach-themed wager-based game may promote more water-oriented type products. In at least one embodiment, this involve the use of an internal coding structure in which data correlation between patron management attributes and product services statistics exists, and wherein the data correlation structure accesses management/content distribution of related products and media which may be pushed/pulled to their proper destinations during real-time wager-based gameplay.
- Game title—A game title could be used as a "tag" in which certain products could be associated with. For example, titles that are feminine would have a product line up that is more suited for that type of theme and vice versa. e.g., racing titles may have "Red Bull" product placement as Red Bull is typically found sponsoring many race themed events in real-life etc.
- Geolocation where game is being played—In the case of geolocation, a similar setup utilizing a database and coding structure may allow for product placement of specific items based solely on a player's location. For example, if someone were playing a particular theme in Michigan, there could be promotions for "Faygo", "Vernors" or "Better Made" products, (aforementioned products are Michigan based) etc.

Time of day—Certain times of day can promote different types of items, utilizing databases and coding structures, based on the time of play, specific items, such as, for example, "Chock Full o' Nuts" coffee could be displayed during the early morning hours whereas "Coke and/or Pepsi" could be displayed during lunchtime or afternoon hours. Displays in real-time may be able to update "on the fly" as in, if a time change happens during gameplay, say, from breakfast to lunch, the dynamic display could be updated by the backend system.

Day of week—Days of the week would have similar functionality as the "time of day" display system, however days would have constant promotions related to that specific day, e.g., "Friday Night Ladies Night" the ads and promotions would have ladies night themed throughout for that particular day. At the same time, smaller ads, such as, for example, "the can of Coke" mentioned previously could display/promote drinks/items that relate to the daily promotion. In another example, if it is currently Happy hour at the casino bar, a bus may drive by in the player's game world with billboard ad saying "Happy Hour at casino bar 5 PM to 7 PM".

Information relating to external real-world events—E.g.: Relation to "outside" real-world events may be based on a database of information as well as a backend coding structure. Events, such as, in this example, the Olympics may have promotional ads displayed throughout gameplay. In the event of streaming media possibilities, (typically more powerful machines and connections) live feeds could be sent to displays within games. For example, in one embodiment, a marqui in the game world may be configured or designed to display live news feeds and/or real-time weather feeds.

According to different embodiments, there may be a variety of different ways advertising, product placement, and/or promotional content may be delivered or presented in the wager-based game world, such as, for example, one or more of the following (or combinations thereof):

- On an in-game billboard.
- On an in-game sign.
- On clothing worn by one of the in-game characters.
- As a tattoo on the skin of an in-game character.
- On weapons, items, or objects used in-game.
- On an in-game TV commercial.
- Display of dynamically branded products in-game. Illustrative examples:
  - character drinks can of coke
  - character drives a Porsche vehicle
  - Tessla car drive by in background of scene
  - Bus drives by displaying ad/product.
- "Old school styled"—sports game blimp, planes flying banners/writing smoke trails etc.
- Sound effects, using the above sports style—announcers, vendors, and/or other relevant characters and/or objects within game, (e.g., radios, tv's, pda's, etc.)
- On in-game objects such as, for example: slot reels, dice, game boards, roulette tables, craps tables, etc. Example embodiments of at least some of these IAPP techniques are illustrated in FIGS. 25-31 of the drawings.

According to different embodiments, a variety of different techniques may be employed to reduce game play lag (e.g., in real-time) caused by waiting for acquisition of advertising/product placement content. For example:

- Initially retrieve (e.g., ahead of time) a batch of approved advertisements meeting specified ad selection criteria.
- For video or animated non-streaming media—use specific compressions and codecs, (e.g., .flv with Sorenson Spark) to reduce file sizes.
- For images and other static media—use specific compression and non-alpha techniques to reduce file size.

Various techniques may also be employed to enable in-game advertising/product placement to be implemented in off-line game environments. For example, in one embodiment, a database of stored ad content may be accessed in a similar manner to online displays. In some embodiments, it may be preferable to perform an initial download of previously gathered patron information, as well as periodic update intervals to keep ad content current. In the event of a total off-line environment, default ad content may be displayed. In some embodiments, a database of preloaded default media may be utilized, at least a portion of the content of which may be based on the player's off-line actions. The corresponding ad(s) could be dynamically pulled/pushed via the backend code.

According to different embodiments, one or more IAPP techniques may employ the use of different pricing models for in game advertising or product placement, such as, for example, one or more of the following (or combinations thereof):

- Pricing based on number of impressions rendered and displayed in game.
- Pricing based on length of time advertisement is displayed in game.
- Pricing based on size of displayed ad in-game.
- Pricing based on in game character interaction. E.g.:
  - player's character interacts with product placement object=higher cost
  - product placement object appears in scene, but player's character does not interact with product placement object=lower cost In some embodiments, pricing models may vary based on individual players, and depending how the patrons interact with their particular game environments will determine how the pricing model will fluctuate. The pricing model is an analytical networked system that can track number of "clicks" (object interactions), ad display durations, which ads are being shown, how often, the times of day, etc. all in an effort to track the best usage of product placement for increased revenue and satisfied customers. The pricing model system may include a reporting component that may be accessed by authorized personnel, which may be searched and filtered via, date, time, location, product, age, gender, etc.

In some embodiments, components of the IAPP system may be configured or designed to provide functionality for wager-based games to request advertising metadata and schedules that determine what advertisements are to display in specified locations within the game during specified times and according to specific display rules previously determined by an administrative user. In some embodiments, components of the IAPP system may be configured or designed to provide functionality for receiving and posting advertising assets. For example, a wager-based game may request advertising metadata and determine an ad campaign's display rules, schedule, and locations. Thereafter, the wager-based game may request the advertising assets that represent the advertisement(s) selected to be displayed in the gaming environment. In one embodiment, components of the IAPP system may be configured or designed to provide functionality for requesting an advertising asset from local and/or remote multimedia server(s). In at least one embodiment, an "advertising asset" may be characterized as a multimedia file such as an image, video, or audio file that represents one or many parts or the whole of an advertisement to be displayed within an wager-based game.

In one embodiment, components of the IAPP system may be configured or designed to provide functionality for tracking and storing information relating to advertising impressions, player interactions with displayed advertising content, and/or other in-game game activities. In at least one embodiment, player interactions with displayed in-game advertising content may include various types of actions which may be performed directly or indirectly by a game player, character, or object on an advertisement that is represented as a game object within the game. Examples of such actions include but are not limited to hitting, throwing, shooting, jumping on, eating, kicking, speaking, shouting at, and running into an ad object. Information such as, but not limited to, the user name of the game player viewing or clicking the ad, the current time and date, demographic information about the viewer, the length of time that the ad was viewed or interacted with, and the types of actions taken on an ad object is saved as part of the transaction. In one embodiment, components of the IAPP system may be configured or designed to provide functionality for enabling authorized users to view advertising reports and statistics about advertising impressions, player interaction activities with displayed advertising content, etc. Through the use of a user interface casino managers and administrators may review reports that illustrate details such as, for example: ad viewership by time period, impressions, player-ad interactions, ad actions by demographic group or region, etc.

Slot Reel Symbol Advertising

FIGS. 25-31 illustrate example screenshot embodiments of a different type of IAPP technique which involves the display of in-game advertising content on in-game objects such as, for example, slot reels (e.g., 2530, FIG. 25; 2830, FIG. 29; 3130, FIG. 31), dice, game board tiles (e.g., 2611, FIG. 26; 2811, FIG. 28; 3011, FIG. 30), roulette tables, craps tables, virtual game tokens, etc.

In some embodiments, slot reel symbols may be dynamically changed in real-time to reflect specific symbols within specific paytables based on specific paytable outcomes as well as player gameplay interaction and player in-game advertisement interactions. For example, using the Coor's Light bottle scenario, let's say the player, whilst playing "Zombie$®" interacts with several Coor's Light ads. In doing so, the features and system may be configured or designed in such a way where the Coor's Light logo may appear as a weighted symbol on the reels being displayed to the player. In some embodiments, the logo placement on the reels may also promote specials, such as, matching three or more of said dynamic logo symbols in a payout line may, for example, trigger a bonus, add a multiplier to the payout line, pay out max amount due to the logo "replacing" the games current high level paytable symbol, etc.

Figure 25:

By way of illustration, FIG. 25 shows an example screenshot of a hybrid arcade/wager-based game which supports dynamic in-game advertising. As illustrated in the example embodiment of FIG. 25, the slot reel portion of the hybrid arcade/wager-based game (e.g., 2530) includes three slot reels 2532, 2534, 2536. Each of these slot reels may be been dynamically reskinned (e.g., before, during, or after wager-based gameplay) to display different portions of advertising content (e.g., White Castle™ logo, Coors Light™ logo, etc.) at locations where typical slot reel symbols would be displayed. In at least one embodiment, the re-skinning of the slot reel symbols to display advertising content may not affect the wager-based game event outcome or the amount of payout. In at least some embodiments, the pricing structure associated with dynamic in-game slot reel ads may be based, at least partially, on the amount of payout associated with a win. For example, the price for displaying advertising content associated with a large jackpot win amount may be significantly more than the price for displaying advertising content associated with a relatively small when amount.

In at least one embodiment, the slot reel IAPP technique may utilize coding structures, math models, paytables, token systems and any other subset system to coordinate and properly display the gameplay/payout workings to the player. Custom logo reel symbols may replace or be an addition to current paytable symbols, as well as be featured on the same or different paytables. Depending on the type of gameplay and specific in-game advertising interactions or models, the criteria "required" for re-skinning reel symbols during real-time can vary greatly. For example, perhaps Nike™ is running a promotion with a particular venue within a casino property, (e.g., the Nike™ outlet store within said casino property) it may be up to the casino property in order to work with Nike™ and Nike™ Marketing to properly display branding within games.

In yet another example, a casino property may be trying out an new beverage. Let's say they are now serving Guinness™, a beverage that was not available with the property previously, depending on the interaction requirements, a patron may see Guinness™ logo's appear on their slot reels, and upon matching a payout line that contains the Guinness symbols, the property may be able to offer a complimentary Guinness™ to the player, as well as the player possibly receiving a winning payout from the matched symbols. As a result, the player may receive a winning payout, a complimentary beverage, and mental association of "good times" with the specific branded item/logo, (e.g., Guinness™). This positive mental association with product placement, as well as a winning payout can bring positive reinforcement to players everyday livelihood. Service providers and/or product manufactures may find new consumers by expanding their marketability through direct in-game wager-based game advertising as well as direct logo placement within the wager-based game portion of the games themselves. In some embodiments, product logos or slogans that may be placed on a slot reel may be required to comply with specific guidelines and/or regulations, as required by system-side configurations (e.g., "logos" must be in a .PNG format including alpha, (transparency) and resolutions must be in powers of 2 with none being larger than 1024×1024 in size). In some embodiments, the advertising content logos may be stored in a database with corresponding identification numbers as well as descriptors in which the code-based back end may target, select, and send content to specific in-game meshes or objects that contain predefined allocated space specifically designated for dynamically rendering in-game product placement and/or advertising.

In some embodiments a casino back-end system may include an IAPP server system which may be configured or designed to manage various IAPP aspects, including, for example, handling in-game interactions performed by the player, which in turn, may determine the type of content to be dynamically displayed to the player concurrently in real-time. In some embodiments, the IAPP server system may determine the demographics and display content based on gathered player interaction data or analytical data stored from previous gameplay sessions. For example, in some cases, a player may have favorite beverages or food items saved within their patron data, and the system may be able to identify and use such data and parse through the database of stored advertising content to select an appropriate in-game ad based upon the identified patron data, and then "push" the selected advertising content to the player's wager-based gaming machine for display in the gaming environment of the wager-based game which the player is currently playing at the gaming machine. In some embodiments, the in-game advertising content is transmitted within a secure and encrypted casino gaming network, whereas the wager-based game portion already has predefined objects for which dynamically rendered content "lives."

In some embodiments, the reel symbol database of advertising content may be populated with not only advertising assets and logos, but also other content such as, for example, promotional marketing, in-house marketing, special events, and even other gaming product symbols. The content database may contain pictures, unique identification (e.g., per each unique item), descriptors and other variables to further assist in dynamically identifying specific content deemed "valuable" to patrons. The "value" of said content may be based per individual. For example, some patrons like Guinness™ and some patrons don't. Accordingly, the value of Guinness™ in-game product placement for a player who doesn't like Guinness may be relatively lower than the value of Guinness in-game product placement for a player who does like Guinness™. Accurately estimating the placement value of specific in-game advertising impression may involve the use of analytical data as well as proper marketing and demographic awareness. For example, certain casino properties are well aware of "ups and downs" with certain product sales, such as, for example, a nice ice cold beer may be in higher demand during the summer as opposed to the winter, (depending on geographical location) in this sense, properties have a direct correlation between product and demand. It might not make sense for a property to advertise a hot beverage during hot weather. Accordingly, in at least one embodiment, the IAPP system may include functionality for providing the casino property with the ability to directly influence the display content by populating the content database with items or products that best suits the times of day, season, and/or other determining factors which may apply. In some embodiments, a casino property may elect to continually add or remove custom content to create an amorphous ever changing database, controlled or overseen by authorized personnel, (e.g., F&B Director). In other embodiments, a casino property may plan a different strategy and apply future proposed product schedules, populate their database with some or all of the advertising content they "predict" will be used, and let the analytical side of the IAPP system determine the best placement of product content based on particular patron game-play interactions. In the latter situation, the IAPP system may include functionality for enabling casino administrators to closely monitor (e.g., in real-time or near real-time) the analytical aspects of patron gameplay interaction in order to identified desired information/data such as, for example: what is the most frequently displayed advertising content, which types of advertising content generate the most revenue, when is specific advertising content viewed the most, how long it's viewed for, how many times it's been interacted with, etc. Using this information, improvements may be made with regard to the selection and display of specific advertising content and product placements, as well as providing the best possible experience to the player.

According to different embodiments, the analytical components of the system may use patron data such as, for example, one or more of the following (or combinations thereof): age, gender, birth date, etc., as well as a record of how the patron plays, how and what the player interacts with, etc. For example, if a particular player constantly interacts with in-game Guinness™ ads and Ball Park hotdog ads, the IAPP system may automatically and dynamically modify the advertising content displayed to that player so as to display in-game advertising content relating to those specific products and/or similarly related products (e.g., Guinness and Smithwick's; Ball Park and Hebrew National). In situations where no information about the player is available, the IAPP system may display the default or generic advertising content, and/or may "rotate" through a series in-game advertisements relating to different products and/or services, with the hope of getting the player to interact with one of the displayed in-game advertisements in order to identify more suitable in-game advertising content to be displayed to that player.

In at least some embodiments, the IAPP system may also include functionality for enabling casino properties to use time of day criteria to display specific in-game advertising content. For example, in one wager-based gaming embodiment, a player may see an in-game ad of breakfast specials during morning hours of play, lunch specials during mid-day, and dinner specials in the evening. Seeing such content may inspire the patron to take a break and check out the in-house restaurant(s) before heading back to the gaming seat. The ads, product reel symbols, and any other type of in-game branding recognition do not necessarily need to be interacted with in order to be effective.

Other IAPP Advertising Techniques

FIGS. 26-31 illustrate example screenshots of different "Match-X" hybrid arcade/wager-based game embodiments which are configured or designed to support dynamic in-game advertising, product placement, and promotions. In at least one embodiment of a "Match-X" hybrid arcade/wager-based game, the player may match three or more adjacent tiles of the same type in order to receive gameplay points, and initiate a wager-based game event (e.g., wager-based spin of slot reels 2630).

Figure 26:
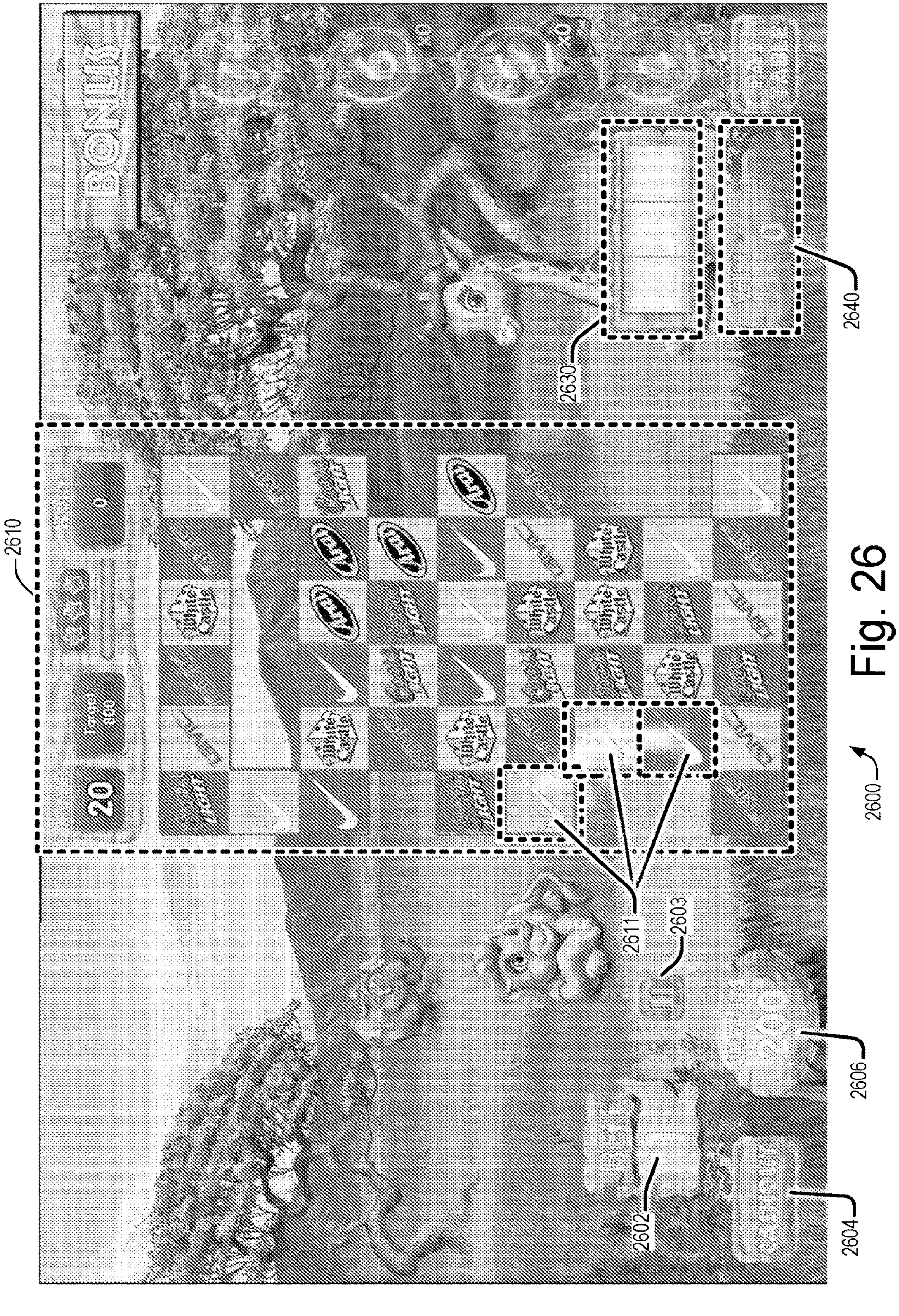
Figure 27:
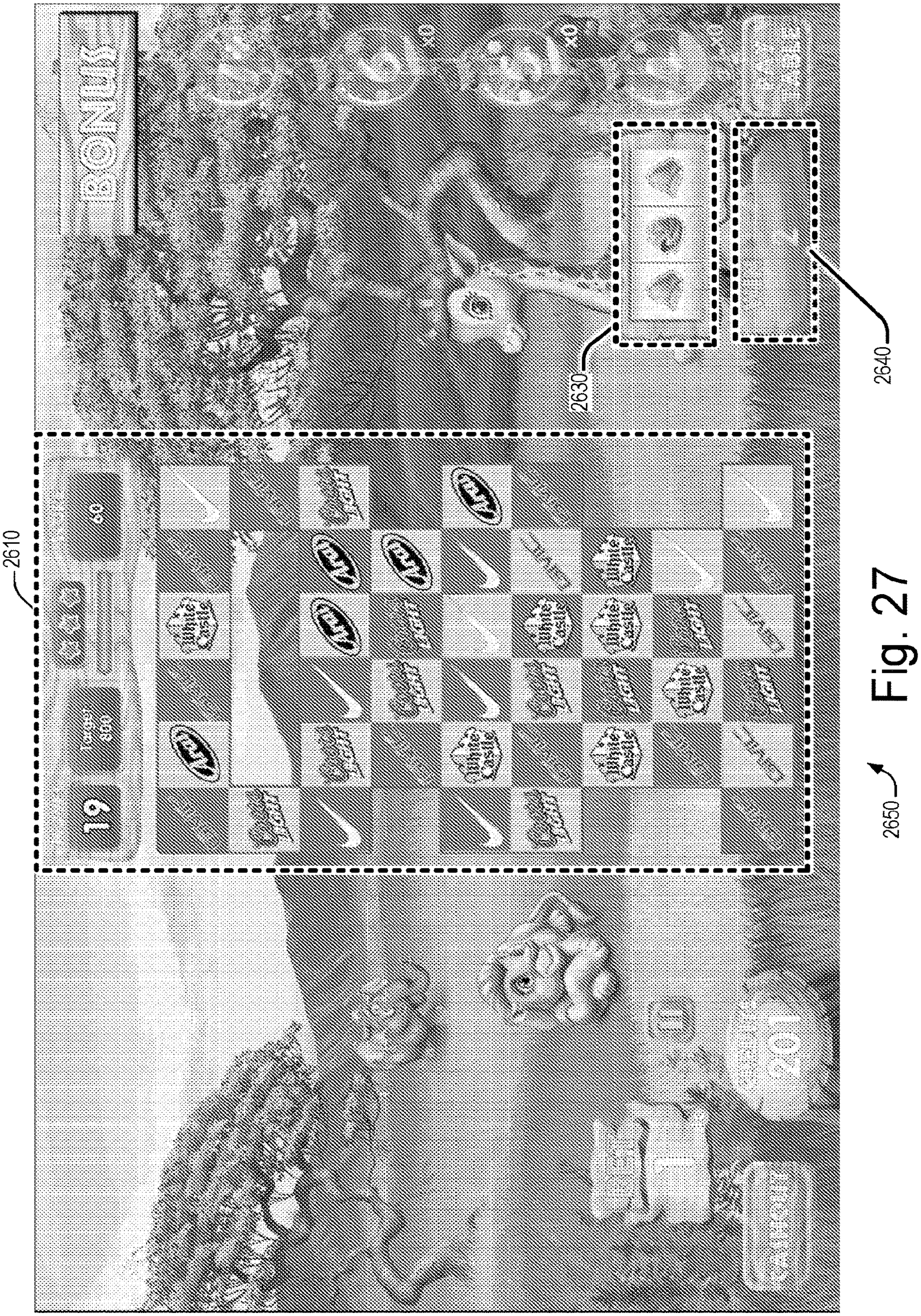

For example, as illustrated in the example embodiment of FIG. 26, game board portion 2610 includes a plurality of game tiles (e.g., 2611) each displaying a respective symbol or graphic. In the specific example embodiment of FIG. 26, each of the game tiles has been dynamically reskinned (e.g., before, during, or after wager-based gameplay) to display a respective type of advertising content (e.g., Nike™ logo, Coors Light™ logo, GMC™ logo, Aria™ logo, etc.). In at least one embodiment, the displayed advertising content may be dynamically retrieved and displayed (e.g., in real-time or near real-time), in accordance with one or more of the IAPP techniques disclosed herein. In at least one embodiment, the re-skinning of the game tiles to display advertising content may not affect the wager-based game event outcome or the amount of payout.

Figure 28:
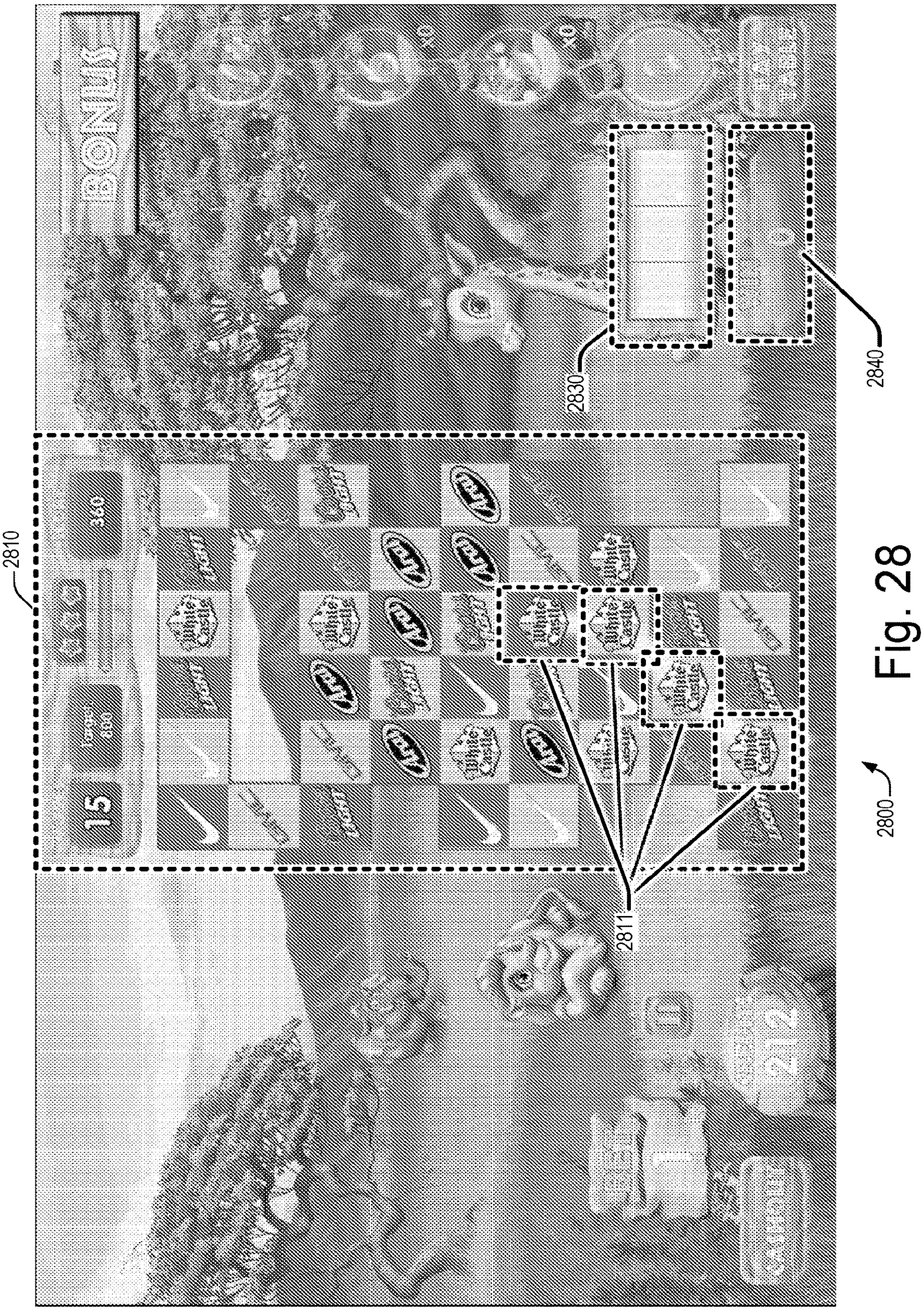
Figure 29:
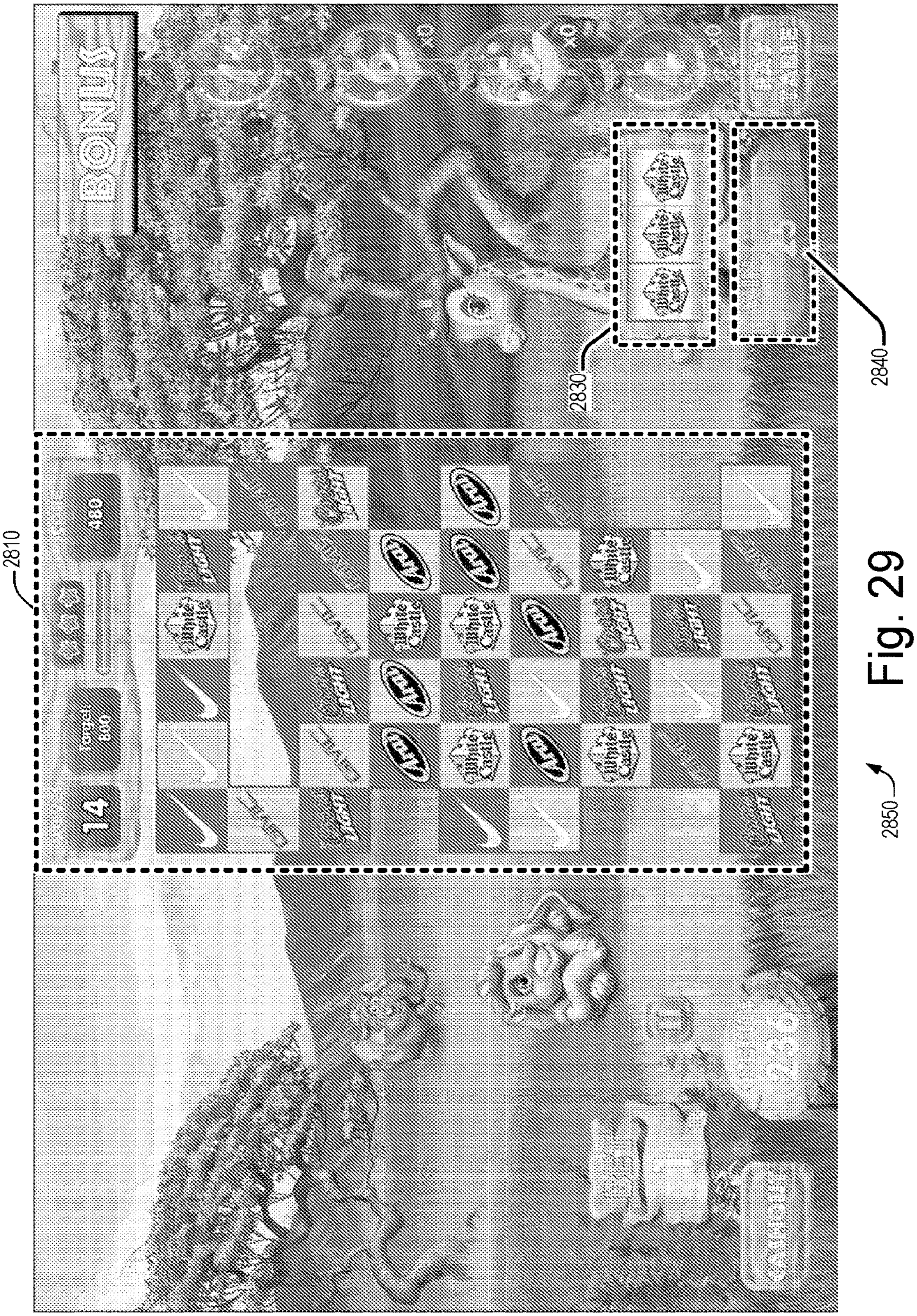

In one embodiment, when a player matches three adjacent game tiles (e.g., as shown at 2611), the hybrid arcade/wager-based game automatically initiates a wager-based game event, which, in this example, corresponds to a wager-based spin of slot reels 2630. The outcome of the wager-based slot reel spin is displayed at the virtual slot real GUI 2630 of FIG. 27. In this example embodiment, the symbols of the virtual slot reels correspond to the default slot reel symbols which were originally programmed for the hybrid arcade/wager-based game. Referring next to FIG. 28, when the player matches 4 adjacent game tiles (e.g., as shown at 2811), the hybrid arcade/wager-based game automatically initiates wager-based spin of slot reels 2830. The outcome of the wager-based slot reel spin is displayed at the virtual slot real GUI 2830 of FIG. 29. As illustrated in the example embodiment of FIG. 29, the symbols of the virtual slot reels have been dynamically reskinned (e.g., before, during, or after wager-based gameplay) to display different portions of advertising content (e.g., three White Castle™ logos) where the default slot reel symbols would normally be displayed. In at least one embodiment, the re-skinning of the slot reel symbols to display advertising content may not affect the wager-based game event outcome or the amount of payout.

Figure 30:
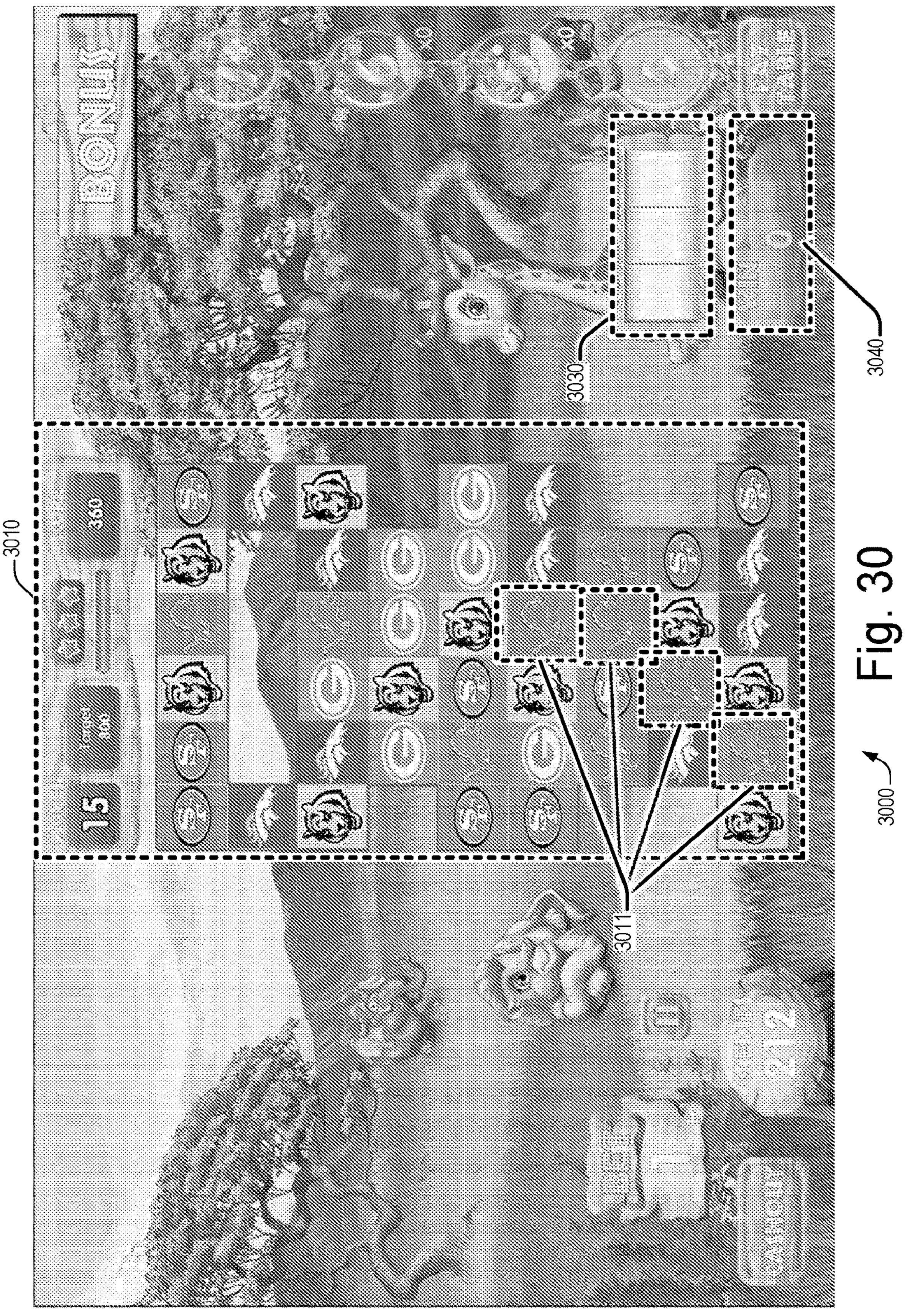
Figure 31:
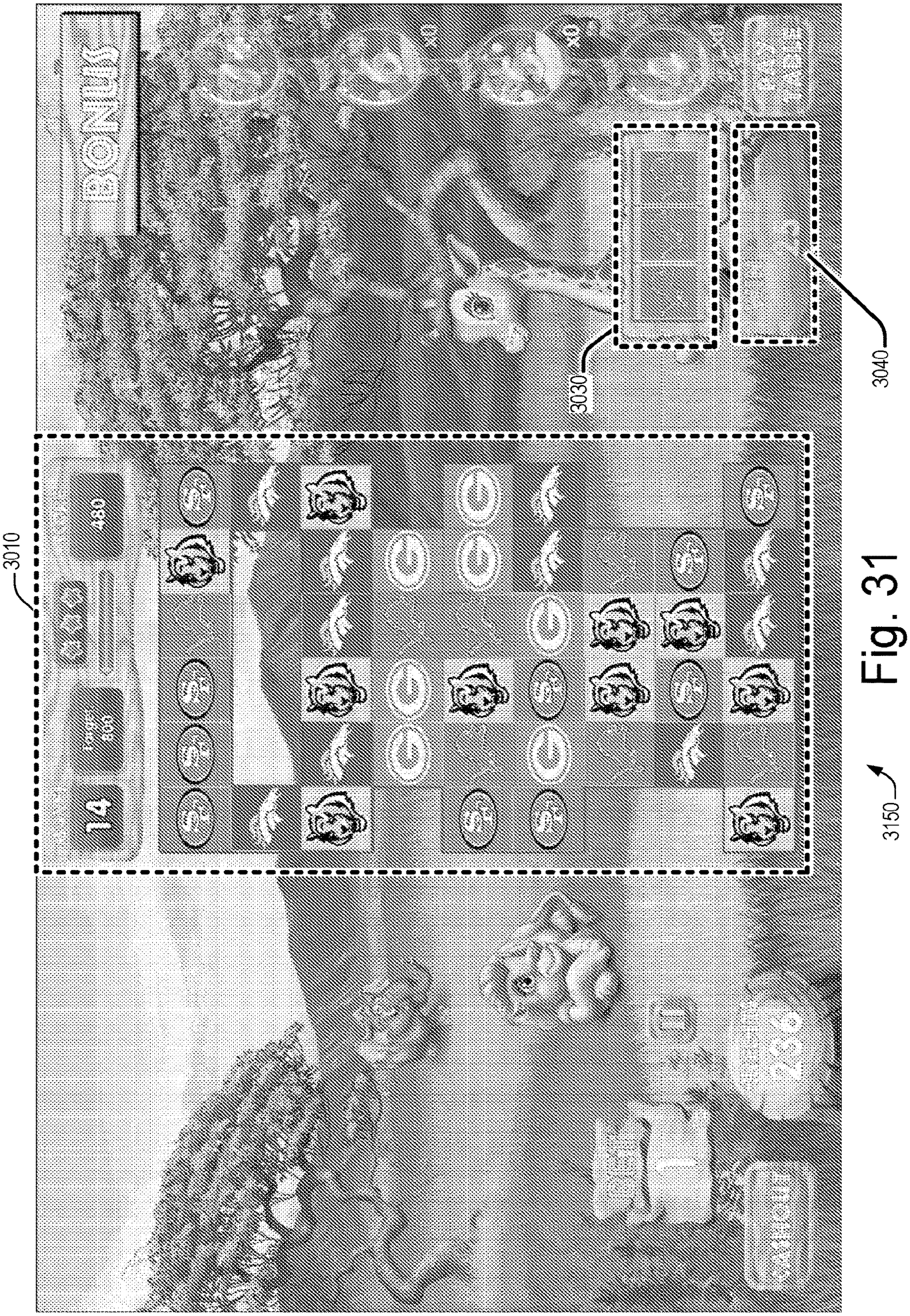

FIGS. 30 and 31 illustrate example screenshots of a similar "Match-X" hybrid arcade/wager-based game, except that the game tiles (3011, FIG. 30) and virtual slot reel symbols (e.g., 3030, FIG. 31) have been dynamically reskinned to display respective types of advertising content relating to NFL football team logos.

Figure 32:
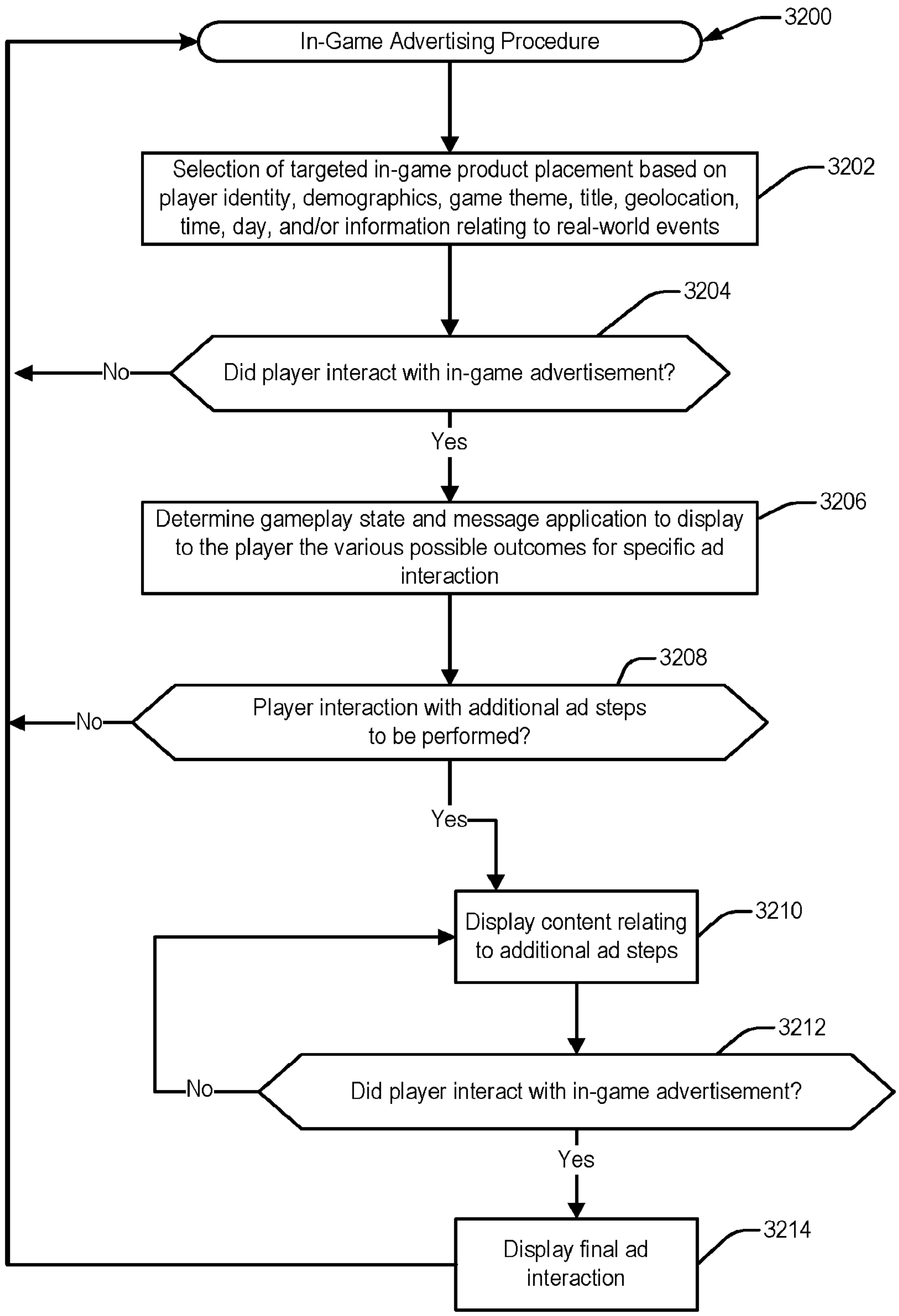

FIG. 32 shows a flow diagram of an In-Game Advertising Procedure 3200 in accordance with a specific embodiment. According to different embodiments, at least a portion of the various types of functions, operations, actions, and/or other features provided by the In-Game Advertising Procedure may be implemented at one or more client systems(s), at one or more System Servers (s), and/or combinations thereof.

In at least one embodiment, the In-Game Advertising Procedure may be operable to perform and/or implement various types of functions, operations, actions, and/or other features such as one or more of those described and/or referenced herein. In at least one embodiment, the In-Game Advertising Procedure may be operable to utilize and/or generate various different types of data and/or other types of information when performing specific tasks and/or operations. This may include, for example, input data/information and/or output data/information. For example, in at least one embodiment, the In-Game Advertising Procedure may be operable to access, process, and/or otherwise utilize information from one or more different types of sources, such as, for example, one or more local and/or remote memories, devices and/or systems. Additionally, in at least one embodiment, the In-Game Advertising Procedure may be operable to generate one or more different types of output data/information, which, for example, may be stored in memory of one or more local and/or remote devices and/or systems. Examples of different types of input data/information and/or output data/information which may be accessed and/or utilized by the In-Game Advertising Procedure may include, but are not limited to, one or more of those described and/or referenced herein.

In at least one embodiment, a given instance of the In-Game Advertising Procedure may access and/or utilize information from one or more associated databases. In at least one embodiment, at least a portion of the database information may be accessed via communication with one or more local and/or remote memory devices. Examples of different types of data which may be accessed by the In-Game Advertising Procedure may include, but are not limited to, one or more of those described and/or referenced herein.

According to specific embodiments, multiple instances or threads of the In-Game Advertising Procedure may be concurrently implemented and/or initiated via the use of one or more processors and/or other combinations of hardware and/or hardware and software. For example, in at least some embodiments, various aspects, features, and/or functionalities of the In-Game Advertising Procedure may be performed, implemented and/or initiated by one or more of the various systems, components, systems, devices, procedures, processes, etc., described and/or referenced herein.

According to different embodiments, one or more different threads or instances of the In-Game Advertising Procedure may be initiated in response to detection of one or more conditions or events satisfying one or more different types of minimum threshold criteria for triggering initiation of at least one instance of the In-Game Advertising Procedure. Various examples of conditions or events which may trigger initiation and/or implementation of one or more different threads or instances of the In-Game Advertising Procedure may include, but are not limited to, one or more of those described and/or referenced herein.

According to different embodiments, one or more different threads or instances of the In-Game Advertising Procedure may be initiated and/or implemented manually, automatically, statically, dynamically, concurrently, and/or combinations thereof. Additionally, different instances and/or embodiments of the In-Game Advertising Procedure may be initiated at one or more different time intervals (e.g., during a specific time interval, at regular periodic intervals, at irregular periodic intervals, upon demand, etc.).

In at least one embodiment, initial configuration of a given instance of the In-Game Advertising Procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the In-Game Advertising Procedure may correspond to and/or may be derived from the input data/information.

In the example embodiment of FIG. 32, it is assumed that the player has initiated gameplay of a wager-based game at a wager-based gaming device which is configured to support dynamic in-game advertising in accordance with one or more of the IAPP techniques described herein.

As shown at 3202 one or more operations may be performed relating to the selection of targeted in-game product placement based on player identity, demographics, game theme, title, geolocation, time, day, and/or information relating to real-world events. When the wager-based gaming device detects (3204) that the player has interacted with a displayed in-game advertisement, it may determine (3206) the gameplay state and message application to display to the player the various possible outcomes for specific ad interaction. If the system determines (3208) that player interaction with additional ad steps is to be performed (e.g., such as interacting with a pop up GUI and/or verification windows), the system may display (3210) the content relating to the additional ad steps. If the system determines that the player has performed the appropriate in-game ad step interactions, it may cause in-game content relating to a final ad interaction to be displayed (3214)

It will be appreciated that different embodiments of the In-Game Advertising Procedure (not shown) may include additional features and/or operations than those illustrated in the specific embodiment of FIG. 32, and/or may omit at least a portion of the features and/or operations of In-Game Advertising Procedure illustrated in the specific embodiment of FIG. 32. It will further be appreciated that the procedural diagrams of FIGS. 10-13 and 32 are merely specific examples of procedural flows and/or other activities which may be implemented to achieve one or more aspects of the In-Game Advertising techniques described herein. Other embodiments of procedural flows (not shown) may include additional, fewer and/or different steps, actions, and/or operations than those illustrated in the example procedural diagrams of FIGS. 10-13 and 32.

As noted previously, due in part to regulatory compliance and security requirements, there has been little or no incentive for motivating gaming machine manufacturers or casino operators to incorporate banner advertising functionality or other types of online advertising functionality into their wager-based gaming machine designs. Accordingly, it will further be appreciated that existing prior art relating to the introduction of online advertisements in non-wager-based games does not address the various regulatory constraints, security requirements and other limitations which have hitherto for prevented online advertising techniques from being implemented in wager-based games. Accordingly, one having ordinary skill in the art would not be able to use the teachings of prior art online advertising references to implement dynamic in-game advertising in wager-based gaming environments, without the need to exercise inventive skill and ordered to do so. It is noted that many prior art references relating to online advertising do not teach or suggest how to overcome the various problems and limitations for implementing dynamic in-game advertising in wager-based game environments. Non-wager-based gaming consoles such as XBOX™ or Playstation™ are significantly different from wager-based gaming machines such as those deployed in casino gaming environments. For example, electronic gaming machines (EGMs) require substantial security measures in order to be lawful and compliant for casino properties. EGMs are required to go through rigorous and extensive testing, monitoring and security in order to be deemed worthy of a casino floor. Additionally, EGM security as well as casino security require industry specific checks that make it virtually impossible for non-authorised non-approved content to be run on the EGMs. Moreover, casino EGMs are required to operate in a closed, secure, encrypted, highly regulated, and highly monitored environment.

Additionally, casino gaming networks are vastly different when compared to a typical online gaming network. The amount of security involved in a casino/gambling environment far surpasses that of any standard network situation. Casino networks, primarily electronic gaming/gambling machines need to strictly analyse and monitor jurisdictional and regulatory data sets with respect to specific casino gaming criteria. The security needs to evaluate whether or not any detected events meet or exceed specified threshold security criteria. The freedom of open online and cloud based systems allows for easier access for thieves and hackers to try and exploit the system.

The various in-game IAPP techniques described herein may be used to improve the visual relationship between player and machine to increase player immersion and facilitate longer more exciting gambling durations without providing a completely new back-end delivery structure. The in-game IAPP techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate.

Example Component, System, and Network Embodiments

FIG. 1 illustrates a simplified block diagram of a specific example embodiment of a Hybrid Arcade/Wager-Based (e.g., "HAWG") Gaming System 100 which may be implemented via a computerized data network. As described in greater detail herein, different embodiments of Hybrid Arcade/Wager-Based Gaming Systems may be configured, designed, and/or operable to provide various different types of operations, functionalities, and/or features generally relating to Hybrid Arcade/Wager-Based Gaming System technology. Further, as described in greater detail herein, many of the various operations, functionalities, and/or features of the Hybrid Arcade/Wager-Based Gaming System(s) disclosed herein may provide may enable or provide different types of advantages and/or benefits to different entities interacting with the Hybrid Arcade/Wager-Based Gaming System(s).

According to different embodiments, at least some Hybrid Arcade/Wager-Based Gaming System(s) may be configured, designed, and/or operable to provide a number of different advantages and/or benefits and/or may be operable to initiate, and/or enable various different types of operations, functionalities, and/or features, such as, for example, one or more of those described and/or referenced herein. According to different embodiments, at least a portion of the various functions, actions, operations, and activities performed by one or more component(s) of the Hybrid Arcade/Wager-Based Gaming System may be initiated in response to detection of one or more conditions, events, and/or other criteria satisfying one or more different types of minimum threshold criteria, such as, for example, one or more of those described and/or referenced herein. According to different embodiments, at least a portion of the various types of functions, operations, actions, and/or other features provided by the Hybrid Arcade/Wager-Based Gaming System may be implemented at one or more client systems(s), at one or more System Server(s), and/or combinations thereof. According to different embodiments, the Hybrid Arcade/Wager-Based Gaming System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Hybrid Arcade/Wager-Based Gaming System may include one or more types of systems, components, devices, processes, etc. (e.g., or combinations thereof) described and/or referenced herein.

According to different embodiments, the Hybrid Arcade/Wager-Based Gaming (e.g., HAWG) System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Hybrid Arcade/Wager-Based Gaming System may include one or more of the following types of systems, components, devices, processes, etc. (e.g., or combinations thereof):

- Local Casino System(s) 122 operable to perform and/or implement various types of functions, operations, actions, and/or other features such as those described or referenced herein. According to different embodiments, one or more Local Casino System(s) 122 may include, but are not limited to, one or more of the following (or combinations thereof):

- Casino Gaming System Server(s) 120—In at least one embodiment, the Casino Gaming System Server(s) may be operable to perform and/or implement various types of functions, operations, actions, and/or other features such as those described or referenced herein.
- Class 2 RNG System(s)/Service(s) 124 operable to perform and/or implement various types of functions, operations, actions, and/or other features such as those described or referenced herein. For example, in at least some embodiments, Class 2 RNG System(s)/Service(s) 124 may be operable to dynamically generate and/or provide Class 2 gaming type RNG outcomes to be used by Hybrid Arcade/Wager-Based Gaming devices as "predetermined" RNG outcome(s) relating to Class 2 type wager-based game event(s) occurring at the Hybrid Arcade/Wager-Based Gaming devices.
- Class 3 RNG System(s)/Service(s) 126 operable to perform and/or implement various types of functions, operations, actions, and/or other features such as those described or referenced herein. For example, in at least some embodiments, Class 3 RNG System(s)/Service(s) 126 may be operable to dynamically generate and/or provide Class 3 gaming type RNG outcomes to be used by Hybrid Arcade/Wager-Based Gaming devices as "predetermined" RNG outcome(s) relating to Class 3 type wager-based game event(s) occurring at the Hybrid Arcade/Wager-Based Gaming devices.
- Electronic Gaming Machine(s) (EGMs) 128 operable to perform and/or implement various types of functions, operations, actions, and/or other features such as those described or referenced herein.

Other Gaming Network(s).

IAPP System 121 configured or designed to include functionality for managing advertisement and product placement display locations, schedules, and rules relating to the display of advertisement content, product placement content, promotional content, etc. in the gaming environment. In at least one embodiment, Ad Management System 237 may be configured or designed to include appropriate hardware and software to enforce rules about the display and selection of advertisements within the game (e.g., evaluation and/or production of keys needed to insure proper distribution of the advertisements).

Client Computer System(s) 130 operable to perform and/or implement various types of functions, operations, actions, and/or other features such as those described or referenced herein.

3rd Party System(s) 150 operable to perform and/or implement various types of functions, operations, actions, and/or other features such as those described or referenced herein.

Internet & Cellular Network(s) 110.

Remote/Internet-based Gaming Service(s) 190 operable to perform and/or implement various types of functions, operations, actions, and/or other features such as those described or referenced herein. According to different embodiments, one or more Remote/Internet-based Gaming Service(s) 190 may include, but are not limited to, one or more of the following (or combinations thereof):

- Class 2 RNG System(s)/Service(s) 194 operable to perform and/or implement various types of functions, operations, actions, and/or other features such as those described or referenced herein. For example, in at least some embodiments, Class 2 RNG System(s)/Service(s) 194 may be operable to dynamically generate and/or provide Class 2 type RNG outcomes to be used by remote Hybrid Arcade/Wager-Based Gaming devices as "predetermined" RNG outcome(s) relating to Class 2 type wager-based game event(s) occurring at the Hybrid Arcade/Wager-Based Gaming devices.
- Class 3 RNG System(s)/Service(s) 196 operable to perform and/or implement various types of functions, operations, actions, and/or other features such as those described or referenced herein. For example, in at least some embodiments, Class 3 RNG System(s)/Service(s) 196 may be operable to dynamically generate and/or provide Class 3 type RNG outcomes to be used by remote Hybrid Arcade/Wager-Based Gaming devices as "predetermined" RNG outcome(s) relating to Class 3 type wager-based game event(s) occurring at the Hybrid Arcade/Wager-Based Gaming devices.
- Remote Database System(s) 180 operable to perform and/or implement various types of functions, operations, actions, and/or other features such as those described or referenced herein.
- Gaming Server(s) 192 operable to perform and/or implement various types of functions, operations, actions, and/or other features such as those described or referenced herein.
- Remote System(s)/Service(s) 170, which, for example, may include, but are not limited to, one or more of the following (e.g., or combinations thereof):
  - Content provider servers/services
  - Media Streaming servers/services
  - Database storage/access/query servers/services
  - Financial transaction servers/services
  - Payment gateway servers/services
  - Electronic commerce servers/services
  - Event management/scheduling servers/services
  - Etc.

Ad Networks 140—According to different embodiments, Ad Networks 140 may include, but are not limited to, one or more of the following (or combinations thereof):

- Advertising Service Provider (Ad Server) System(s), which, for example, may be operable to perform and/or implement various types of ad server functions, operations, actions, and/or other features such as those described or referenced herein.
- Publisher/Content Provider Servers(s), which, for example, may be configured or designed to render and provide access to various internet-based web sites, web pages, etc.
- Demand Partners/Advertising Networks, which, for example, may be operable to serve or supply ads, such as demand side partners (DSP), ATDs, RTB networks, mobile advertising networks (e.g., Adnet, S2S), ad campaign networks, trading desks and advertisers, such as Ford, Proctor & Gamble, and Coca-Cola.
- Etc.

Mobile Device(s) 160—In at least one embodiment, the Mobile Device(s) may be operable to perform and/or implement various types of functions, operations, actions, and/or other features such as those described or referenced herein.

Etc.

In at least one embodiment, the Hybrid Arcade/Wager-Based Gaming System may be operable to utilize and/or generate various different types of data and/or other types of information when performing specific tasks and/or operations. This may include, for example, input data/information and/or output data/information. For example, in at least one embodiment, the Hybrid Arcade/Wager-Based Gaming System may be operable to access, process, and/or otherwise utilize information from one or more different types of sources, such as, for example, one or more local and/or remote memories, devices and/or systems. Additionally, in at least one embodiment, the Hybrid Arcade/Wager-Based Gaming System may be operable to generate one or more different types of output data/information, which, for example, may be stored in memory of one or more local and/or remote devices and/or systems. Examples of different types of input data/information and/or output data/information which may be accessed and/or utilized by the Hybrid Arcade/Wager-Based Gaming System may include, but are not limited to, one or more of those described and/or referenced herein.

According to specific embodiments, multiple instances or threads of the Hybrid Arcade/Wager-Based Gaming System may be concurrently implemented and/or initiated via the use of one or more processors and/or other combinations of hardware and/or hardware and software. For example, in at least some embodiments, various aspects, features, and/or functionalities of the Hybrid Arcade/Wager-Based Gaming System may be performed, implemented and/or initiated by one or more of the various systems, components, systems, devices, procedures, processes, etc., described and/or referenced herein.

In at least one embodiment, a given instance of the Hybrid Arcade/Wager-Based Gaming System may access and/or utilize information from one or more associated databases. In at least one embodiment, at least a portion of the database information may be accessed via communication with one or more local and/or remote memory devices. Examples of different types of data which may be accessed by the Hybrid Arcade/Wager-Based Gaming System may include, but are not limited to, one or more of those described and/or referenced herein.

According to different embodiments, various different types of encryption/decryption techniques may be used to facilitate secure communications between devices in Hybrid Arcade/Wager-Based Gaming System(s) and/or Hybrid Arcade/Wager-Based Gaming Network(s). Examples of the various types of security techniques which may be used may include, but are not limited to, one or more of the following (e.g., or combinations thereof): random number generators, SHA-1 (e.g., Secured Hashing Algorithm), MD2, MD5, DES (e.g., Digital Encryption Standard), 3DES (e.g., Triple DES), RC4 (e.g., Rivest Cipher), ARC4 (e.g., related to RC4), TKIP (e.g., Temporal Key Integrity Protocol, uses RC4), AES (e.g., Advanced Encryption Standard), RSA, DSA, DH, NTRU, and ECC (e.g., elliptic curve cryptography), PKA (e.g., Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Hybrid Arcade/Wager-Based Gaming System may be initiated in response to detection of one or more conditions or events satisfying one or more different types of minimum threshold criteria for triggering initiation of at least one instance of the Hybrid Arcade/Wager-Based Gaming System. Various examples of conditions or events which may trigger initiation and/or implementation of one or more different threads or instances of the Hybrid Arcade/Wager-Based Gaming System may include, but are not limited to, one or more of those described and/or referenced herein.

It will be appreciated that the Hybrid Arcade/Wager-Based Gaming System of FIG. 1 is but one example from a wide range of Hybrid Arcade/Wager-Based Gaming System embodiments which may be implemented. Other embodiments of the Hybrid Arcade/Wager-Based Gaming System (e.g., not shown) may include additional, fewer and/or different components/features that those illustrated in the example Hybrid Arcade/Wager-Based Gaming System embodiment of FIG. 1.

Generally, the Hybrid Arcade/Wager-Based Gaming techniques described herein may be implemented in hardware and/or hardware+software. For example, they may be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the Hybrid Arcade/Wager-Based Gaming techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, system servers, cloud computing systems, network devices, etc.

Figure 2:
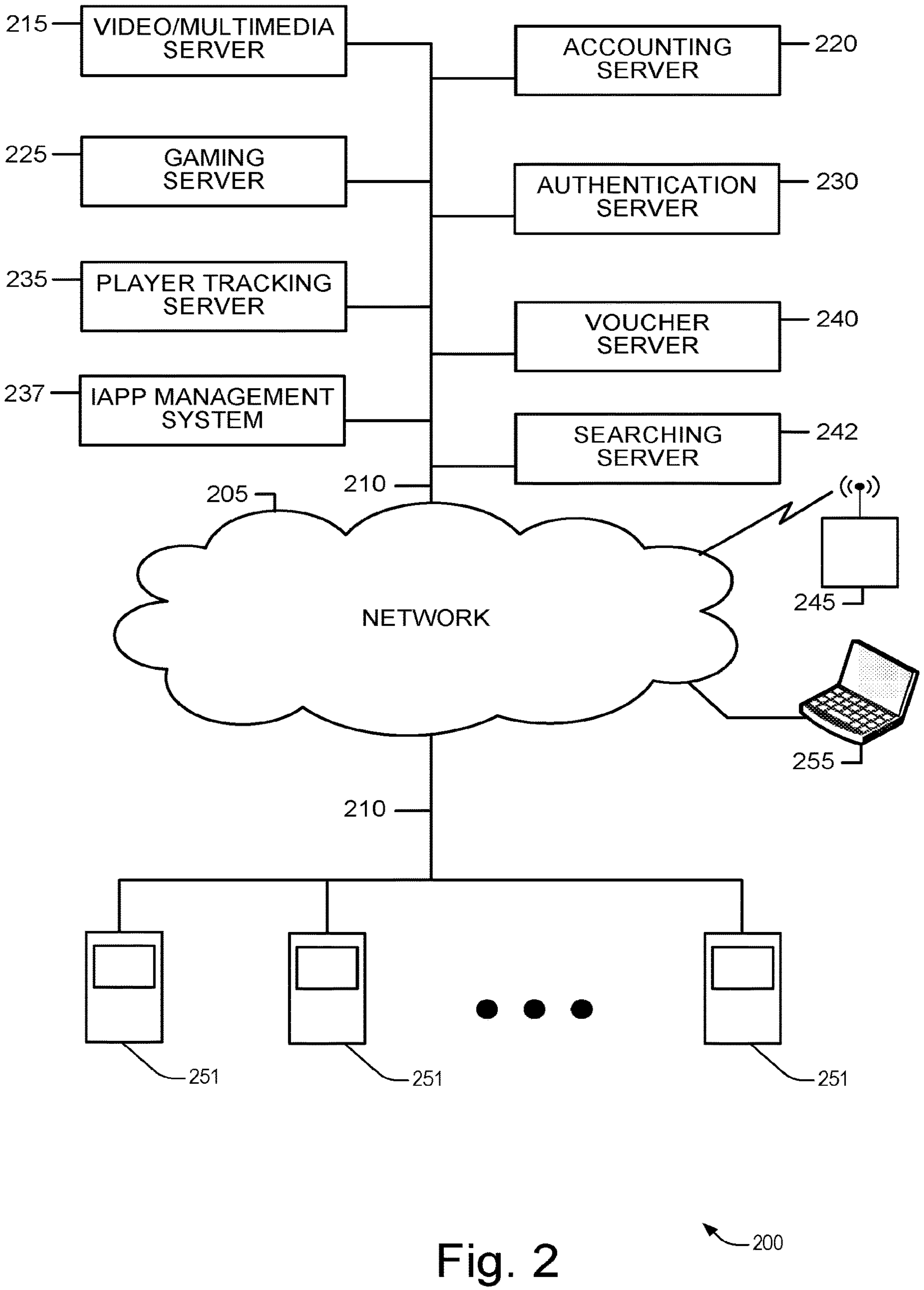
FIG. 2 shows an example block diagram of an electronic gaming system 200 in accordance with a specific embodiment.

FIG. 2 shows an example block diagram of an electronic gaming system 200 in accordance with a specific embodiment. Electronic gaming system 200 may include electronic gaming devices (e.g., electronic gaming terminals, electronic gaming machines, wager-based video gaming machines, etc.) 251, which may be coupled to network 205 via a network link 210. Network 205 may be the internet or a private network. One or more video streams may be received at video/multimedia server 215 from EGDs 251. Video/Multimedia server 215 may transmit one or more of these video streams to one or more: mobile devices 245, 255, electronic gaming devices (e.g., EGD) 251, and/or other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, IAPP management system 237, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g., free play), promotions, and/or other awards (e.g., complimentary food, drinks, lodging, concerts, etc.). Voucher server 240 may generate a voucher, which may include data relating to gaming options. For example, data relating to the structure may be generated. If there is a time deadline, that information may be generated by voucher server 240. Vouchers may be physical (e.g., paper) or digital.

IAPP Management System 237 may be configured or designed to include functionality for managing advertisement and product placement display locations, schedules, and rules relating to the display of advertisement content, product placement content, promotional content, etc. in the gaming environment. In at least one embodiment, Ad Management System 237 may be configured or designed to include appropriate hardware and software to enforce rules about the display and selection of advertisements within the game (e.g., evaluation and/or production of keys needed to insure proper distribution of the advertisements).

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which hybrid arcade/wager-based games paid out the most money during a time period, which hybrid arcade/wager-based games kept the most money from players during a time period, which hybrid arcade/wager-based games are most popular (e.g., top games), which hybrid arcade/wager-based games are least popular, which hybrid arcade/wager-based games have the most amount of money wager during a period, which hybrid arcade/wager-based games have the highest wager volume, which hybrid arcade/wager-based games are more volatile (e.g., volatility, or deviation from the statistical norms, of wager volume, wager amount, pay out, etc.) during a time period, and the like. Search may also be associated with location queries, time queries, and/or people queries.

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined. In another example, the searching structures may be based on one or more specific game types and/or themes (e.g., first person shooter types, first person rail types, TV themes, Movie themes, multiplayer types, etc.). Searching structure may search one or more of these games.

In another example, the searching structure may be based on a player's preferences, past transactional history, player input, a particular game, a particular EGD, a particular casino, a particular location within a casino, game outcomes over a time period, payout over a time period, and/or any other criteria.

Figure 3:
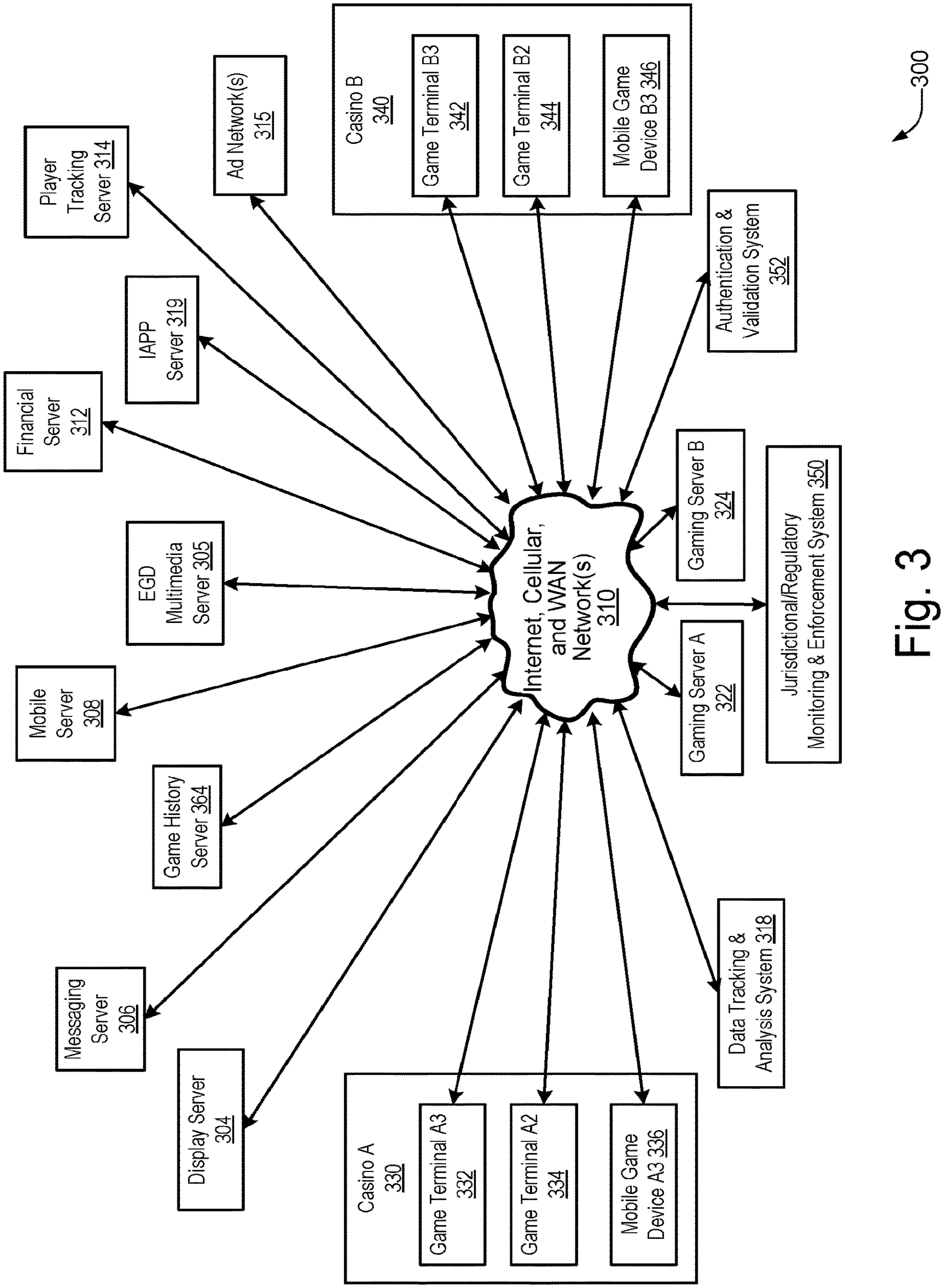
FIG. 3 illustrates a network diagram of an example embodiment of a Gaming Network 300 which may be configured or designed to implement various hybrid arcade/wager-based gaming techniques described and/or referenced herein.

Searching algorithms may be dynamic searching programs, which may be modified based on one or more past results. In one example, the search algorithm may determine that a specific triggering event occurs with a ninety percent success rate on a first EGD, a ten percent success rate on a second EGD, a fifty percent success rate on a third EGD, and a seventy percent success rate on a fourth EGD. The search algorithm may generate a search priority based on the probability of success, which may lead to the first EGD being searched first, the fourth EGD being searched second, the third EGD being searched third, and the second EGD being searched fourth. Search algorithm may utilize any dynamic feedback procedure to enhance current and/or future searching results FIG. 3 illustrates a network diagram of an example embodiment of a Gaming Network 300 which may be configured or designed to implement various hybrid arcade/wager-based gaming techniques described and/or referenced herein. As described in greater detail herein, different embodiments of Gaming Networks may be configured, designed, and/or operable to provide various different types of operations, functionalities, and/or features generally relating to Gaming Network technology. Further, as described in greater detail herein, many of the various operations, functionalities, and/or features of the Gaming Network(s) and/or Gaming System(s) disclosed herein may provide may enable or provide different types of advantages and/or benefits to different entities interacting with the Gaming Network(s).

According to different embodiments, at least some Gaming Network(s) may be configured, designed, and/or operable to provide a number of different advantages and/or benefits and/or may be operable to initiate, and/or enable various different types of operations, functionalities, and/or features, such as, for example, one or more of the following (e.g., or combinations thereof):

- Enable real-world casino venues to securely and legally provide opportunities for their players/players to participate in online or network-based wager-based gaming sessions. Examples of various types of games which may be played may include, but are not limited to, one or more hybrid arcade/wager-based game(s) such as those described and/or referenced herein.
- Enable casino venues to provide opportunities for their players/players to participate in live, multiplayer, wager-based, arcade-style video games where players from different casinos, different locations, and/or different EGDs, are able to compete against one another in a multiplayer, hybrid arcade/wager-based gaming environment. In at least one embodiment, players may be located at the same and/or at remote gaming venues that are connected via a wide area network such as the Internet, cellular networks, VPNs, cloud-based networks, etc.

Utilize live electronic gaming device dealers and attendants for conducting the wager-based, arcade-style video games.

Deploy electronic gaming devices (e.g., EGDs) in multiple different physical casino venues, and utilize the EGDs for enabling casino players/players to participate in wager-based, arcade-style video games.

Players may be allowed to manually switch or change their opponents (e.g., in heads-up game play).

Players may be automatically switched (e.g., by gaming system) to play different opponents (e.g., auto switching feature; useful for tournament play).

Gaming system may perform automated matching of players in tournament (e.g., based on various criteria such as, for example: skill level, experience, random, social relationships, etc.). In at least one embodiment, multi-property network connections between various different casino venues (e.g., located at different geographic locations) may be implemented and utilized to facilitate pairing of and/or participation by remote players.

In at least one embodiment, a central clearing house may be utilized for financial transactions (e.g., deposit, debit of player accounts, payouts, lines of credit, etc.) relating to the hybrid arcade/wager-based game sessions.

Various types of game play rules may be implemented and automatically enforced for the hybrid arcade/wager-based game sessions, such as, for example: time limit per play, amount per wager, max wager, maximum wager, rules to facilitate speed of game play, rules imposed for conformance with regulatory or jurisdiction requirements, etc. For example, in one embodiment, if a player failed to make a wager within an allotted time interval, the system may be configured or designed to automatically enter default wager for that player.

According to different embodiments, the Gaming Network 300 may include a plurality of different types of components, devices, modules, processes, systems, etc., which, for example, may be implemented and/or instantiated via the use of hardware and/or combinations of hardware and software. For example, as illustrated in the example embodiment of FIG. 3, the Gaming Network may include one or more of the following types of systems, components, devices, processes, etc. (e.g., or combinations thereof):

Display System Server(s) 304. In at least one embodiment, the Display System Server(s) may be configured or designed to implement and/or facilitate management of content (e.g., graphics, images, text, video fees, etc.) to be displayed and/or presented at one or more EGDs (e.g., or at one or more groups of EGDs), dealer displays, administrator displays, etc.

EGD Multimedia System Server(s) 305. In at least one embodiment, the Table Multimedia System Server(s) may be configured or designed to generate, implement and/or facilitate management of content (e.g., graphics, images, text, video fees, audio feeds, etc.), which, for example, is to be streamed or provided to one or more EGDs (e.g., or to one or more groups of EGDs).

Messaging System Server(s) 306. In at least one embodiment, the Messaging System Server(s) may be configured or designed to implement and/or facilitate management of messaging and/or other communications among and between the various systems, components, devices, EGDs, players, dealers, and administrators of the gaming network.

IAPP System 319, which, for example, may be configured or designed to include functionality for managing advertisement and product placement display locations, schedules, and rules relating to the display of advertisement content, product placement content, promotional content, etc. in the gaming environment. In at least one embodiment, Ad Management System 237 may be configured or designed to include appropriate hardware and software to enforce rules about the display and selection of advertisements within the game (e.g., evaluation and/or production of keys needed to insure proper distribution of the advertisements).

Mobile System Server(s) 308. In at least one embodiment, the Mobile System Server(s) may be configured or designed to implement and/or facilitate management of communications and/or data exchanged with various types of mobile devices, including for example: player-managed mobile devices (e.g., smart phones, PDAs, tablets, mobile computers), casino-managed mobile devices (e.g., mobile gaming devices), etc.

Financial System Server(s) 312. In at least one embodiment, the Financial System Server(s) may be configured or designed to implement and/or facilitate tracking, management, reporting, and storage of financial data and financial transactions relating to one or more hybrid arcade/wager-based game sessions. For example, at least some Financial System Server(s) may be configured or designed to keep track of the game accounting (e.g., money in, money out) for a virtual hybrid arcade/wager-based game being played, and may also be configured or designed to handle various financial transactions relating to player wagers and payouts. For example, in at least one embodiment, Financial Servers may be configured or designed to monitor each remote player's account information, and may also manage or handle funds transfers between each player's account and the active game server (e.g., associated with the player's game session).

Player Tracking System Server(s) 314. In at least one embodiment, the Player Tracking System Server(s) may be configured or designed to implement and/or facilitate management and exchange of player tracking information associated with one or more EGDs, hybrid arcade/wager-based game sessions, etc. In at least one embodiment, a Player Tracking System Server may include at least one database that tracks each player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for each game type, etc. A Player Tracking System Server may also help establish a player's preferences, which assists the casino in their promotional efforts to: award player comps (e.g., loyalty points); decide which promotion(s) are appropriate; generate bonuses; etc.

Data Tracking & Analysis System(s) 318. In at least one embodiment, the Data Tracking & Analysis System(s)

may be configured or designed to implement and/or facilitate management and analysis of game data. For example, in one embodiment the Data Tracking & Analysis System(s) may be configured or designed to aggregate multisite hybrid arcade/wager-based gaming trends, local wins, jackpots, etc.

Gaming System Server(s) (e.g., 322, 324). In at least one embodiment, different game servers may be configured or designed to be dedicated to one or more specifically designated type(s) of game(s). Each game server has game logic to host one of more virtual hybrid arcade/wager-based game sessions. At least some game server(s) may also be capable of keeping track of the game accounting (e.g., money in, money out) for a virtual hybrid arcade/wager-based game being played, and/or for updating the Financial Servers at the end of each game. The game server(s) may also operable to generate the EGD graphics primitives (e.g., game virtual objects and game states), and may further be operable to update EGDs when a game state change (e.g., new card dealt, player upped the ante, player folds/busts, etc.) may be detected.

Jurisdictional/Regulatory Monitoring & Enforcement System(s) 350. In at least one embodiment, the Jurisdictional/Regulatory Monitoring & Enforcement System(s) may be configured or designed to handle tracking, monitoring, reporting, and enforcement of specific regulatory requirements relating to wager-based gameplay activities in one or more jurisdictions.

Authentication & Validation System(s) 352. According to different embodiments, the Authentication & Validation System(s) may be configured or designed to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player. In at least one implementation, various security features may be incorporated into the EGD to prevent unauthorized players from engaging in certain types of activities at the EGD. In some embodiments, the Authentication & Validation System(s) may be configured or designed to authenticate and/or validate various types of hardware and/or software components, such as, for example, hardware/software components residing at a remote EGDs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Casino Venues (e.g., 330, 340). In at least one embodiment, each casino venue may correspond to a real-world, physical casino which is located at a particular geographic location. In some embodiments, a portion of the multiple different casino venues may be affiliated with each other (e.g., Harrah's Las Vegas, Harrah's London). In other embodiments, at least a portion of the multiple different casino venues do not share any affiliation with each other.

Electronic gaming devices (e.g., EGDs) 332, 334, 336, 342, 344, 346. As described in greater detail herein, the EGDs may be configured or designed to facilitate and enable players to participate in wager-based, arcade-style video game sessions (e.g., and/or other types of hybrid arcade/wager-based game sessions). Different EGDs may be physically located in one or more different casino venues, and may be connected via a communication network. In some embodiments, EGDs may be implemented as stationary machines. In some embodiments, at least some EGDs may be implemented using mobile devices (e.g., tablets, smartphones, laptops, PC's, and the like).

Internet, Cellular, and WAN Network(s) 310

Game History Server(s) 364. In at least one embodiment, the Game History Server(s) may be configured or designed to track all (e.g., or selected) game types and game play history for all (e.g., or selected) hybrid arcade/wager-based games. In some embodiments, a Game History Server may also assist the casino manager in case of disputes between players and the casino by, for example, providing the ability to "replay" (e.g., by virtually recreating the game events) the game in dispute, step by step, based on previously stored game states. Such dispute resolution capability is a desirable feature in hybrid arcade/wager-based game environments.

Remote Database System(s) which, for example, may be operable to store and provide access to various types of information and data described herein.

Remote System Server(s)/Service(s), which, for example, may include, but are not limited to, one or more of the following (e.g., or combinations thereof):
- Content provider servers/services
- Media Streaming servers/services
- Database storage/access/query servers/services
- Financial transaction servers/services
- Payment gateway servers/services
- Electronic commerce servers/services
- Event management/scheduling servers/services
- Etc.

Ad Networks 315, which, for example, may include, but are not limited to, one or more of the following (or combinations thereof):
- Advertising Service Provider (Ad Server) System(s), which, for example, may be operable to perform and/or implement various types of ad server functions, operations, actions, and/or other features such as those described or referenced herein.
- Publisher/Content Provider Servers(s), which, for example, may be configured or designed to render and provide access to various internet-based web sites, web pages, etc.
- Demand Partners/Advertising Networks, which, for example, may be operable to serve or supply ads, such as demand side partners (DSP), ATDs, RTB networks, mobile advertising networks (e.g., Adnet, S2S), ad campaign networks, trading desks and advertisers, such as Ford, Proctor & Gamble, and Coca-Cola.
- Etc.

Figure 6:
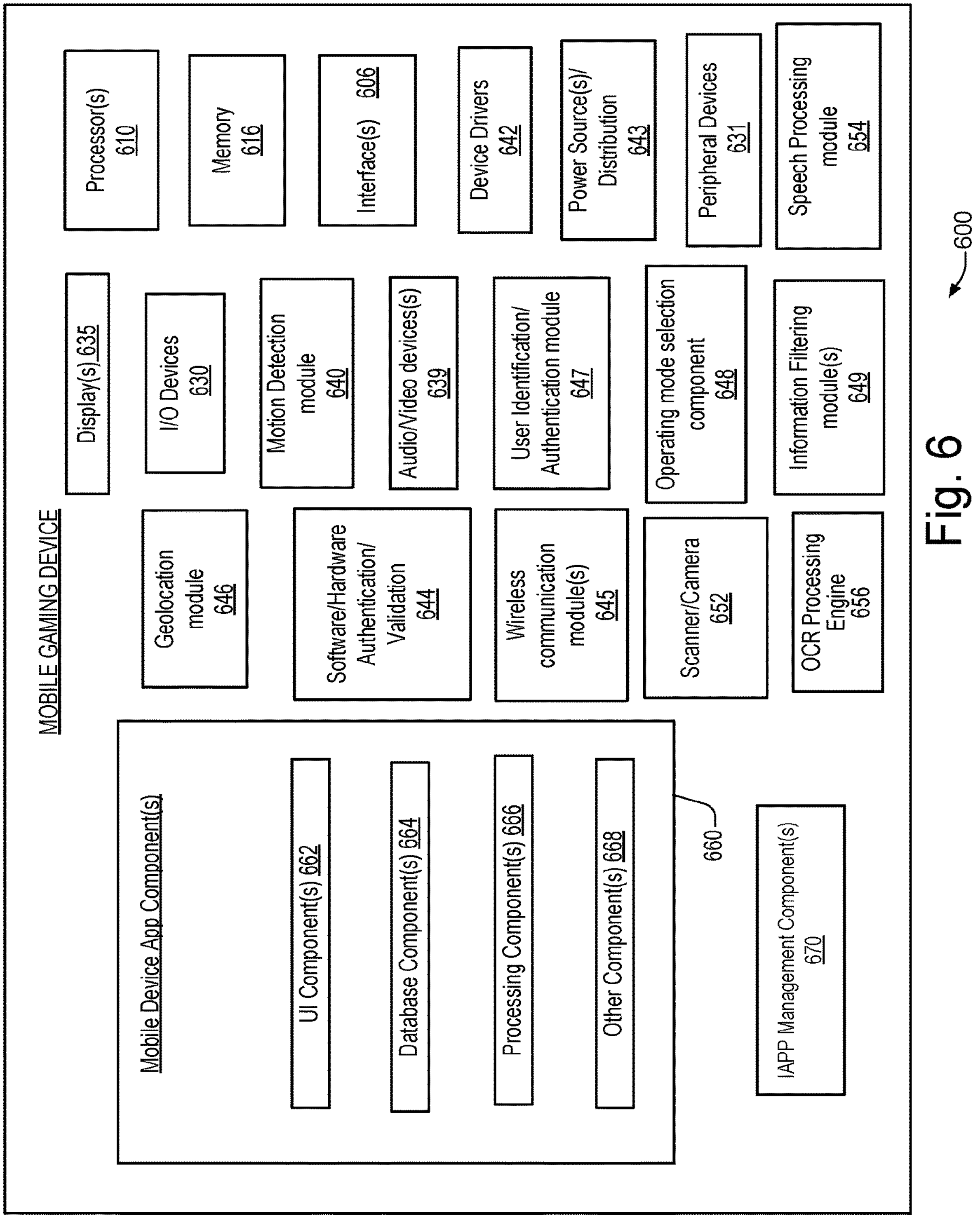
FIG. 6 is a simplified block diagram of an exemplary mobile gaming device 600 in accordance with a specific embodiment.

Mobile Game Device(s) 336, 346—In at least one embodiment, the Mobile Device(s) may be operable to perform and/or implement various types of functions, operations, actions, and/or other features such as those described or referenced herein (e.g., such as those illustrated and/or described with respect to FIG. 6).

According to specific embodiments, a variety of different game states may be used to characterize the state of current and/or past events which are occurring (e.g., or have occurred) at a given EGD. For example, in one embodiment, at any given time in a game, a valid current game state may be used to characterize the state of game play (e.g., and/or other related events, such as, for example, mode of operation of the EGD, etc.) at that particular time. In at least one embodiment, multiple different states may be used to characterize different states or events which occur at the EGD at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the EGD may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming EGD. Examples of such entities may include, but are not limited to, one or more of the following (e.g., or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the EGD may be operable to automatically monitor game play activities at the EGD, and/or to automatically identify key events which may trigger a transition of game state from one state to another as a game progresses. Depending upon the type of game being played at the gaming table, examples of possible key events may include, but are not limited to, one or more of the following (e.g., or combination thereof):

- start of a new hybrid arcade/wager-based gaming session;
- end of a current hybrid arcade/wager-based gaming session;
- start of a virtual slot wheel spin;
- game start event;
- game end event;
- detection of event for triggering initiation of wager-based event (e.g., destroying a zombie on screen triggers spin of virtual slot reel, and subsequent payout/credit award);
- detection of event for triggering end of wager-based event (e.g., slot wheel spin, etc.);
- detection of event for triggering initiation of randomized game play event;
- detection of event for triggering end of randomized game play event;
- initial wager period start;
- initial wager period end;
- subsequent wager period start;
- subsequent wager period end;
- payout period start;
- payout period end;
- etc.

FIGS. 4, 5, 6, and 14 show block diagrams of different example embodiments of electronic gaming machines (e.g., EGMs) or electronic gaming devices ("EGDs) which may be used for facilitating, enabling, initiating, and/or implementing one or more of the hybrid arcade/wager-based gaming aspects described herein.

Figure 4:
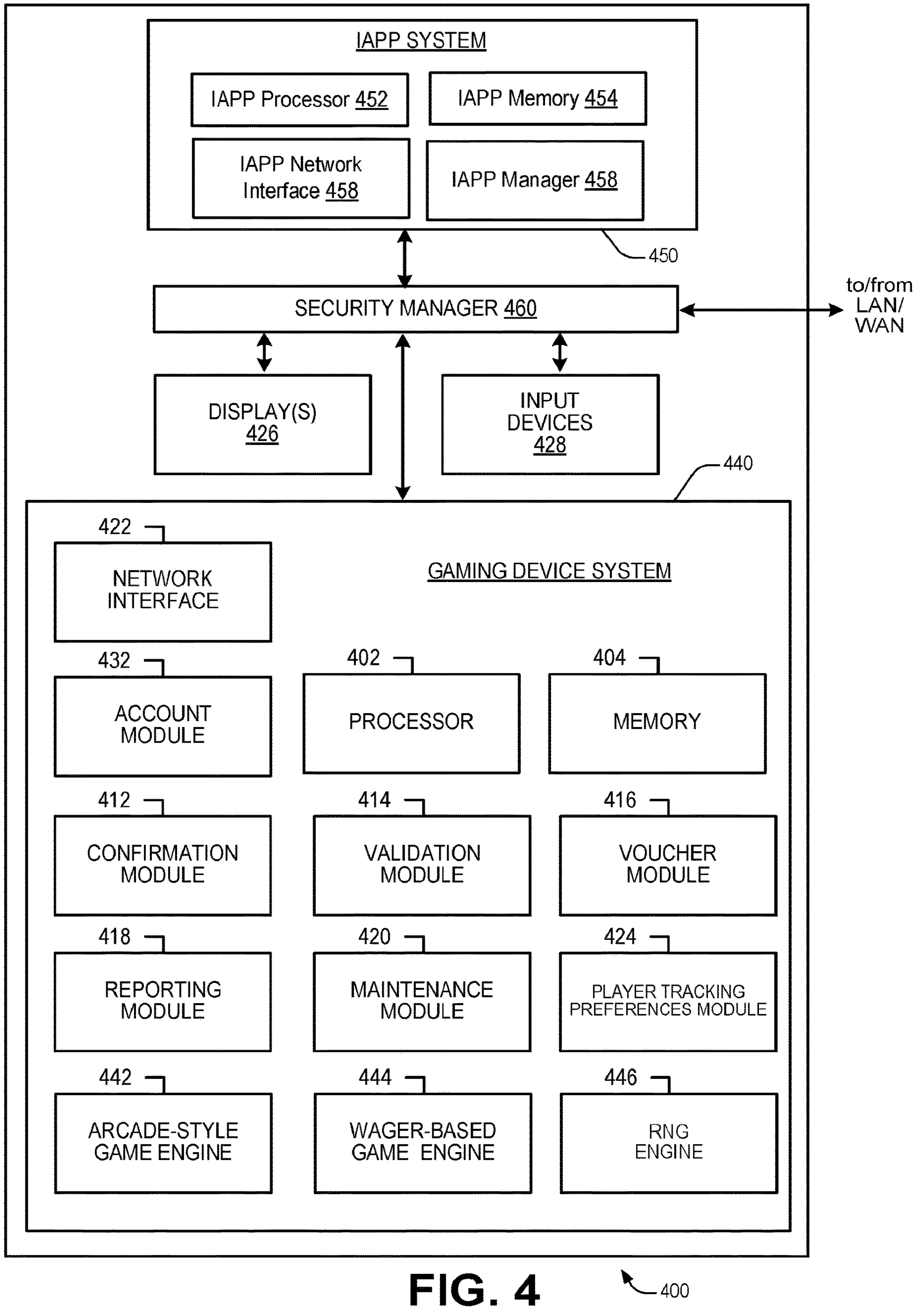
FIG. 4 shows a block diagram of electronic gaming device 400, in accordance with a specific embodiment.

FIG. 4 shows a block diagram 400 of electronic gaming device (EGD) 400, in accordance with a specific embodiment. In the example embodiment of FIG. 4, gaming device 400 has been specifically configured or designed for use as a certified or regulated wager-based gaming device, such as, for example, a gaming machine deployed at a casino gaming establishment. Additionally, gaming device 400 has been specifically configured or designed to support implementation of one or more IAPP techniques in connection with wager-based game play conducted at the EGD.

As illustrated in the example embodiment of FIG. 4, the EGD 400 includes a gaming device system 440, and an IAPP system 450. In at least some embodiments, the EGD system 440 may include a plurality of hardware and/or software components, including, for example, one or more of the following (or combinations thereof):

- At least one game processor 402. In at least one embodiment, processor 402 may generate gaming options based on predetermined betting structures and/or outcome categories. Predetermined betting structures may utilize more than one outcome category to generate via processor 402 gaming options. Predetermined betting structures may combine any outcome category with any other outcome category to gaming options. Processor 402 may offer a gaming option which is structured so that the gaming option relates to more than one EGD. Processor 402 may generate contingent gaming options and/or predetermined gaming options. Contingent gaming options may be structures such that when a triggering event occurs over one or more than one gaming event, racing event, and/or sporting event, the wager is activated.
- Network interface 422, which for example, may allow electronic gaming device 400 to communicate with remote devices/systems such as, for example, video/multimedia server(s), accounting/transaction server(s), gaming server(s), authentication server(s), player tracking server(s), voucher server(s), etc.
- Arcade-Style Game Engine 442, which for example, may be configured or designed to manage the arcade-style game play portion (or entertainment portion) of the hybrid arcade/wager-based game.
- Wager-Based Game Engine 444, which for example, may be configured or designed to manage the wager-based game event portion(s) of the hybrid arcade/wager-based game.
- Random Number Generator (RNG) Engine 446, which for example, may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).
- Memory 404 may include various memory modules 440. Memory 404 via various memory modules 440 may include a confirmation module 412, a validation module 414, a voucher module 416, a reporting module 418, a maintenance module 420, a player tracking preferences module 424, and an account module 432.

Confirmation module 412, which for example, may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414, which for example, may utilize data received from a voucher to confirm the validity of the voucher.

Voucher module 416, which for example, may store data relating to generated vouchers, redeemed vouchers, bought vouchers, and/or sold vouchers.

Reporting module 418, which for example, may generate reports related to a performance of electronic gaming device 400, electronic gaming system(s), hybrid arcade/wager-based game(s), video streams, gaming objects, credit device(s), identification device(s), etc. In one implementation, reporting module 418 may reside on a central server and can aggregate and generate real time statistics on betting activities at one or more hybrid arcade/wager-based games at one or more participating casino's. The aggregate betting statistics may include trends (e.g., aggregate daily wager volume and wager amount by game types, by casinos, and the like), top games with the most payouts, top tables with the most payouts, top search structures used by players, most popular hybrid arcade/wager-based game(s) by wager volume, most searched for game, hybrid arcade/wager-based game(s) with least payouts, weekly trends, monthly trends, and other statistics related to game plays, wagers, people, location, and searches. The information and statistics generated by the server-based reporting module 418 may be displayed publicly or privately. For example, popular trending and statistical information on wager volume and wager amount for the top ten hybrid arcade/wager-based games may be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420, which for example, may track any maintenance that is implemented on electronic gaming device 400 and/or electronic gaming system 200. Maintenance module 420 may schedule preventative maintenance and/or request a service call based on a device error.

Player tracking preferences module 424, which for example, may compile and track data associated with a players preferences.

Account module 432, which for example, may include data relating to an account balance, a wager limit, a number of wagers placed, credit limits, any other player information, and/or any other account information. Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

Etc.

In at least some embodiments, the IAPP system 450 may include a plurality of hardware and/or software components, including, for example, one or more of the following (or combinations thereof):

IAPP Processor 452 for facilitating IAPP-related activities conducted at the EGD.

IAPP Memory 454 for facilitating IAPP-related activities conducted at the EGD.

IAPP Network Interface 458 for facilitating IAPP-related activities conducted at the EGD.

IAPP Manager 458 for facilitating IAPP-related activities conducted at the EGD. In at least one embodiment, IAPP Manager 458 may be configured or designed to include functionality for managing advertisement and product placement display locations, schedules, and rules relating to the display of advertisement content, product placement content, promotional content, etc. in the wager-based gaming environment. In at least one embodiment, IAPP Manager 458 may be configured or designed to include appropriate hardware and software to enforce rules about the display and selection of advertisements within the game (e.g., evaluation and/or production of keys needed to insure proper distribution of the advertisements).

In at least one embodiment, the EGD system 440 may include all the necessary hardware and/or software components which may be required for enabling the EGD to be deployed at a casino gaming establishment, and for enabling patrons of the casino gaming establishment to engage in wager-based gameplay at the EGD.

In at least one embodiment, the IAPP system 450 may include all the necessary hardware and/or software components which may be needed for enabling one or more IAPP techniques to be implemented at the EGD, including, for example, enabling the dynamic display of in-game advertisement content, in-game product placement content, in-game promotional content, etc. in the gaming environment of wager-based games, hybrid arcade/wager-based games, and/or non-wager-based games played at the EGD 400.

In at least one embodiment, the components and system resources of the EGD system 440 may be partitioned or isolated from the components and system resources of the IAPP system 450 in a manner so as to prevent or restrict the sharing of resources between the device system 440 and the IAPP system 450. Although one having ordinary skill in the art may consider it undesirable to design a gaming device in such a manner (e.g., due to the potential for increased cost of manufacturing and underutilized resources), the design configuration of gaming device 400 provides the added benefit of enabling one or more IAPP techniques to be implemented at a wager-based gaming device while concurrently maintaining regulatory compliance of the wager-based game device and any wager-based activities conducted at the wager-based gaming device.

In at least one embodiment, the EGD may include a security manager 460, which may be configured or designed to include functionality for facilitating, enabling, initiating, and/or performing one or more of the following operation(s), action(s), and/or feature(s) (or combinations thereof):

Managing and maintaining security at the EGD.

Managing and maintaining security with respect to communications between one or more of the EGD components and remote devices.

Managing and maintaining security with respect to communications between the IAPP system components and the EGD system components.

Managing and maintaining security with respect to communications between the IAPP system components and shared resources such as, for example, displays 426, input device(s) 428, etc.

Managing and maintaining security with respect to communications between the EGD system components and shared resources such as, for example, displays 426, input device(s) 428, etc.

Etc.

According to different embodiments, the EGD may be configured or designed to permit, restrict, control and/or manage the sharing of one or more resources between one or more of the following (or combinations thereof):

the IAPP system components and the EGD system components;

the IAPP system components and the security manager components;

the EGD system components and the security manager components;

etc.

In at least one embodiment, display 426 may be configured or designed to concurrently display wager-based game content (e.g., provided by the gaming device system 440, and IAPP content (e.g., advertising and/or product placement content provided by IAPP system 450). In some embodiments, the gaming device 400 may be configured or designed to display, at display 426, video streams from one or more gaming devices, gaming objects from one or more gaming devices, computer generated graphics, predetermined gaming options, and/or contingent gaming options.

In at least one embodiment, input device(s) 428 may include one or more of the following (or combinations thereof): mechanical buttons, electronic buttons, a touchscreen, a microphone, cameras, optical sensors, and the like. Input device(s) 428 may be configured or designed to receive player input, and to convey information or signals relating to the player input to one or more components of the gaming device. In at least some embodiments, one or more input devices may be utilized by a patron to facilitate, enable, initiate, and/or perform one or more of the following operation(s), action(s), and/or feature(s) (or combinations thereof) at the EGD:

Make a wager;

Engage in wager-based gameplay at the gaming device or any combination thereof.

Make an offer to buy or sell a voucher;

Determine a voucher's worth;

Cash in a voucher;

Modify parameters or features (e.g.;

Change sound level, configuration parameters, player preferences, display font, language, etc.;

Select a movie or music;

Select type of content to be displayed on main and/or auxiliary screen(s);

Interact with in-game advertising content;

Interact with in game promotional content;

Interact with in game product placement content

Etc.

In at least one embodiment, at least a portion of the modules discussed in block diagram 400 may reside locally in gaming terminal 400. However, in at least some embodiments, the functions performed by these modules may be implemented in one or more remote servers. For instance, modules 406-420 and 424 may each be on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless.

In one implementation, reporting module 418 may reside on a central server and can aggregate and generate real time statistics on betting activities at one or more hybrid arcade/wager-based games at one or more participating casino's. The aggregate betting statistics may include trends (e.g., aggregate daily wager volume and wager amount by game types, by casinos, and the like), top games with the most payouts, top EGDs with the most payouts, top search structures used by players, most popular hybrid arcade/wager-based game(s) by wager volume, most searched for game(s), EGDs with least payouts, weekly trends, monthly trends, and other statistics related to game plays, wagers, people, location, and searches.

The information and statistics generated by the server-based reporting module 418 may be displayed publicly or privately. For example, popular trending and statistical information on wager volume and wager amount for the top ten hybrid arcade/wager-based games may be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
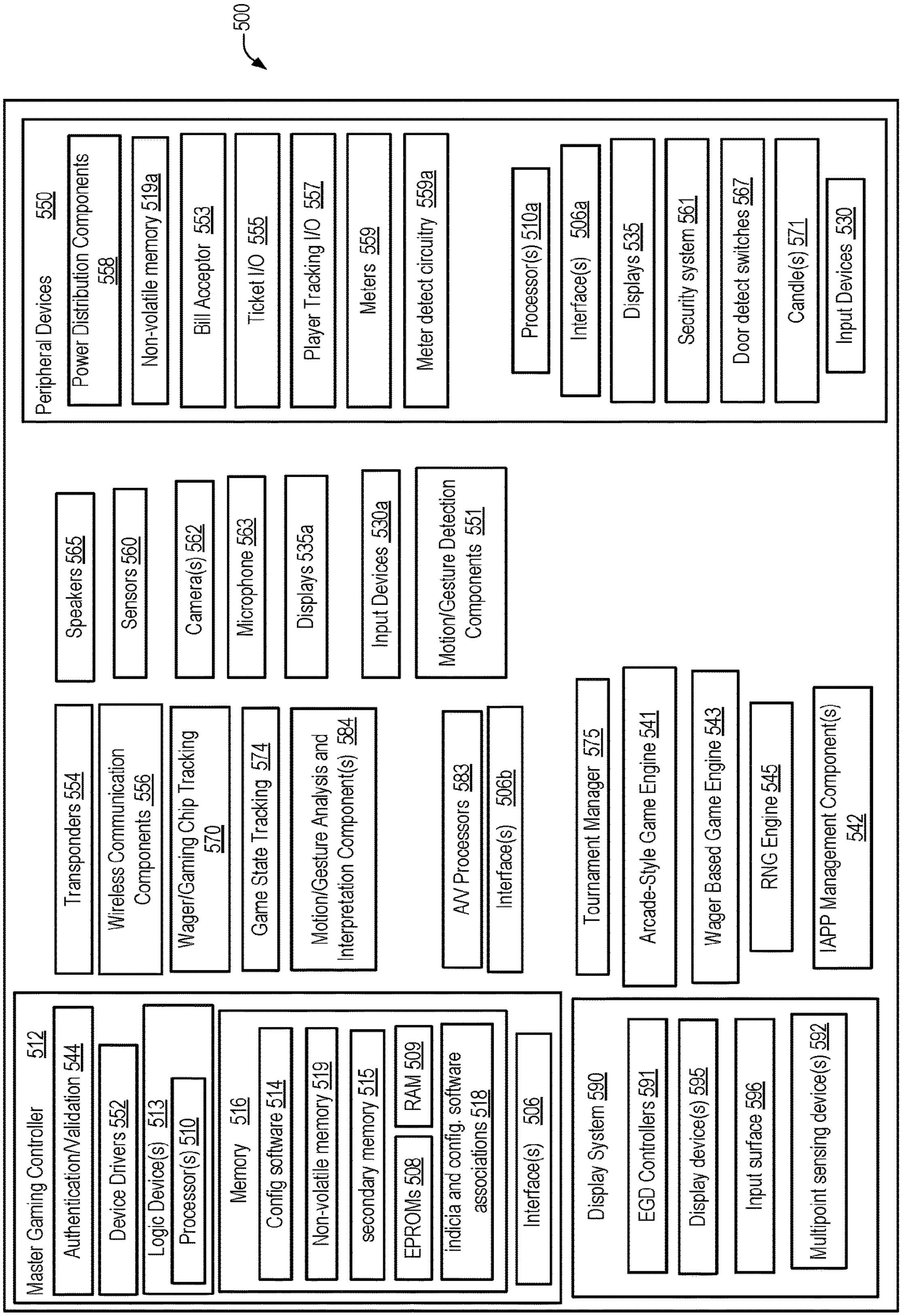
FIG. 5 is a simplified block diagram of an exemplary intelligent electronic gaming system 500 in accordance with a specific embodiment.

FIG. 5 is a simplified block diagram of an exemplary intelligent multi-player electronic gaming system 500 in accordance with a specific embodiment. In some embodiments, gaming system 500 may be implemented as a gaming server. In other embodiments, gaming system 500 may be implemented as an electronic gaming machine (e.g., EGM) or electronic gaming device (e.g., EGD).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (e.g., or combinations thereof):

Arcade-Style Game Engine(s) 541;

Wager-Based Game Engine(s) 543;

RNG Engine(s) 545;

IAPP Management Component(s) 542;

Candle control system which, for example, may include functionality for determining and/or controlling the appearances of one or more candles, etc.;

Transponders 554;

Wireless communication components 556;

Gaming chip/wager token tracking components 570;

Games state tracking components 574;

Motion/gesture analysis and interpretation components 584.

Audio/video processors 583 which, for example, may include functionality for detecting, analyzing and/or managing various types of audio and/or video information relating to various activities at the gaming system.

Various interfaces 506*b* (e.g., for communicating with other devices, components, systems, etc.);

Tournament manager 575;

Sensors 560;

One or more cameras 562;

One or more microphones 563;

Secondary display(s) 535*a;*

Input devices 530*a;*

Motion/gesture detection components 551;

Peripheral Devices 550; In at least one embodiment, IAPP Management Component(s) 542 may include functionality for facilitating IAPP-related activities conducted at the EGM. For example, some IAPP Management Component(s) 542 may be configured or designed to include functionality for managing advertisement and product placement display locations, schedules, and rules relating to the display of advertisement content, product placement content, promotional content, etc. in the wager-based gaming environment. In at least one embodiment, IAPP Management Component(s) 542 may be configured or designed to include appropriate hardware and software to enforce rules about the display and selection of advertisements within the game (e.g., evaluation and/or production of keys needed to insure proper distribution of the advertisements).

Arcade-Style Game Engine(s) 541 may be configured or designed to manage the arcade-style game play portion (or entertainment portion) of the hybrid arcade/wager-based game.

Wager-Based Game Engine(s) 543 may be configured or designed to manage the wager-based game event portion(s) of the hybrid arcade/wager-based game.

Random Number Generator (RNG) Engine(s) 545 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).

Monetary Payout Manager 522 may be configured or designed to include functionality for determining the appropriate monetary payout(s) (if any) to be distributed to player(s) based on the outcomes of the wager-based game events which are initiated during play of one or more hybrid arcade/wager-based games.

Non-Monetary Payout Manager 524 may be configured or designed to include functionality for determining the appropriate non-monetary payout(s) (if any) to be awarded or distributed to player(s) based on the outcomes of the wager-based game events which are initiated during play of one or more hybrid arcade/wager-based games.

One or more cameras (e.g., 562) may be used to monitor, stream and/or record image content and/or video content relating to persons or objects within each camera's view. For example, in at least one embodiment where the gaming system is implemented as an EGD, camera 562 may be used to generate a live, real-time video feed of a player (e.g., or other person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (e.g., or combinations thereof):

EGD controllers 591;

Multipoint sensing device(s) 592 (e.g., multi-touch surface sensors/components);

Display device(s) 595;

Input/touch surface 596;

Etc.

According to various embodiments, display surface(s) 595 may include one or more display screens utilizing various types of display technologies such as, for example, one or more of the following (e.g., or combinations thereof): LCDs (e.g., Liquid Crystal Display), Plasma, OLEDs (e.g., Organic Light Emitting Display), TOLED (e.g., Transparent Organic Light Emitting Display), Flexible (e.g., F) OLEDs, Active matrix (e.g., AM) OLED, Passive matrix (e.g., PM) OLED, Phosphor-escent (e.g., PH) OLEDs, SEDs (e.g., surface-conduction electron-emitter display), EPD (e.g., ElectroPhoretic display), FEDs (e.g., Field Emission Displays) and/or other suitable display technology. EPD displays may be provided by E-ink of Cambridge, Massachusetts OLED displays of the type list above may be provided by Universal Display Corporation, Ewing, New Jersey In at least one embodiment, master gaming controller 512 may include one or more of the following (e.g., or combinations thereof):

Authentication/validation components 544;

Device drivers 552;

Logic devices 513, which may include one or more processors 510;

Memory 516, which may include one or more of the following (e.g., or combinations thereof): configuration software 514, non-volatile memory 519, EPROMS 508, RAM 509, associations 518 between indicia and configuration software, etc.;

Interfaces 506;

Etc.

In at least one embodiment, Peripheral Devices 550 may include one or more of the following (e.g., or combinations thereof):

Power distribution components 558;

Non-volatile memory 519*a* (e.g., and/or other types of memory);

Bill acceptor 553;

Ticket I/O 555;

Player tracking I/O 557;

Meters 559 (e.g., hard and/or soft meters);

Meter detect circuitry 559*a;*

Processor(s) 510*a;*

Interface(s) 506*a;*

Display(s) 535;

Independent security system 561;

Door detect switches 567;

Candles, etc. 571;

Input devices 530;

Etc.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of game play/event information, wagering information, and/or other desired information.

In at least one implementation, the gaming system may include card readers such as used with credit cards, or other identification code reading devices to allow or require player identification in connection with play of the card game and associated recording of game action. Such a player identification interface may be implemented in the form of a variety of magnetic card readers commercially available for reading a player-specific identification information. The player-specific information may be provided on specially constructed magnetic cards issued by a casino, or magnetically coded credit cards or debit cards frequently used with national credit organizations such as Visa, Mastercard, American Express, or banks and other institutions.

The gaming system may include other types of participant identification mechanisms which may use a fingerprint image, eye blood vessel image reader, or other suitable biological information to confirm identity of the player. Such personalized identification information could also be used to confirm credit use of a smart card, transponder, and/or player's personal player input device (e.g., UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 4) a secondary memory storage device 515 such as a non-volatile memory device, configured to store gaming software related information (e.g., the gaming software related information and memory may be used to store various audio files and games not currently being used and invoked in a configuration or reconfiguration); 5) communication transport protocols (e.g., such as, for example, TCP/IP, USB, Firewire, IEEE1394, Bluetooth, IEEE 802.11× (e.g., IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (e.g., a proprietary protocol developed by IGT, Reno, Nevada).

A plurality of device drivers 552 may be stored in memory 516. Example of different types of device drivers may include device drivers for gaming system components, device drivers for gaming system components, etc. Typically, the device drivers 552 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (e.g., WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (e.g., and/or other input) to the EGD using the touch keys and/or other player control sensors/buttons. Additionally, such input functionality may also be used for allowing players to provide input to other devices in the casino gaming network (e.g., such as, for example, player tracking systems, side wagering systems, etc.)

Wireless communication components 556 may include one or more communication interfaces having different architectures and utilizing a variety of protocols such as, for example, 802.11 (e.g., WiFi), 802.15 (e.g., including Bluetooth™), 802.16 (e.g., WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication—Interface and Protocol (e.g., NFCIP-1)", published by ECMA International (e.g., www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player movements and/or gestures and/or other input data from the player. In some embodiments, each gaming system may have its own respective motion/gesture detection component(s). In other embodiments, motion/gesture detection component(s) 551 may be implemented as a separate subsystem of the gaming system which is not associated with any one specific gaming system or device.

Figure 14:
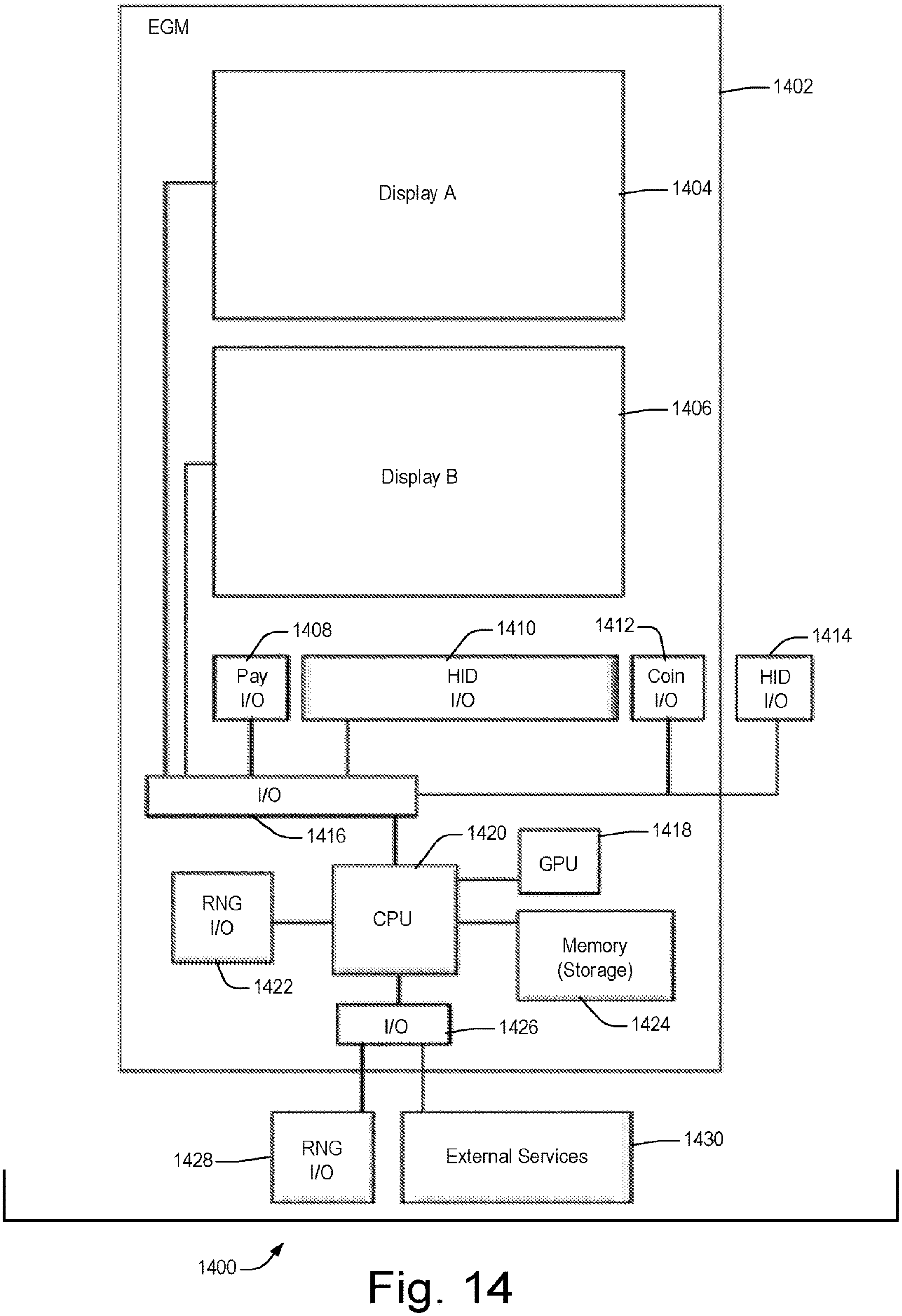
FIG. 14 shows a block diagram of electronic gaming machine (e.g., EGM), in accordance with a specific embodiment.

FIG. 14 shows an example block diagram of an alternate embodiment of an electronic gaming machine which may be configured or designed to implement one or more of the hybrid arcade/wager-based gaming aspects described herein. As illustrated in the example embodiment of FIG. 14, the electronic gaming machine 1400 may include, but are not limited to, one or more of the following component(s) (or combinations thereof):

- One or more display(s) (1404, 1406).
- HID I/O component(s) (1410, 1414).
- Payout I/O component(s) (1408).
- Cash/Credit/Coin I/O c component(s) (1412).
- CPUs/Processor(s)/Gaming Controller(s) (1420).
- Memory (1424).
- One or more Graphics Processor(s) (GPU) (1418).
- RNG I/O component(s) (1422, 1428).
- Other I/O component(s) (1416, 1426).
- Interface(s) to one or more External Services (1430).

In at least one embodiment, external services 1430 may include an IAPP system configured or designed to provide functionality for facilitating IAPP-related activities conducted at one or more EGMs of a gaming network. For example, some IAPP Management Component(s) may be configured or designed to include functionality for managing advertisement and product placement display locations, schedules, and rules relating to the display of advertisement content, product placement content, promotional content, etc. at one or more of the wager-based gaming machines of a casino establishment. In at least one embodiment, IAPP Management Component(s) may be configured or designed to include appropriate hardware and software to enforce rules and policies about the display and selection of advertisements which are being (or which are to be) displayed within gaming environments of one or more wager-based games operating at one or more electronic gaming machines of a casino gaming network.

FIG. 6 is a simplified block diagram of an exemplary mobile gaming device 600 in accordance with a specific embodiment. In at least one embodiment, one or more players may participate in a wager-based, arcade-style video game session using mobile gaming devices. In at least some embodiments, the mobile gaming device may be configured or designed to include or provide functionality which is similar to that of an electronic gaming device (e.g., EGD) such as that described, for example, in FIG. 4.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (e.g., or combinations thereof):

- UI Components 662 such as those illustrated, described, and/or referenced herein.
- Database Components 664 such as those illustrated, described, and/or referenced herein.
- Processing Components 666 such as those illustrated, described, and/or referenced herein.
- Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various hybrid arcade/wager-based game techniques at the mobile gaming device.

According to specific embodiments, various aspects, features, and/or functionalities of the mobile gaming device may be performed, implemented and/or initiated by one or more of the following types of systems, components, systems, devices, procedures, processes, etc. (e.g., or combinations thereof):

- Processor(s) 610
- Device Drivers 642
- Memory 616

Interface(s) 606
IAPP Management Component(s) 670
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654
Scanner/Camera 652
OCR Processing Engine 656
etc.

Figure 7:
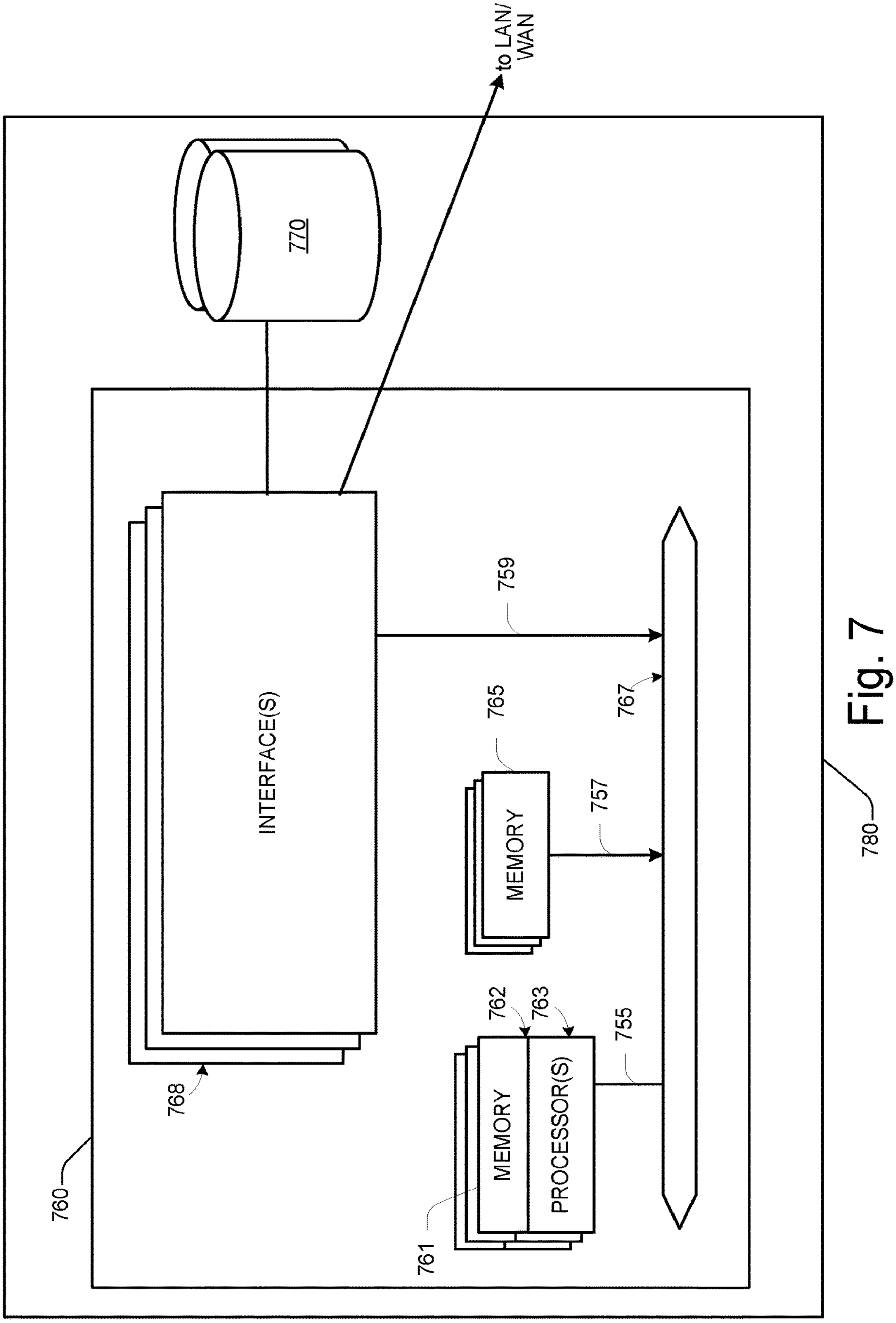
FIG. 7 illustrates an example embodiment of a System Server 780 which may be used for implementing various aspects/features described herein.

FIG. 7 illustrates an example embodiment of a system server 780 which may be used for implementing various aspects/features described herein. In at least one embodiment, the system server 780 includes at least one network device 760, and at least one storage device 770 (e.g., such as, for example, a direct attached storage device). In one embodiment, system server 780 may be suitable for implementing at least some of the hybrid arcade/wager-based game techniques described herein.

In according to one embodiment, network device 760 may include a master central processing unit (e.g., CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g., Linux), and any appropriate system software (e.g., such as, for example, AppLogic (e.g., TM) software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of system server 780. In a specific embodiment, a memory 761 (e.g., such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (e.g., sometimes referred to as "line cards"). Alternatively, one or more of the interfaces 768 may be provided as on-board interface controllers built into the system motherboard. Generally, they control the sending and receiving of data packets over the network and sometimes support other peripherals used with the system server 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (e.g., WiFi) interfaces, 802.15 interfaces (e.g., including Bluetooth™), 802.16 (e.g., WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the system server 780 to communicate with other network devices associated with various local area network (e.g., LANs) and/or wide area networks (e.g., WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (e.g., such as, for example, memory block 765, which, for example, may include random access memory (e.g., RAM)) configured to store data, program instructions for the general-purpose network operations and/or other information relating to the functionality of the various hybrid arcade/wager-based game techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (e.g., ROM) and random access memory (e.g., RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
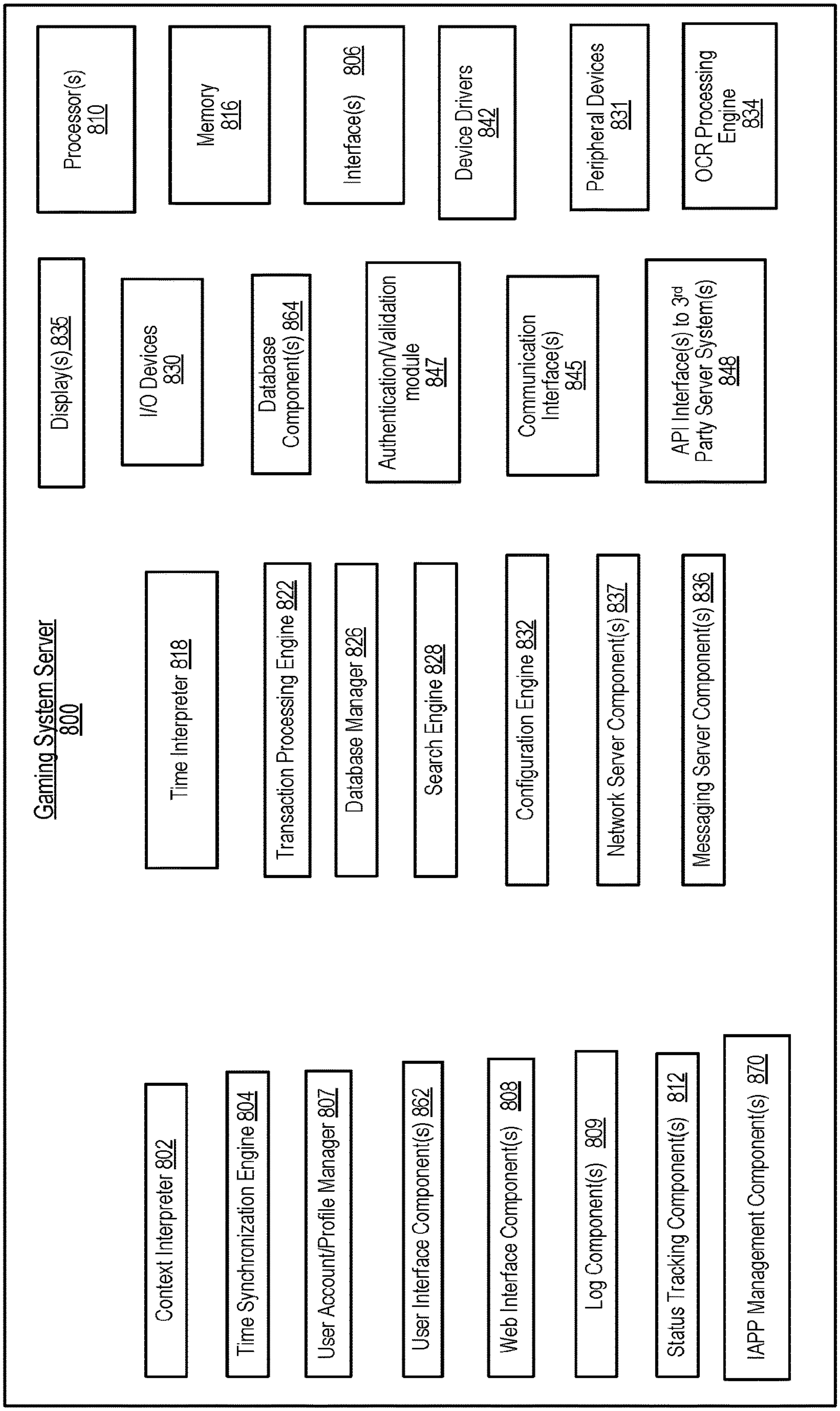
FIG. 8 illustrates an example of a functional block diagram of a Gaming System Server in accordance with a specific embodiment.

FIG. 8 illustrates an example of a functional block diagram of a Gaming System Server in accordance with a specific embodiment. In at least one embodiment, the Virtual Live electronic gaming device System Server may be operable to perform and/or implement various types of functions, operations, actions, and/or other features, such as, for example, one or more of those described and/or referenced herein.

In at least one embodiment, the Gaming System Server may include a plurality of components operable to perform and/or implement various types of functions, operations, actions, and/or other features such as, for example, one or more of the following (e.g., or combinations thereof):

- Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (e.g., or combinations thereof):
  - location-based criteria (e.g., geolocation of mobile gaming device, geolocation of EGD, etc.)
  - time-based criteria
  - identity of user(s)
  - user profile information
  - transaction history information
  - recent user activities
  - etc.
- Time Synchronization Engine (e.g., 804) which, for example, may be operable to manage universal time synchronization (e.g., via NTP and/or GPS)
- Search Engine (e.g., 828) which, for example, may be operable to search for transactions, logs, game history information, player information, hybrid arcade/wager-based game information, etc., which may be accessed from one or more local and/or remote databases.
- Configuration Engine (e.g., 832) which, for example, may be operable to determine and handle configuration of various customized configuration parameters for one or more devices, component(s), system(s), process(es), etc.
- Time Interpreter (e.g., 818) which, for example, may be operable to automatically and/or dynamically modify or change identifier activation and expiration time(s) based on various criteria such as, for example, time, location, transaction status, etc.
- Authentication/Validation Component(s) (e.g., 847) (e.g., password, software/hardware info, SSL certificates) which, for example, may be operable to perform various types of authentication/validation tasks such as one or more of those described and/or referenced herein.
- IAPP Management Component(s) 870, which for example, may include functionality for facilitating IAPP-related activities conducted at one or more EGMs of a gaming network. For example, some IAPP Management Component(s) may be configured or designed to include functionality for managing advertisement and product placement display locations, schedules, and rules relating to the display of advertisement content, product placement content, promotional content, etc. at one or more of the wager-based gaming machines of a casino establishment. In at least one embodiment, IAPP Management Component(s) may be configured or designed to include appropriate hardware and software to enforce rules and policies about the display and selection of advertisements which are being (or which are to be) displayed within gaming environments of one or more wager-based games operating at one or more electronic gaming machines of a casino gaming network.
- Transaction Processing Engine (e.g., 822) which, for example, may be operable to handle various types of transaction processing tasks such as, for example, one or more of those described and/or referenced herein.
- OCR Processing Engine (e.g., 834) which, for example, may be operable to perform image processing and optical character recognition of images such as those captured by a gaming device camera, for example.
- Database Manager (e.g., 826) which, for example, may be operable to handle various types of tasks relating to database updating, database management, database access, etc. In at least one embodiment, the Database Manager may be operable to manage game history databases, player tracking databases, etc.
- Log Component(s) (e.g., 809) which, for example, may be operable to generate and manage transactions history logs, system errors, connections from APIs, etc.
- Status Tracking Component(s) (e.g., 812) which, for example, may be operable to automatically and/or dynamically determine, assign, and/or report updated transaction status information based, for example, on the state of the transaction.
- Gateway Component(s) which, for example, may be operable to facilitate and manage communications and transactions with external Payment Gateways.
- Web Interface Component(s) (e.g., 808) which, for example, may be operable to facilitate and manage communications and transactions with virtual live electronic gaming device web portal(s).
- API Interface(s) to Gaming System Server(s) which, for example, may be operable to facilitate and manage communications and transactions with API Interface(s) to Gaming System Server(s)
- API Interface(s) to 3rd Party System Server(s) (e.g., 848) which, for example, may be operable to facilitate and manage communications and transactions with API Interface(s) to 3rd Party System Server(s)
- At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (e.g., such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.
- Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.

Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.

Device driver(s) 842. In at least one implementation, the device driver(s) 842 may include functionality similar to at least a portion of functionality implemented by one or more computer system driver devices such as those described herein and/or generally known to one having ordinary skill in the art.

One or more display(s) 835.

Messaging Server Component(s) 836, which, for example, may be configured or designed to provide various functions and operations relating to messaging activities and communications.

Network Server Component(s) 837, which, for example, may be configured or designed to provide various functions and operations relating to network server activities and communications.

User Account/Profile Manager component(s) 807.

Etc.

Figure 9:
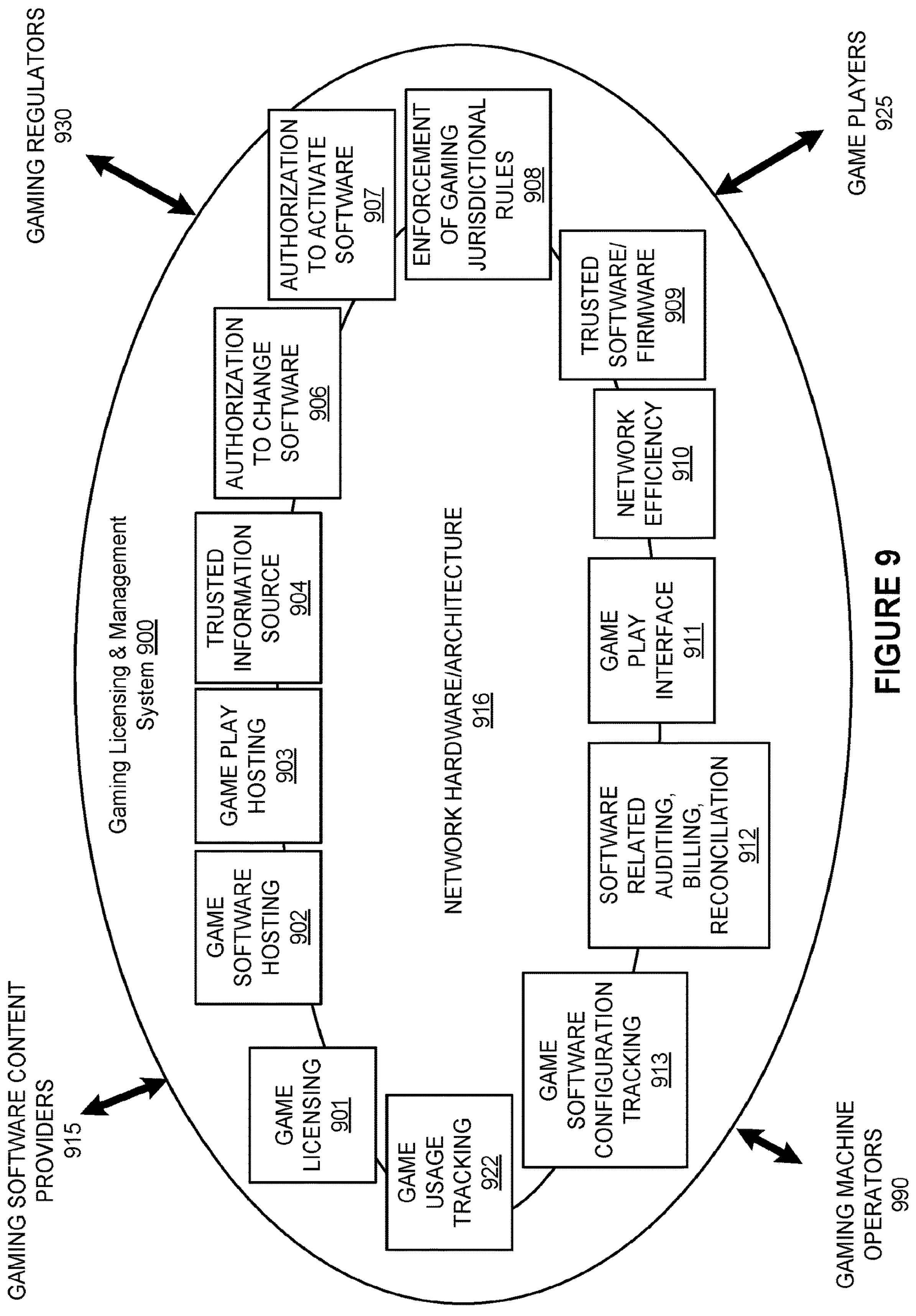
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 9) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 922 may track the usage of game software on a plurality of devices in communication with the host. The game usage-tracking host 922 may be in communication with a plurality of game play hosts and gaming machines. From the game play hosts and gaming machines, the game usage tracking host 922 may receive updates of an amount that each game available for play on the devices may be played and on amount that may be wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min wagers). Details of a game software host and a game software configuration host that may be used with example embodiments are described in U.S. Pat. No. 6,645,077, by Rowe, titled, "Gaming Terminal Data Repository and Information System," filed Dec. 91, 9000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 9003/0203756, by Jackson, filed on Apr. 95, 9002 and titled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering may be detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, e.g., game software approved for use on gaming devices by a local gaming jurisdiction may be required on gaming devices on the gaming machine.

In example embodiments, the devices may be connected by a network 916 with different types of hardware using different hardware architectures. Game software may be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Additional Benefits/Features/Embodiments

Different embodiments of the in-game advertising/product placement techniques described herein may be adapted and implemented in a variety of environments. For example, the in-game advertising/product placement techniques described herein are particularly well suited for deployment in any business establishments that house wager-based gaming devices (e.g., class 3 and/or class 2). Additionally, the in-game advertising/product placement techniques described herein may appeal to younger gamblers/gamers who enjoy playing arcade-style video games, middle aged gamblers/gamers who may have played some video games, and possibly even veteran gamblers who may be bored with existing wager-based video gaming technology.

According to different embodiments, in-game advertising/product placement techniques may be implemented in wager-based games and/or non-wager-based games.

According to different embodiments, the outcomes which are revealed via player interaction may related to wager-based event outcomes and/or non-wager-based event outcomes.

The in-game advertising/product placement techniques described herein provide the ability for patrons of casinos and other gaming establishments to experience new and exciting ways of engaging in wager-based video game play with minimized learning curve and intimidation factors. Additionally, using the in-game advertising/product placement techniques described herein, casinos and other gaming establishments hosting such hybrid arcade/wager-based gaming devices may increase their revenue by ensuring that the number of wager-based gaming event(s) occurring in a hybrid arcade/wager-based game (e.g., during specified time period) meet minimum specified threshold criteria.

One of the benefits of the in-game advertising/product placement techniques described herein is that it provides the ability for traditional video-type wager-based games (such as those deployed at Casino establishments) to be quickly and easily converted to wager-based games which include in-game advertising/product placement functionality, and in a manner which is already compliant with existing rules and regulations governing wager-based gaming, and/or in a manner which may avoid or significantly reduce requirements for additional regulatory approval.

Some benefits and advantages of the in-game advertising/product placement techniques described herein may include, but are not limited to, one or more of the following (e.g., or combinations thereof):

- Enabling the utilization of the same (e.g., proven/GLI approved) slot machine back end and RNG for gambling functionality.
- Enables new and unique ways to display a slot machine gambling game to specific demographics based on gameplay type and/or theme.
- May increase overall house gambling demographics, revealing untapped markets, more profits, more coins & more "butts in seats."
- Deployment of in-game advertising/product placement techniques in wager-based games may be purposefully configured or designed to avoid (or to not require) any additional regulatory approval for deployment in Casino venues.
- Etc.

The various in-game advertising/product placement techniques described herein may be used to improve the visual relationship between player and machine to increase player immersion and facilitate longer more exciting gambling durations without providing a completely new back-end delivery structure. It also improves the player method of interaction with the gambling game by allowing for a plethora of new age interface devices to be coupled with specific themed games (e.g., guns, joysticks, controllers, etc.). Existing technology and gameplay, although proven, is becoming dated and "not as fun" to younger players. The in-game advertising/product placement techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate. The in-game advertising/product placement techniques described herein may also be utilized for enabling enhanced slot machine gambling with new and exciting twists, while still being compliant with local/state/Federal gaming regulations.

In at least some embodiments, wager-based games supporting in-game advertising/product placement techniques may be developed using regulatory (e.g., GLI) approved third party engines such as, for example (Unreal, Unity) accompanied by a complex series of blueprints and code which, when compiled, creates a packaged executable ready for storage on a gaming machine, system, and/or device.

It will be appreciated that, via the use of specifically configured computer hardware and software, the problems which are solved and/or overcome by the various IAPP techniques described herein are necessarily rooted in computer technology in order to overcome problems specifically arising in the realm of computer networks. For example, as described previously, most of wager-based games currently deployed at electronic gaming machines in casino establishments are configured or designed to primarily offer monetary-type payouts for wager-based game event outcomes. Additionally, such monetary-type payouts are typically unrelated to, and have no effect or influence on, the gameplay portion of the wager-based game being executed at the electronic gaming machine. Such problems and limitations specifically arise in the realm of electronic computing devices and computer networks, and the solutions to these problems and limitations (e.g., as described herein) are necessarily rooted in computer technology.

Additional aspects relating to online game advertising systems are described in U.S. Pat. No. 7,698,178, titled "Online Game Advertising System", by V. Chu, issued 13 Apr. 2010, the entirety of which is herein incorporated by reference for all purposes.

The present application herein incorporates by reference, in its entirety and for all purposes, U.S. patent application Ser. No. 14/865,538 titled "HYBRID ARCADE-TYPE, WAGER-BASED GAMING TECHNIQUES AND PREDETERMINED RNG OUTCOME BATCH RETRIEVAL TECHNIQUES" by Washington et al., filed on 25 Sep. 2015.

The present application herein incorporates by reference, in its entirety and for all purposes, U.S. patent application Ser. No. 15/597,099, titled "ACHIEVEMENT-BASED PAYOUT SCHEDULE UNLOCK TECHNIQUES IMPLEMENTED IN WAGER-BASED GAMING NETWORKS" by Washington et al., filed on 16 May 2017.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

The invention claimed is:

1. A computer-implemented method, comprising:

providing an electronic device including at least one processor, a display and an input device, the method comprising causing the at least one processor to execute a plurality of instructions for:

displaying, on the display, a virtual environment configured to be interacted with by a player using the input device;

identifying a virtual object in the virtual game environment;

acquiring advertising content for display within the virtual game environment;

dynamically causing the identified virtual object to be reskinned to using the acquired advertising content; and displaying, on the display of the EGD, the reskinned virtual object within the virtual game environment.

2. The computer implemented method of claim 1, wherein the virtual object in the virtual environment includes at least one of a tattoo on a character and clothing of the character within the virtual environment.

3. The computer implemented method of claim 1, wherein the virtual object includes one symbol of at least one reel of a virtual slot game within the virtual environment.

4. The computer implemented method of claim 1, wherein the virtual object includes at least a tile of a virtual tile matching game within the virtual environment.

5. The computer implemented method of claim 1, wherein the reskinned virtual object is displayed within the virtual environment such as to convey an impression that the reskinned virtual object is an integral part of the virtual environment.

6. The computer implemented method of claim 1, wherein acquiring comprises acquiring the advertisement content based on profile data of the player.

7. The computer implemented method of claim 1, wherein the virtual environment is presented from a first-person point of view, and wherein the method further comprises:

identifying a further virtual object in the virtual game environment that presents itself to the player as the player navigates through the virtual environment;

acquiring further advertising content for display within the virtual game environment;

dynamically causing the identified further virtual object to be reskinned to using the acquired further advertising content; and displaying, on the display of the electronic device, the reskinned further virtual object within the virtual game environment.

8. The computer implemented method of claim 1, wherein acquiring comprises accessing a remote ad server over a computer network.

9. The computer implemented method of claim 1, wherein the reskinned virtual object is displayed within the virtual environment as a product placement advertisement occurring within the virtual game environment.

10. The computer implemented method of claim 1, further comprising causing the at least one processor to execute instructions stored in the memory for:

detecting that the player has initiated an in-game interaction with the reskinned object within the virtual game environment; and automatically initiating a food or beverage order on behalf of the player in response to the player's interaction with the reskinned object within the virtual game environment.

11. The computer implemented method of claim 1, further comprising causing the at least one processor to execute instructions stored in the memory for:

detecting that the player has initiated an in-game interaction with the reskinned object within the virtual game environment; and automatically initiating an order for an item or service that is a subject of the advertising content on behalf of the player in response to the player's interaction with the reskinned object within the virtual game environment.

12. The computer implemented method of claim 1, wherein the acquired advertising content comprises promotional content.

13. The computer implemented method of claim 1, wherein the acquired advertising content comprises at least one of a brand name and a brand logo.

14. An electronic computing device, comprising:
a display;
a user interface;
a processor coupled to the memory and to the user interface, and
a plurality of processes spawned by the processor, the plurality of processes comprising processing logic for:
generating and displaying, on the display, a virtual environment configured to be interacted with by a player via the user interface;
identifying a virtual object in the virtual game environment;
acquiring advertising content for display within the virtual game environment;
dynamically causing the identified virtual object to be reskinned using the acquired advertising content; and
displaying, on the display, the reskinned virtual object within the virtual game environment.

15. The electronic computing device of claim 14, wherein the virtual object in the virtual environment includes at least one of a tattoo of a character and clothing of the character within the virtual environment.

16. The electronic computing device of claim 14, wherein the virtual object includes one symbol of at least one reel of a virtual slot game within the virtual environment.

17. The electronic computing device of claim 14, wherein the virtual object includes at least a tile of a virtual tile matching game within the virtual environment.

18. The electronic computing device of claim 14, wherein the reskinned virtual object is displayed within the virtual environment such as to convey an impression that the reskinned virtual object is an integral part of the virtual environment.

19. The electronic computing device of claim 14, wherein acquiring comprises acquiring the advertisement content based on profile data of the player.

20. The electronic computing device of claim 14, wherein the virtual environment is presented from a first-person point of view and wherein the method further comprises:
identifying a further virtual object in the virtual game environment that presents itself to the player as the player navigates through the virtual environment;
acquiring further advertising content for display within the virtual game environment;
dynamically causing the identified further virtual object to be reskinned using the acquired further advertising content; and
displaying, on the display of the electronic computing device, the reskinned further virtual object within the virtual game environment.

21. The electronic computing device of claim 14, wherein acquiring comprises accessing a remote ad server over a computer network.

22. The electronic computing device of claim 14, wherein the reskinned virtual object is displayed within the virtual environment as a product placement advertisement occurring within the virtual game environment.

23. The electronic computing device of claim 14, further comprising processing logic for:
detecting that the player has initiated an in-game interaction with the reskinned object within the virtual game environment; and
automatically initiating a food or beverage order on behalf of the player in response to the player's interaction with the reskinned object within the virtual game environment.

24. The electronic computing device of claim 14, further comprising processing logic for:
detecting that the player has initiated an in-game interaction with the reskinned object within the virtual game environment; and
automatically initiating an order for an item or service that is a subject of the advertising content on behalf of the player in response to the player's interaction with the reskinned object within the virtual game environment.

25. The electronic computing device of claim 14, wherein the acquired advertising content comprises promotional content.

26. The electronic computing device of claim 14, wherein the acquired advertising content comprises at least one of a brand name and a brand logo.

* * * * *